(12) United States Patent
Wang et al.

(10) Patent No.: US 10,625,914 B2
(45) Date of Patent: Apr. 21, 2020

(54) BOTTLE CLOSURE ASSEMBLY INCLUDING A POLYETHYLENE COMPOSITION

(71) Applicant: NOVA Chemicals (International) S.A., Fribourg (CH)

(72) Inventors: XiaoChuan Wang, Calgary (CA); Ian Gibbons, Calgary (CA); Eric Vignola, Airdrie (CA); Cliff Baar, Calgary (CA); Amin Mirzadeh, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 16/208,951

(22) Filed: Dec. 4, 2018

(65) Prior Publication Data

US 2019/0168936 A1  Jun. 6, 2019

Related U.S. Application Data

(60) Provisional application No. 62/594,068, filed on Dec. 4, 2017.

(51) Int. Cl.
*B65D 55/16* (2006.01)
*B65D 47/12* (2006.01)
(Continued)

(52) U.S. Cl.
CPC .......... *B65D 55/16* (2013.01); *B65D 47/122* (2013.01); *C08L 23/04* (2013.01);
(Continued)

(58) Field of Classification Search
CPC .. B65D 56/16; B65D 47/122; B65D 41/0492; B65D 47/142
See application file for complete search history.

(56) References Cited

U.S. PATENT DOCUMENTS 3,645,992 A  2/1972 Elston
3,904,062 A  9/1975 Grussen
(Continued)

FOREIGN PATENT DOCUMENTS

WO  93/03093 A1  2/1993
WO  2005/121239 A2  12/2005
(Continued)

OTHER PUBLICATIONS

ASTM D256-10—Standard Test Methods for Determining the Izod Pendulum Impact Resistance of Plastics; Copyright ASTM International; Current edition approved May 1, 2010. Published Jun. 2010. Originally approved in 1926. Last previous edition approved in 2006 ad D256-06a. pp. 1-20.

(Continued)

*Primary Examiner* — Michael C Miggins
(74) *Attorney, Agent, or Firm* — Thomas J. Styslinger

(57) ABSTRACT

The present disclosure describes bottle closure assemblies which are made at least in part with a polyethylene composition having good flow properties and good resistance to environmentally induced stress cracking. The bottle closure assembly includes a cap portion, an elongated tether portion, and a retaining means portion. The retaining means portions engages a bottle neck or an upper portion of a bottle. The elongated tether portion connects at least one point on the cap portion to at least one point on the retaining means portion so as to prevent loss of the cap portion from a bottle.

6 Claims, 19 Drawing Sheets

(51) Int. Cl.
C08L 23/04 (2006.01)
B65D 41/04 (2006.01)
B65D 47/14 (2006.01)
(52) U.S. Cl.
CPC ........ B65D 41/0492 (2013.01); B65D 47/142 (2013.01); C08L 2203/10 (2013.01); C08L 2205/02 (2013.01)

(56) References Cited

U.S. PATENT DOCUMENTS

| | | | |
|---|---|---|---|
| 4,474,302 | A | 10/1984 | Goldberg et al. |
| 4,557,393 | A | 12/1985 | Boik |
| 4,564,114 | A | 1/1986 | Cole |
| 4,573,602 | A | 3/1986 | Goldberg |
| 4,583,652 | A | 4/1986 | Goldberg |
| 4,701,432 | A | 10/1987 | Welborn, Jr. |
| 4,798,081 | A | 1/1989 | Hazlitt et al. |
| 4,805,792 | A | 2/1989 | Lecinski, Jr. |
| 4,808,561 | A | 2/1989 | Welborn, Jr. |
| 4,935,397 | A | 6/1990 | Chang |
| 4,937,301 | A | 6/1990 | Chang |
| 5,055,438 | A | 10/1991 | Canich |
| 5,057,475 | A | 10/1991 | Canich et al. |
| 5,292,845 | A | 3/1994 | Kawasaki et al. |
| 5,324,800 | A | 6/1994 | Welborn, Jr. et al. |
| 5,342,868 | A | 8/1994 | Kimura et al. |
| 5,376,439 | A | 12/1994 | Hodgson et al. |
| 5,633,394 | A | 5/1997 | Welborn, Jr. et al. |
| 5,703,187 | A | 12/1997 | Timmers |
| 5,725,115 | A | 3/1998 | Bosl et al. |
| 5,981,636 | A | 11/1999 | Amos et al. |
| 6,002,033 | A | 12/1999 | Razavi et al. |
| 6,034,021 | A | 3/2000 | Wilson et al. |
| 6,063,879 | A | 5/2000 | Stephan et al. |
| 6,114,481 | A | 9/2000 | McMeeking et al. |
| 6,235,672 | B1 | 5/2001 | McKay et al. |
| 6,277,931 | B1 | 8/2001 | Jaber et al. |
| 6,342,463 | B1 | 1/2002 | Stephan et al. |
| 6,372,864 | B1 | 4/2002 | Brown |
| 6,465,551 | B1 | 10/2002 | Zhao et al. |
| 6,489,413 | B1 | 12/2002 | Floyd et al. |
| 6,599,971 | B2 | 7/2003 | Dotson et al. |
| 6,689,847 | B2 | 2/2004 | Mawson et al. |
| 6,777,509 | B2 | 8/2004 | Brown et al. |
| 6,984,695 | B2 | 1/2006 | Brown et al. |
| 3,022,143 | A1 | 9/2011 | Wang |
| 8,443,994 | B1 | 5/2013 | Desselle |
| 8,720,716 | B2 | 5/2014 | Campbell |
| 8,962,755 | B2 | 2/2015 | Wang et al. |
| 9,074,082 | B2 | 7/2015 | Wang et al. |
| 9,371,442 | B2 | 6/2016 | Wang |
| 9,475,927 | B2 | 10/2016 | Wang et al. |
| 9,493,283 | B2 | 11/2016 | Tuyn |
| 9,505,893 | B2 | 11/2016 | Wang et al. |
| 9,637,628 | B2 | 5/2017 | Wang |
| 9,758,653 | B2 | 9/2017 | Wang et al. |
| 9,776,779 | B2 | 10/2017 | Campbell |
| 9,783,663 | B2 | 10/2017 | Wang |
| 9,783,664 | B1 | 10/2017 | Wang |
| 2004/0016715 | A1 | 1/2004 | Strikovic |
| 2006/0247373 | A1 | 11/2006 | Goyal et al. |
| 2008/0197135 | A1 | 8/2008 | Berman |
| 2015/0353715 | A1* | 12/2015 | Wang ............... C08L 23/06 215/329 |

FOREIGN PATENT DOCUMENTS

| | | |
|---|---|---|
| WO | 2011/050042 A1 | 4/2011 |
| WO | 2015/042561 A1 | 3/2015 |
| WO | 2015/042562 A1 | 3/2015 |
| WO | 2015/042563 A1 | 3/2015 |
| WO | 2015/061834 A1 | 5/2015 |

OTHER PUBLICATIONS

ASTM D638-14—Standard Test Method for Tensile Properties of Plastics; Copyright ASTM International; Current edition approved Dec. 15, 2014. Published Mar. 2015. Originally approved in 1941. Last previous edition approved in 2010 as D638-10. pp. 1-17.

ASTM D648-16—Standard Test Method for Deflection Temperature of Plastics Under Flexural Load in the Edgewise Position; Copyright ASTM International; Current edition approved Apr. 1, 2016. Published Apr. 2016. Originally approved in 1941. Last previous edition approved in 2007 as D648-07, which was withdrawn Jan. 2016 and reinstated in Apr. 2016. pp. 1-14.

ASTM D790-15—Standard Test Methods for Flexural Properties of Unreinforced and Reinforced Plastics and Electrical Insulating Materials; Copyright ASTM International; Current edition approved Dec. 1, 2015. Published Jan. 2016. Originally approved in 1970. Last previous edition approved in 2010 as D790-10. pp. 1-12.

ASTM D792-13; Standard Test Methods for Density and Specific Gravity (Relative Density) of Plastics by Displacement; Copyright ASTM International; Current edition approved Nov. 1, 2013. Published Nov. 2013. Originally approved in 1944. Last previous edition approved in 2008 as D792-08. pp. 1-6.

ASTM D1525-09; Standard Test Method for Vicat Softening Temperature of Plastics; Copyright ASTM International; Current edition approved Nov. 15, 2009. Published Dec. 2009. Originally approved in 1958. Last previous edition approved in 2007 as D1525-07. pp. 1-10.

ASTM D1693-15; Standard Test Method for Environmental stress-Cracking of Ethylene Plastics; Copyright ASTM International; Current Edition approved May 1, 2015. Published Jun. 2015. Originally approved in 1959. Last previous edition approved in 2013 as D1693-13. pp. 1-11.

ASTM D3124-98 (Reapproved 2011); Standard Test Method for Vinylidene Unsaturation in Polyethylene by Infrared Spectrophotometry; Copyright ASTM International; Current edition approved Feb. 1, 2011. Published Mar. 2011. Originally approved in 1972. Last previous edition approved in 2003 as D3124-98 (2003). pp. 1-4.

ASTM D5227-13; Standard Test Method for Measurement of Hexane Extractable Content of Polyolefins; Copyright ASTM International; Current edition approved Jun. 1, 2013. Published Jul. 2013. Originally approved in 1992. Last previous edition approved in 2008 as D5227-01 (2008). pp. 1-4.

ASTM D6474-99 (reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D6645-01 (Reapproved 2010); Standard Test Method for Methyl (Comonomer) Content in Polyethylene by Infrared Spectrophotometry; Copyright ASTM International; Current enditon approved Jan. 1, 2010. Published Jan. 2010. Originally approved in 2001. Last previous edition approved in 2001 as D6645-01. pp. 1-4.

ASTM 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01. pp. 1-13.

Soares, J.B.P. and Hamielec, A.E.; Copolymerization of Olefins in a Series of Continuous Stirred-Tank Slurry-Reactors Using Heterogeneous Ziegler-Natta and Metallocene Catalysts. I. General Dynamic Mathematical Model; Polymer Reaction Engineering, Copyright 1996 by Marcel Dekker, Inc.; 4(2&3), pp. 153-191.

Hamielec, Archie E.; Macgregor, John F. and Penlidis, Alex; Copolymerization; Comprehensive Polymer Science and Supplements, vol. 3, Chapter 2, Copyright 1996; pp. 17-31.

Wild, L.; Ryle, T.R.; Knobeloch, D.C. and Peat, I.R.; Determination of branching distributions in Polyethylene and Ethylene Copolymers; Journal of Polymer Science: Polymer Physics Edition, vol. 20, (1982) pp. 441-455.

(56) References Cited

OTHER PUBLICATIONS

Randall, James C.; A Review of High Resolution Liquid 13Carbon Nuclear Magnetic Resonance Characterizations of Ethylene-Based Polymers; JMS-Rev. Macromol. Chem. Phys., C29(2 & 3), (1989), pp. 201-317.

\* cited by examiner

BOTTLE CLOSURE ASSEMBLY INCLUDING A POLYETHYLENE COMPOSITION

CROSS REFERENCE TO RELATED APPLICATIONS

This application claims the benefit of the filing date of U.S. Provisional Application No. 62/594,068, which was filed on Dec. 4, 2017. The contents of U.S. Provisional Application No. 62/594,068 are incorporated herein by reference in their entirety.

TECHNICAL FIELD

The present disclosure is directed to bottle closure assemblies which are made at least in part with a polyethylene composition. The bottle closure assemblies can have good processability and good stress crack resistance. The bottle closure assemblies include a closure portion or a cap portion, a tether portion, and a retaining means portion.

BACKGROUND

The manufacture of simple one-piece closures using polyethylene compositions is well known to persons skilled in the art.

Bottle closure systems and designs incorporating an integrated tethering means, which secures a cap portion to a bottle after the cap portion has been removed from a bottle opening, are also well known. Such designs typically involve molding processes which present a more complicated and longer flow path for a chosen plastic material relative to simple one-piece closure designs. As such, it would be beneficial to make tethered closure systems using a thermoplastic material which shows good performance in molding applications, especially those which involve longer and more tortuous flow paths in a mold. It would also be advantageous to make a tethered closure system using a material that has sufficient stress crack resistance and flexibility, as the tethering portion would need to be both strong enough to prevent loss of the cap portion once it has been removed from a bottle opening, and flexible enough to allow the tethering portion to be formed or bent into suitable closure system designs.

SUMMARY

The present disclosure concerns bottle closure assemblies including a cap portion, a tether portion, and a retaining means portion, where the bottle closure assembly is made at least in part from a polyethylene composition. The bottle closure assemblies including a cap portion, a tether portion, and a retaining means portion, where the bottle closure assembly is made at least in part from a polyethylene composition can have good processability and good stress crack resistance.

Accordingly, an embodiment of the present disclosure provides a bottle closure assembly which includes a cap portion, a tether portion, and a retaining means portion, the bottle closure assembly being made at least in part from a polyethylene composition including: (1) 10 to 70 weight percent (wt. %) of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

BRIEF DESCRIPTION OF THE DRAWINGS

FIG. 1C shows how an elongated tether portion connects at least one point on a cap portion to at least one point on a retaining collar portion once a cap portion has been removed from a bottle opening.

FIG. 2B also shows how an elongated tether portion connects at least one point on a cap portion to at least one point on a retaining collar portion once a cap portion has been removed from a bottle opening, thereby preventing its loss.

FIG. 3B also shows how an elongated tether portion connects at least one point on a cap portion to at least one point on a retaining collar portion once a cap portion has been removed from a bottle opening, thereby preventing its loss. FIG. 3C further shows that a bottle can be a carton, a container, or any other suitable containment vessel which has or is fitted with an aperture or opening which can be covered or sealed using a bottle closure assembly.

FIG. 6B shows how an elongated tether portion connects at least one point on a cap portion to at least one point on a retaining collar portion once a cap portion has been removed from a bottle opening.

FIG. 7B shows how an elongated tether portion connects at least one point on a cap portion to at least one point on a retaining collar portion once a cap portion has been removed from a bottle opening.

In FIGS. 15A and 15B a tether proxy connects a cap portion to a tamper evident band.

In FIG. 16A a tether proxy connects a cap portion to the remaining section of the tamper evident band.

DETAILED DESCRIPTION OF THE DISCLOSURE

Figure 1A:
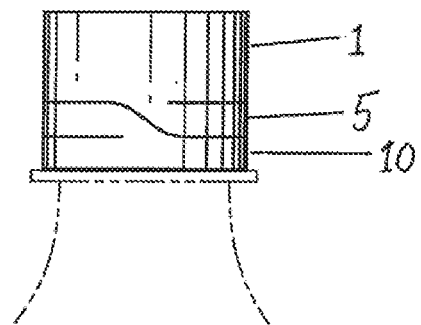
FIG. 1A shows an embodiment of a bottle closure assembly fitted to a bottle opening and in a "closed" or "sealed" position.

Any suitable bottle closure assembly design including a cap portion or a closure portion, a tether portion, and a retaining means portion is contemplated for use in the present disclosure, so long as it is made at least in part using a polyethylene composition as described herein. Some specific non-limiting examples of suitable bottle closure assemblies for use in the present disclosure are disclosed in U.S. Pat. Nos. 3,904,062; 4,474,302; 4,557,393; 4,564,114; 4,573,602; 4,583,652; 4,805,792; 5,725,115; 8,443,994; 8,720,716; 9,493,283; and 9,776,779; U.S. Patent Application Publication Nos. 2004/0016715 and 2008/0197135; U.S. Design Pat. No. D593,856; and WO 2015/061834; all of which are incorporated herein by reference. For further reference, some bottle closure assembly designs which may be used in embodiments of the present disclosure are shown in FIGS. 1-7.

An embodiment of the disclosure is a bottle closure assembly including: a cap portion, a tether portion, and a retaining means portion, the cap portion being molded to reversibly engage and cover a bottle opening, the retaining means portion being molded to irreversibly engage a bottle neck or an upper portion of a bottle, and where the tether portion connects at least one point on the cap portion to at least one point on the retaining means portion, wherein the cap portion, optionally the tether portion, and optionally the retaining means portion are made from a polyethylene composition including: (1) 10 to 70 weight percent (wt. %) of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly comprising: a cap portion, an elongated tether portion, and a retaining means portion, the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion, wherein the cap portion, optionally the elongated tether portion, and optionally the retaining means portion are made from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, tether portion, and retaining means portion; the cap portion being molded to reversibly engage and cover a bottle opening, the retaining means portion being molded to irreversibly engage a bottle neck or an upper portion of a bottle, and the tether portion being molded to connect at least one point on the cap portion to at least one point on the retaining means portion; wherein the integrally molded: cap portion, tether portion, and retaining means portion are made from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, elongated tether portion, and retaining means portion; the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion; wherein the integrally molded: cap portion, elongated tether portion, and retaining means portion are made from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including an integrally molded: cap portion, elongated tether portion, and retaining collar portion; the cap portion being molded to reversibly engage and cover a bottle opening, the retaining collar portion being molded to irreversibly engage a bottle neck or an upper portion of a bottle, and the elongated tether portion being molded to connect at least one point on the cap portion to at least one point on the retaining collar portion; wherein the integrally molded: cap portion, elongated tether portion, and retaining collar portion are made from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, an elongated tether portion, and a retaining collar portion, the cap portion being molded to reversibly engage and cover a bottle opening, the retaining collar portion being molded to irreversibly engage a bottle neck or an upper portion of a bottle, the elongated tether portion including a tether strip which is frangibly connected along a portion of its upper edge to a descending annular edge of the cap portion and which is frangibly connected along a portion of its lower edge to an upper annular edge of the retaining collar portion, the tether strip being integrally formed with and connected at one end to at least point on the cap portion and integrally formed with and connected at another end to at least one point on the retaining collar portion, the frangible sections being breakable when the cap portion is removed from a bottle opening, but where the cap portion remains connected to the retaining collar portion via the tether strip; wherein the cap portion, the elongated tether portion, and the retaining collar portion are integrally molded from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, an elongated tether portion, and a retaining collar portion, the cap portion being molded to reversibly engage and cover a bottle opening, the elongated tether portion including a tether strip which is frangibly connected along a portion of its upper edge to a descending annular edge of the cap portion and which is frangibly connected along a portion of its lower edge to an upper annular edge of the retaining collar portion, the tether strip being integrally formed with and connected at one end to at least one point on the cap portion and integrally formed with and connected at another end to at least one point on the retaining collar portion, the frangible sections being breakable when the cap portion is removed from a bottle opening, but where the cap portion remains connected to the retaining collar portion via the tether strip; wherein the cap portion, the elongated tether portion, and the retaining collar portion are integrally molded from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

An embodiment of the disclosure is a bottle closure assembly including: a cap portion, a tether portion, and a retaining means portion, the cap portion being molded to reversibly engage and cover a bottle opening, the retaining means portion being molded to irreversibly engage a bottle neck or an upper portion of a bottle, and where the tether portion connects at least one point on the cap portion to at least one point on the retaining means portion, wherein the cap portion, optionally the tether portion, and optionally the retaining means portion are made from a bimodal polyethylene composition including: (1) 10 to 70 wt. % of a first ethylene copolymer having a melt index $I_2$, of less than 0.4 g/10 min; a molecular weight distribution, $M_w/M_n$, of less than 3.0; and a density of from 0.920 to 0.955 g/cm$^3$; and (2) 90 to 30 wt. % of a second ethylene copolymer having a melt index $I_2$, of from 100 to 10,000 g/10 min; a molecular weight distribution, $M_w/M_n$, of less than 3.0; and a density higher than the density of the first ethylene copolymer, but less than 0.967 g/cm$^3$; wherein the density of the second ethylene copolymer is less than 0.037 g/cm$^3$ higher than the density of the first ethylene copolymer; the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5; and wherein the polyethylene composition has a molecular weight distribution, $M_w/M_n$, of from 3 to 11; a density of at least 0.949 g/cm$^3$; a melt index $I_2$, of from 0.4 to 5.0 g/10 min; an Mz of less than 400,000; a stress exponent of less than 1.50; and an ESCR Condition B (10% IGEPAL® CO-630) of at least 20 hrs.

IGEPAL® CO-630 is a polyoxyethylene (9) nonylphenylether which has an average $M_n$ of 617 and the structure below and is available from SIGMA-ALDRICH®.

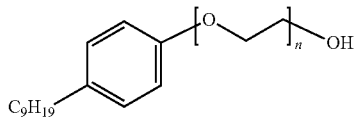

When integrally molded, the bottle closure assembly presents long flow paths for a plastic material to fill during manufacturing. In the present disclosure, the term "integrally molded" means that that components referred to are molded in a single continuous mold.

Generally, the cap portion is molded to reversibly engage and cover a bottle opening or aperture from which a liquid or other type of foodstuffs can be dispensed and so is removable therefrom.

Generally, the retaining means portion, which may in an embodiment of the disclosure may be a retaining collar portion, is generally not to be removed, or is not easily removable from a bottle and in embodiments of the disclosure, the retaining collar engages a bottle neck, or an upper portion of a bottle.

Generally, the tether portion, which may in an embodiment of the disclosure be an elongated tether portion, connects at least one point of the cap portion to at least one point on the retaining means portion, so that when the cap portion is removed from a bottle opening, the cap portion remains flexibly fixed to the bottle via the tether portion and the retaining means portion.

In the present disclosure, the terms "bottle", "container", "jar", "carton", "pouch", "package" and the like may be used interchangeably. That is, a "bottle closure assembly" may also be considered a "container closure assembly", a "jar close assembly", a "carton closure assembly", a "pouch closure assembly", a "package closure assembly", and the like. A person skilled in the art will understand that a "bottle closure assembly" as described in the present disclosure can be used to close or seal a number of different types of structural containers having different designs and contours.

The terms "cap", "closure", "closure portion", "cap portion", and the like, are used in the present disclosure to connote any suitably shaped molded article for enclosing, sealing, closing, or covering etc., a suitably shaped opening, a suitably molded aperture, an open necked structure, or the like used in combination with a container, a bottle, a jar, and the like.

In an embodiment of the disclosure, the retaining means portion can reversibly or irreversible engage a bottle neck, a shoulder section of a bottle, or an upper portion of a bottle, or a fitment (e.g., a fitment on a pouch or a carton).

In an embodiment of the disclosure, the retaining means portion can also serve as a tamper evident band (TEB).

In the present disclosure, the term "bottle neck" should be construed to mean a bottle neck per se but also any sort of similar or functionally equivalent structure such as a spout, a spigot, a fitment, or the like.

In an embodiment of the disclosure, the retaining means portion is molded or shaped to reversibly or irreversible engage a bottle neck, a shoulder section of a bottle, or an upper portion of a bottle.

In an embodiment of the disclosure, the retaining means portion is a retaining collar portion which reversibly or irreversibly engages a bottle neck, a shoulder section of a bottle, or an upper portion of a bottle.

In an embodiment of the disclosure, the retaining collar portion is circularly or annularly shaped so as to reversibly or irreversibly engage a bottle neck, a shoulder section of a bottle, or an upper portion of a bottle.

In an embodiment of the disclosure, the bottle closure assembly includes a cap portion, a tether portion, and a retaining means portion where the cap portion, the tether portion, and the retaining means portion are all integrally molded in one piece.

In an embodiment of the disclosure, the bottle closure assembly includes a cap portion, a tether portion, and a retaining collar portion where the cap portion, the tether portion, and the retaining collar portion are all integrally molded in one piece.

In an embodiment of the disclosure, the bottle closure assembly includes a cap portion, an elongated tether portion, and a retaining means portion where the cap portion, the elongated tether portion, and the retaining means portion are all integrally molded in one piece.

In an embodiment of the disclosure, the bottle closure assembly includes a cap portion, an elongated tether portion, and a retaining collar portion where the cap portion, the elongated tether portion, and the retaining collar portion are all integrally molded in one piece.

In an embodiment of the disclosure, the bottle closure assembly includes a cap portion, a tether portion, and a retaining means portion where the cap portion, the tether portion, and the retaining means portion are separately molded.

In an embodiment of the disclosure, the bottle closure assembly includes a cap portion, a tether portion, and a retaining collar portion where the cap portion, the tether portion, and the retaining collar portion are separately molded.

In an embodiment of the disclosure, the bottle closure assembly includes a cap portion, an elongated tether portion, and a retaining means portion where the cap portion, the elongated tether portion, and the retaining means portion are separately molded.

In an embodiment of the disclosure, the bottle closure assembly includes a cap portion, an elongated tether portion, and a retaining collar portion where the cap portion, the elongated tether portion, and the retaining collar portion are separately molded.

In embodiments of the disclosure, when separately molded, the cap portion, the tether portion, and the retaining means portion may be fixed together using any means known in the art. For example, the cap portion, the tether portion, and the retaining means portion may be glued together, or welded together using applied heat, sonication, or other methods known in the art for fusing plastic materials together.

In an embodiment of the disclosure, the bottle closure assembly includes a cap portion, a tether portion, and a retaining means portion where the cap portion, the tether portion, and the retaining means portion are made from the same or different materials.

In an embodiment of the disclosure, the bottle closure assembly includes a cap portion, a tether portion, and a retaining collar portion where the cap portion, the tether portion, and the retaining collar portion are made from the same or different materials.

In an embodiment of the disclosure, the bottle closure assembly includes a cap portion, an elongated tether portion, and a retaining means portion where the cap portion, the elongated tether portion, and the retaining means portion are made from the same or different materials.

In an embodiment of the disclosure, the bottle closure assembly includes a cap portion, an elongated tether portion, and a retaining collar portion where the cap portion, the elongated tether portion, and the retaining collar portion are made from the same or different materials.

In an embodiment of the present disclosure, the "tether portion" is of sufficient length and/or has a design which allows removal of a "cap portion" from a bottle opening while at the same time preventing the loss of the cap portion by maintaining a connection between the cap portion and a bottle, container or the like by forming a connection between at least one point on the cap portion and at least one point on a "retaining means portion".

In an embodiment of the present disclosure, the tether portion may be an "elongated tether portion", where "elongated" means that the tether portion will have at least one dimension (length) which is larger than at least one other dimension (width or height/thickness) or vice versa. Or considered another way, "elongated" means that the tether has a length which is greater than its width and/or height/thickness.

In an embodiment of the present disclosure, the tether portion will have dimensions (e.g., width and/or height/thickness) which offer sufficient strength to prevent facile cleavage or breakage of the tether when placed under stress or duress, such as for example when the tether is subjected to bending or flexional forces. For example, in an embodiment of the disclosure, the tether will have sufficient width and/or height/thickness so as to prevent facile breakage of the tether when masticated.

In an embodiment of the present disclosure, the "elongated tether portion" is of sufficient length and/or has a design which allows removal of a "cap portion" from a bottle opening while at the same time preventing the loss of the cap portion by maintaining a connection between the cap portion and a bottle, container or the like by forming a connection between at least one point on the cap portion and at least one point on a "retaining means portion".

In embodiments of the disclosure, the retaining means portion may be a "retaining collar portion" which engages some portion of a bottle neck or an upper portion of a bottle, container, or the like.

In embodiments of the disclosure, the retaining means portion may be a "retaining collar portion" which irreversibly engages some portion of a bottle neck, a spout, a spigot, a fitment on a pouch, or the like.

Alternatively, the retaining means portion may be a "retaining collar portion" which engages a bottle neck, or an upper portion of a bottle, container, or the like.

In an embodiment of the disclosure, the retaining collar portion may rotatably engage a bottle neck, or upper portion of a bottle, container, or the like.

In an embodiment of the disclosure, the retaining means portion is a retaining collar portion which is molded to irreversibly engage a bottle neck or an upper portion of a bottle, container, or the like.

In an embodiment of the disclosure, the retaining collar portion is annularly shaped or circularly shaped and can fit over and engage a bottle neck or an upper portion of a bottle, container, or the like.

The cap portion may be a single contiguous piece, or it may itself comprise one or more cap portion structures.

The tether portion in the present disclosure need not serve as a hinged connection between a cap portion and a retaining means portion (such as for example a retaining collar portion), and the tether portion need not comprise a hinged portion or area, but the tether portion may in some embodiments of the disclosure comprise a hinge and when present the hinge may be a so called "living hinge".

In an embodiment of the disclosure, the elongated tether portion has a length which is sufficient to allow the cap portion of the bottle closure assembly to swing or hang out of the way of a bottle opening, aperture, or the like so as not to interfere with the dispensation of the bottle contents, while at the same time tethering the cap portion to a bottle via the retaining means portion.

The cap portion may itself be a screw cap which threadingly engages a threaded system on a bottle neck, spigot, spout, valve, fitment on a pouch, or the like. The cap portion may alternatively be a snap cap which reversibly engages a bottle neck, spigot, spout or the like. The cap portion may also reversibly engage a retaining collar portion in a snap fitting or in a complementary arrangement of threaded structures. The cap portion may comprise a first cap portion and a second cap portion, where the first cap portion engages the second cap portion in a snap fitting, and the second cap portion engages a bottle neck, or upper portion of a bottle in a reversible or irreversible manner. For example, a second cap portion may have a threaded structure which threadingly engages a threaded system on a bottle neck. Alternatively, the second cap portion may itself engage a bottle neck by any suitable type of snap fitting. The cap portion may also comprise more than two cap portions.

In an embodiment of the disclosure, the bottle closure assembly includes a cap portion adapted to close an opening in a bottle or the like by making a frictional engagement with the opening.

In an embodiment of the disclosure, the cap portion has internal threads which mate with external threads surrounding an opening in a bottle, such as on a bottle neck, spigot, or spout for example.

In an embodiment of the disclosure, the retaining collar portion is adapted to cooperate with a shoulder or a flange on the neck of a bottle or an upper portion of a bottle which is to be sealed by the cap portion.

In an embodiment of the disclosure, the retaining collar portion is annularly or cylindrically shaped and fits onto the neck of a bottle and is coupled to the same, using any suitable coupling means, such as a snap fitting, or a threaded engagement. In an embodiment, the retaining collar portion is molded to snap fit onto a bottle neck, bottle aperture, spigot, spout or the like. In an embodiment, the retaining collar portion may be threaded onto a bottle neck, bottle aperture, spigot, spout or the like. In an embodiment, the retaining collar portion may itself have an internal threading system which mates with external threads on a bottle neck, bottle aperture, spigot, spout or the like. In an embodiment, the retaining collar portion is dimensioned to be engaged beneath a flange or shoulder molded into a bottle neck or an upper portion of a bottle. For example, the retaining collar portion may have an annular radial dimension which prevents it from moving past an annular shoulder integrally molded into a bottle neck or into an upper portion of a bottle. In this case the annular outwardly extending shoulder on a bottle neck or on an upper portion of a bottle acts as a camming surface which prevents movement of the retaining collar toward a bottle opening. Such a shoulder on a bottle could for example have a tapered outer annular edge which allows the retaining collar portion to be slipped onto the bottle in an irreversible manner. In an embodiment of the disclosure, there may be outwardly extending annularly spaced bosses or the like on a bottle neck or an upper portion of a bottle, against which the retaining collar abuts to hold it on to a bottle neck, bottle aperture, spigot, spout, or the like. Persons skilled in the art will appreciate that other means could be used to secure the retaining collar portion to a bottle neck, the upper portion of a bottle, a spout, and the like.

In an embodiment of the disclosure, the elongated tether portion includes a connecting strip having a first end connected to a least one point of the cap portion and a second end connected to at least one point of the retaining collar portion, a lower edge and an upper edge, wherein when the cap portion is fitted on to a bottle opening, the connecting strip at least partially encircles a bottle neck, spout, or the like between the cap portion and the retaining collar portion, and where at least a portion of the upper edge of the connecting strip is frangibly connected to a lower edge of the cap portion, and where at least a portion of the lower edge of the connecting strip is frangibly connected to an upper edge of the retaining collar portion, and where when the cap portion is removed from a bottle opening by breaking the frangible connections between the cap portion, the connecting strip and the retaining collar portion, the cap portion remains secured to retaining collar portion and the bottle via the connecting strip.

In an embodiment, the elongated tether portion is a cylindrically adapted connecting strip which at least partially encircles a bottle neck, spout, or the like and is located between the cap portion and the retaining collar portion prior to removal of the cap portion form a bottle opening.

In an embodiment, the elongated tether portion has a first end which is connected to at least one point on the cap portion and a second end which is connected to at least one point on the retaining collar portion.

In an embodiment, the cap portion, the elongated tether portion, and the retaining collar portion are integrally molded so that the elongated tether portion has a first end which is connected to at least one point on the cap portion and a second end which is connected to at least one point on the retaining collar.

In an embodiment, the cap portion, the elongated tether portion, and the retaining collar portion are integrally molded so that the elongated tether portion has a first end which is connected to at least one point on the cap portion and a second end which is connected to at least one point on the retaining collar portion, and wherein the elongated tether portion has an upper edge and a lower edge, where at least a portion of the upper edge is frangibly connected to a lower edge of the cap portion, and at least a portion of the lower edge is frangibly connected to an upper edge of the retaining collar portion, the frangibly connected portions being breakable when the closure is removed from a bottle opening.

In an embodiment of the disclosure, the frangible connections or frangibly connected portions are regularly or irregularly spaced molded sections (e.g., pins) having a dimension suitably small to allow facile breakage.

Frangible connections or frangibly connected portions can also be thought of as defining a weakening line along which the elongated tethering portion can be separated from the cap portion and the retaining collar portion. Such weakening lines can be generally defined as open sections alternating with bridging sections, where the bridging sections have a dimension suitably small to allow facile breakage. Alternatively, the weakening lines are defined by lines of plastic which have been made thin enough to break under stress.

In an embodiment of the disclosure, a single piece of a molded plastic having a suitable shape, is purposely weakened (by for example, regular or irregularly spaced cuts) along predetermined lines to define a cap portion, an elongated tether portion, and a retaining collar portion, wherein the cap portion is shaped to reversibly engage and cover a bottle opening, the retaining means portion is shaped to irreversibly engage a bottle neck or an upper portion of a bottle, and where the elongated tether portion connects at least one point on the cap portion to at least one point on the retaining means portion.

In an embodiment of the disclosure, the bottle closure assembly includes an upper cap portion, an intermediate elongate tethering portion, and a lower retaining collar portion, where the intermediate elongate tethering portion has a first end permanently connected to at least one point of the upper cap portion and a second end permanently connected to at least one point on the lower retaining collar portion, wherein the intermediate elongate tethering portion is partially joined to a lower annular edge of the upper cap portion along a first peripheral weakening line and the intermediate elongate tethering portion is partially joined to an upper annular edge of the lower retaining collar portion along a second peripheral weakening line, wherein removal of the upper cap, portion from a bottle separates the upper cap portion from the intermediate elongate tethering portion along the first peripheral weakening line and separates the lower retaining collar portion from the intermediate elongate tethering portion along the second weakening line, while maintaining a linkage between the upper cap portion and the lower retaining collar portion through the intermediate elongate tethering portion.

Figure 1B:
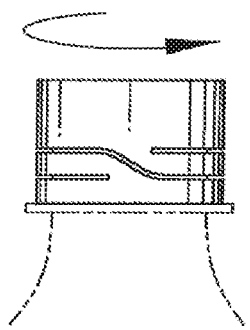
FIG. 1B shows an embodiment of a bottle closure assembly as a cap portion is rotated in order to bring about its removal from a bottle opening.
Figure 1C:
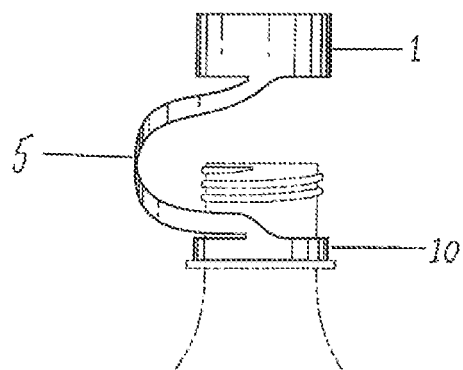
FIG. 1C shows an embodiment of a bottle closure assembly after a cap portion has been removed from a bottle opening.

In an embodiment of the disclosure, and with reference to FIGS. 1A-1C, the bottle closure assembly includes: an upper cap portion, 1 dimensioned to reversibly cover and close a bottle opening, a lower retaining collar portion, 10 dimensioned to irreversibly engage a bottle neck, or an upper portion of a bottle, and an elongated tether portion, 5 being dimensioned as a strip which at least partially encircles a bottle neck between the upper cap portion and the lower retaining collar portion, the strip including a first end, a second end, an upper edge and a lower edge, the upper edge of which is in part contiguous with the upper cap portion, the lower edge of which is in part contiguous with the lower retaining collar portion, whereby removal of the upper cap portion from a bottle (by for example rotation about a threaded system on the bottle neck) separates the elongated tether portion from the upper cap portion and the lower retaining collar portion, while at the same leaving the upper cap portion attached to the lower retaining collar via the elongated tether portion.

Figure 2A:
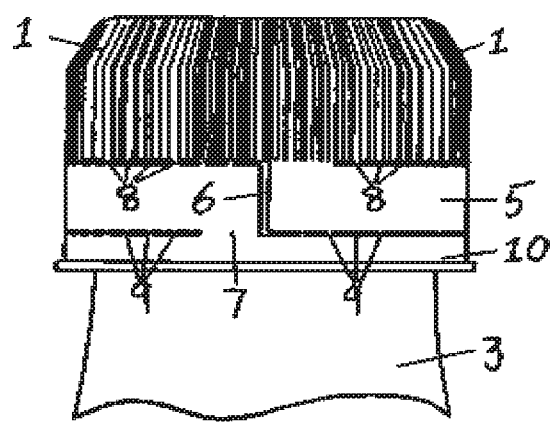
FIG. 2A shows an embodiment of a bottle closure assembly fitted over a bottle opening and before a cap portion has been removed from a bottle.
Figure 2B:
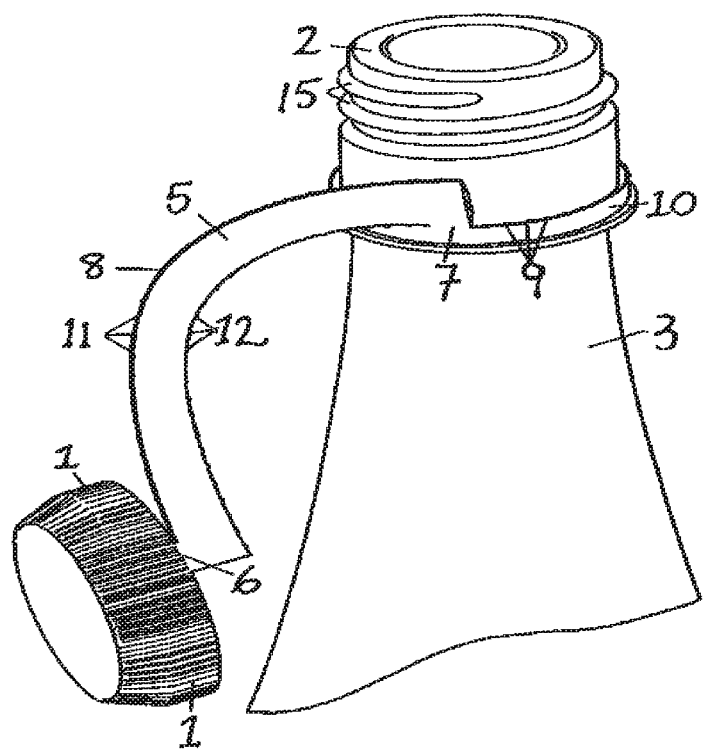
FIG. 2B shows an embodiment of a bottle closure assembly after a cap portion has been removed from a bottle opening.

In an embodiment of the disclosure, and with reference to FIGS. 2A and 2B, the bottle closure assembly includes: an upper cap portion, 1 dimensioned to reversibly cover and close a bottle opening, 2 a lower retaining collar portion, 10 dimensioned to irreversibly engage a bottle neck, 3 or an upper portion of a bottle, and an elongated tether portion, 5 being dimensioned as a strip which at least partially encircles a bottle neck between the upper cap portion and the lower retaining collar portion, the strip including a first end, 6 a second end, 7 an upper edge, 11 and a lower edge, 12, the upper edge of which is in part frangibly attached, 8 to the upper cap portion, and in part contiguous with the upper cap portion, the lower edge of which is in part frangibly attached, 9 to the lower retaining collar portion and in part contiguous with the lower retaining collar portion, whereby removal of the upper cap portion from a bottle will rupture the frangible attachments while leaving the upper cap portion attached to the lower retaining collar portion via the elongated tether portion. In an embodiment and with reference to FIG. 2B, the bottle opening may have peripheral threads, 15 which engage threads on the inside of the cap portion.

Figure 3A:
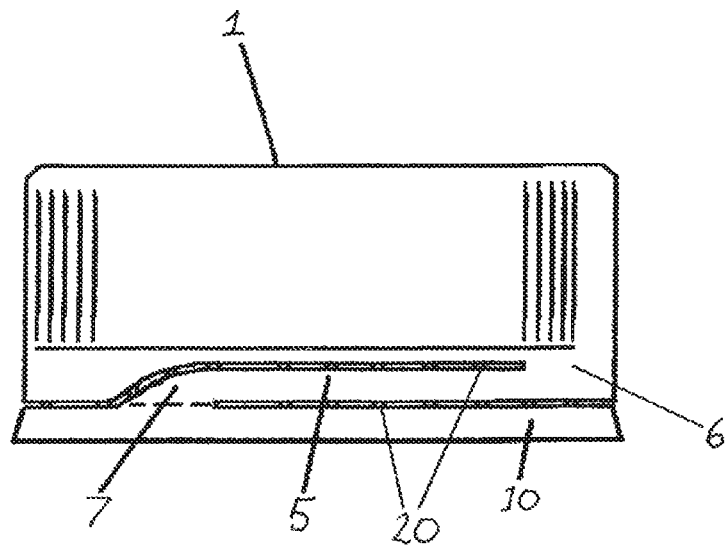
FIG. 3A shows an embodiment of a bottle closure assembly.
Figure 3B:
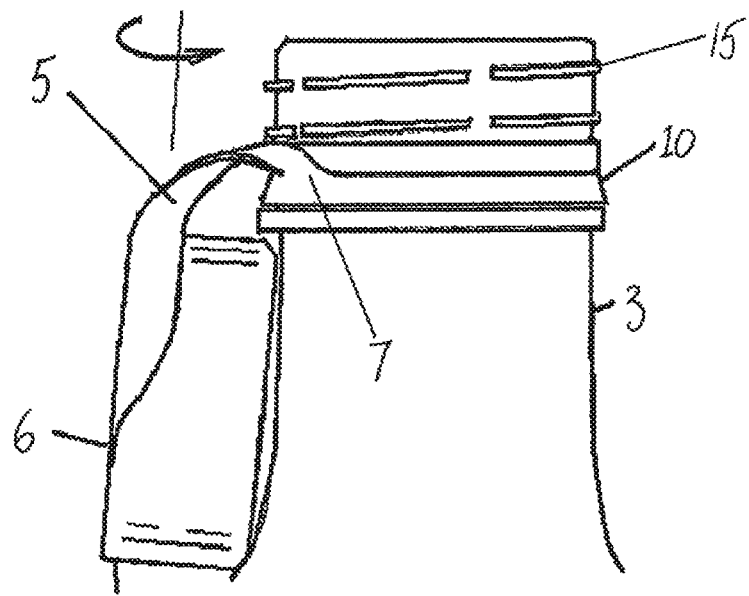
FIG. 3B shows an embodiment of a bottle closure assembly after a cap portion has been removed from a bottle opening.
Figure 3C:
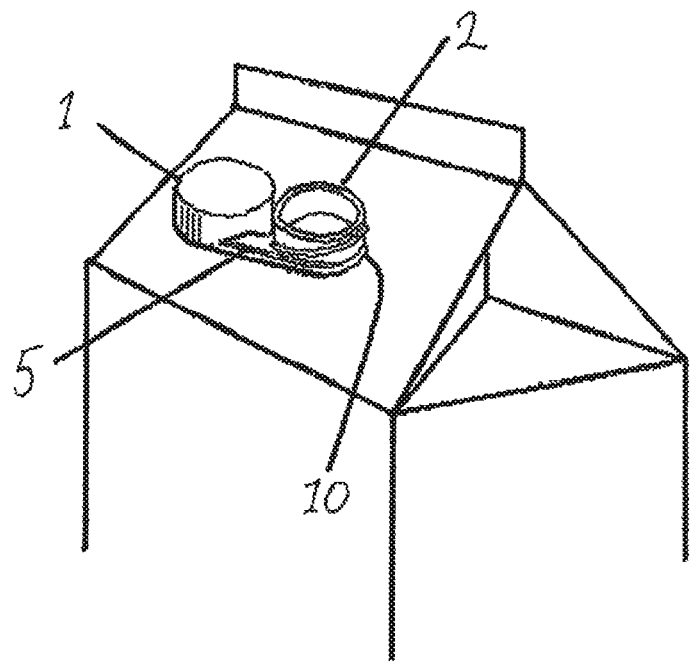
FIG. 3C shows how an elongated tether portion connects at least one point on a cap portion to at least one point on a retaining collar portion once a cap portion has been removed from a bottle opening.

In an embodiment of the disclosure, and with reference to FIGS. 3A-3C, the bottle closure assembly includes: an upper cap portion, 1 dimensioned to reversibly cover and close a bottle opening, 2, a lower retaining collar portion, 10 dimensioned to irreversibly engage a bottle neck, 3 or an upper portion of a bottle, and an elongated tether portion, 5 being dimensioned as a strip which at least partially encircles a bottle neck between the upper cap portion and the lower retaining collar portion, the strip having a first end, 6 a second end, 7 an upper edge, and a lower edge, the upper edge of which is in part frangibly attached to the upper cap portion by frangible elements, 20 (such as for example breakable pins), and in part contiguous with the upper cap portion, the lower edge of which is in part frangibly attached to the lower retaining collar portion by frangible elements, 20 (such as for example breakable pins) and in part contiguous with the lower retaining collar portion, whereby removal of the upper cap portion from a bottle opening will rupture the frangible attachments while leaving the upper cap portion attached to the lower retaining collar portion via the elongated tether portion, 5. In an embodiment and with reference to FIG. 3B, the bottle neck and opening may have peripheral threads, 15 which engage threads on the inside of the cap portion.

Figure 4A:
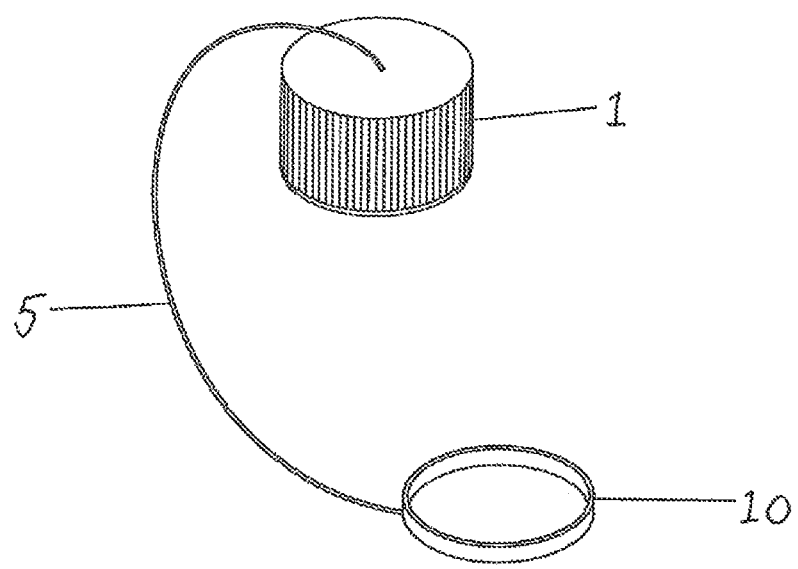
FIG. 4A shows an embodiment of a bottle closure assembly in the absence of a bottle. The bottle closure assembly has a cap portion, an elongated tether portion, and a retaining collar portion.
Figure 4B:
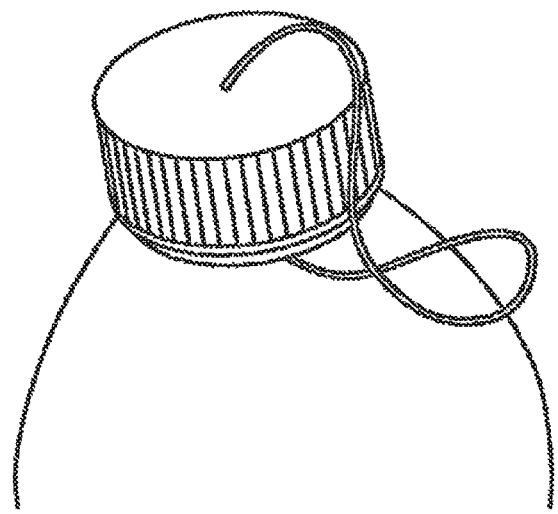
FIG. 4B shows an embodiment of a bottle closure assembly fitted over a bottle opening and before a cap portion has been removed from a bottle opening.
Figure 4C:
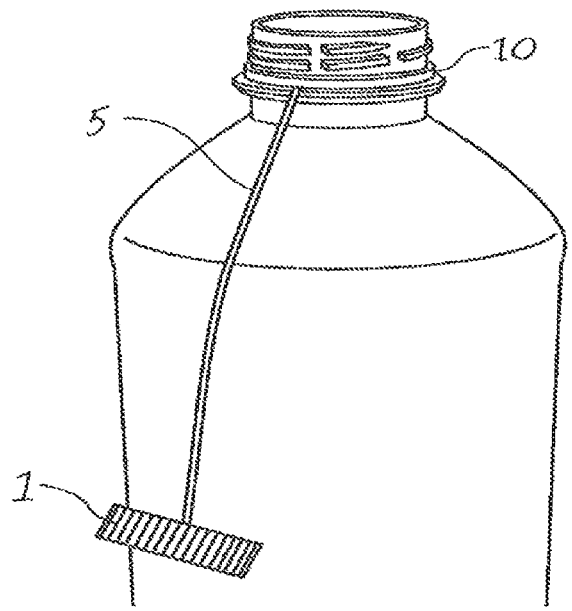
FIG. 4C shows an embodiment of a bottle closure assembly after a cap portion has been removed from a bottle opening.

In an embodiment of the disclosure, and with reference to FIGS. 4A-4C, the bottle closure assembly includes a cap portion, 1, an elongated tether portion, 5, and a retaining collar portion, 10.

Figure 5A:
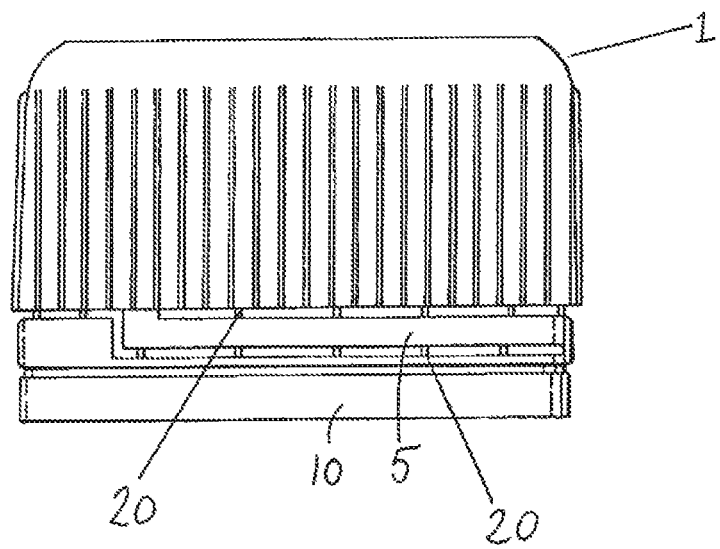
FIG. 5A shows an embodiment of a bottle closure assembly in the absence of a bottle.
Figure 5B:
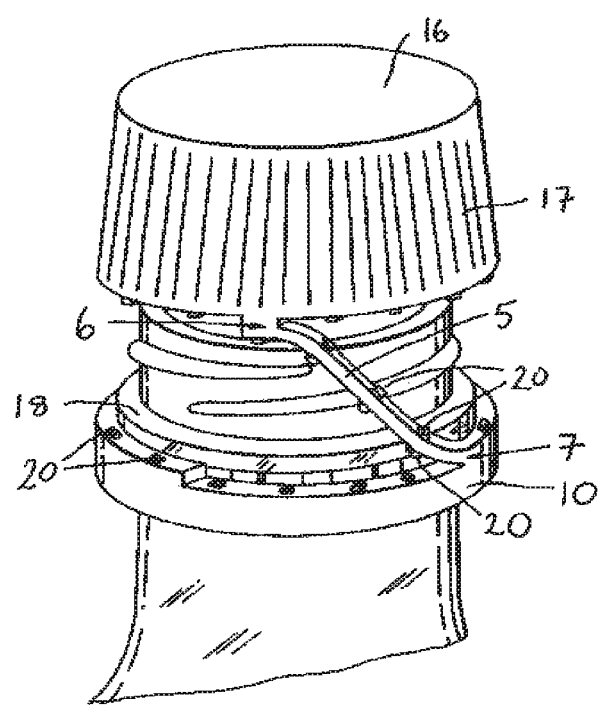
FIG. 5B shows an embodiment of a bottle closure assembly as a cap portion is rotated in order to bring about its removal from a bottle opening.

In an embodiment of the disclosure, and with reference to FIGS. 5A and 5B, the bottle closure assembly includes: a cap portion, 1 a tether portion, 5 and a retaining means portion, 10 the cap portion being molded to reversibly engage and cover a bottle opening, the retaining means portion being molded to irreversibly engage a bottle neck or an upper portion of a bottle, 18 and the tether portion being molded to connect at least one point on the cap portion to at least one point on the retaining means portion, the cap portion and the retaining collar portion extending coaxially with each other, the tether portion including a tabbed tether strip which is integrally formed with and secured at its respective ends (6 and 7) to the cap portion and the retaining collar portion, the tether strip being joined to the cap portion and the retaining collar along a preselected length of the tether strip to be manually separated from the cap portion and the retaining collar portion by frangible elements, 20 of a preselected thickness to permit the elongated tether strip to be manually separated from the cap portion and the retaining collar portion along the preselected length, the tether strip being of such length so as to permit the cap portion to be removed from a bottle opening while at the same remaining attached to the bottle via the tether strip and the retaining collar. In an embodiment and as shown in FIG. 5B, a cap portion may have a circular top wall, 16 and a descending annular side wall 17.

In an embodiment of the disclosure, the bottle closure assembly includes: a cap portion having a top wall and a side wall, an elongated tether portion, and a retaining collar portion, the cap portion being molded to reversibly engage and cover a bottle opening, the retaining collar portion being annular and being molded to irreversibly engage a ridge or flange on a bottle neck or on an upper portion of a bottle, and the elongated tether portion being integrally molded with the cap portion and the retaining collar portion to connect at least one point on the cap side wall to at least one point on the retaining collar portion, wherein the elongated tether portion runs between the cap side wall and the retaining collar portion along the circumference of the cap portion when the cap portion is on a bottle and the elongated tether portion connects at least one point on the cap side wall to at least one point on the retaining collar portion when the cap portion is removed from a bottle.

Figure 6A:
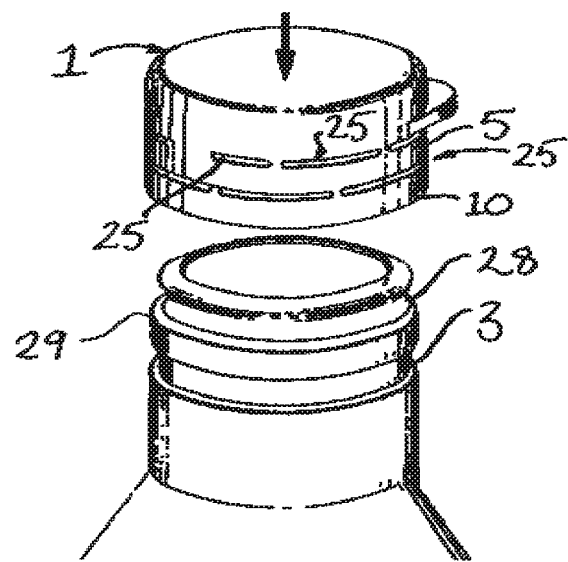
FIG. 6A shows an embodiment of a bottle closure assembly which fits over a bottle opening.
Figure 6B:
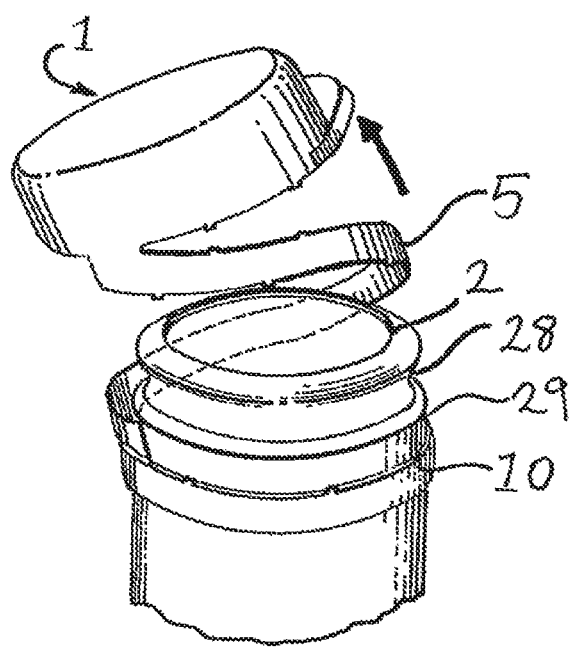
FIG. 6B show an embodiment of a bottle closure assembly after a cap portion has been removed from a bottle opening.

In an embodiment of the disclosure, and with reference to FIGS. 6A and 6B, the bottle closure assembly includes an upper cap portion, 1, an opening, 2, an intermediate elongate tethering portion, 5 and a lower retaining collar portion, 10 where the intermediate elongate tethering portion has a first end permanently connected to at least one point of the upper cap portion and a second end permanently connected to at least one point on the lower retaining collar portion, wherein the intermediate elongate tethering portion is partially joined to a lower annular edge of the upper cap portion along a first peripheral weakening line defined by perforations, 25 and the intermediate elongate tethering portion is partially joined to an upper annular edge of the lower retaining collar portion along a second peripheral weakening line defined by perforations, 25 wherein removal of the upper cap portion from a bottle separates the upper cap portion from the tethering portion along the first peripheral weakening line and separates the lower retaining collar portion from the tethering portion along the second weakening line, while maintaining a linkage between the upper cap portion and the lower retaining collar portion through the intermediate elongated tethering portion.

In an embodiment of the disclosure, and with reference to FIGS. 6A and 6B, a bottle neck 3, may have an annular groove 28, which presents a flange onto which the cap portion, 1 may reversibly engage in a snap fit arrangement. In an embodiment and with reference to FIGS. 6A and 6B a bottle neck may have an outwardly extended annular flange, 29 which prevents a retaining collar portion, 10 from being removed from a bottle neck.

Figure 7A:
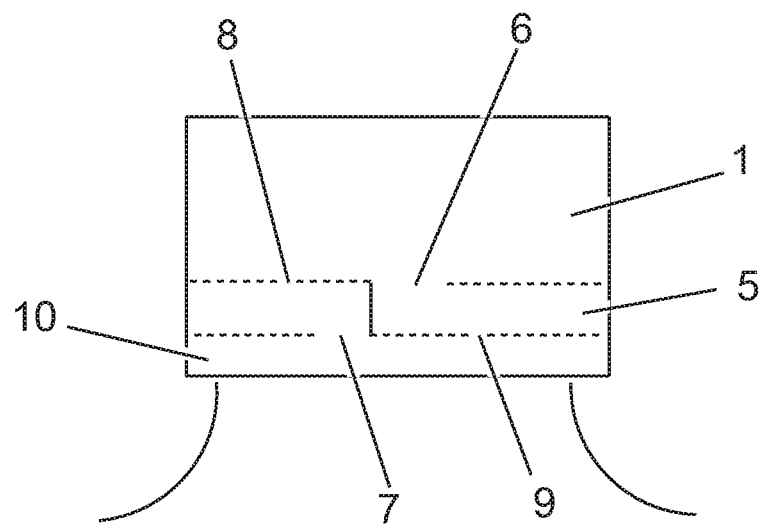
FIG. 7A shows an embodiment of a bottle closure assembly fitted to a bottle opening and in a "closed" or "sealed" position.
Figure 7B:
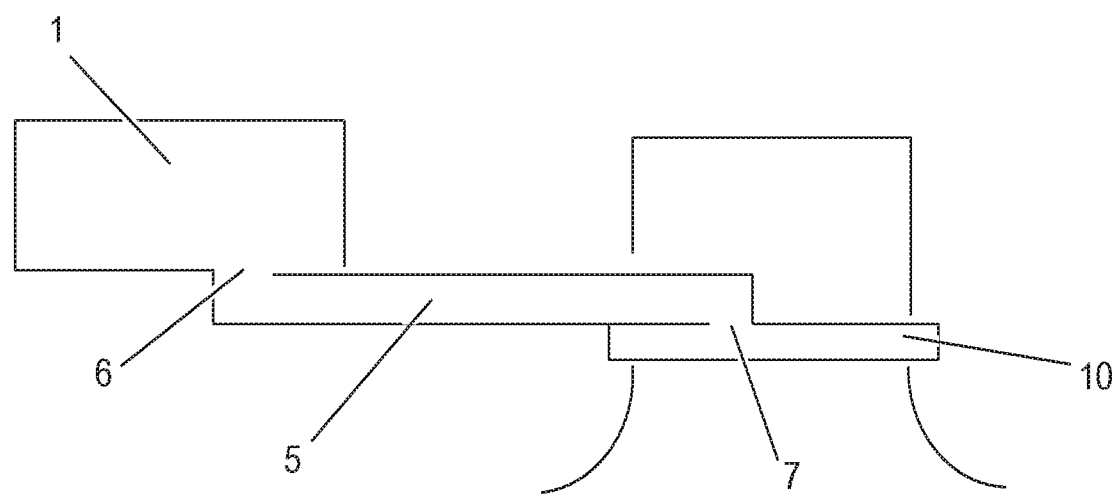
FIG. 7B shows an embodiment of a bottle closure assembly after a cap portion has been removed from a bottle opening.

In an embodiment of the disclosure, and with reference to FIGS. 7A and 7B, the bottle closure assembly includes a cap portion, 1, an elongated tether portion, 5, and a retaining collar portion, 10. The elongated tether portion connects at least one point of the cap portion at a first end, 6 to at least one point of the retaining collar portion at a second end, 7. The elongated tether portion may be further joined to the cap portion along a frangible connection 8. The elongated tether portion may be further joined to the retaining collar portion along a frangible connection 9. Separation of the cap portion from the elongated tether portion along a frangible connection 8 along with separation of the retaining collar portion from the elongated tether portion along a frangible connection 9, allows removal of the cap portion from a bottle opening while at the same time securing it to the bottle via the elongated tether portion and the retaining collar portion.

In an embodiment of the disclosure, the bottle closure assembly includes: a cap portion, the cap portion being dimensioned to cover and close a bottle opening, a retaining collar portion, and an elongated tether portion which forms an elastic connection between at least one point on the cap portion and at least one point on the retaining collar portion.

In an embodiment of the disclosure, the retaining means portion is integrally molded into a bottle, container, or the like.

In an embodiment of the disclosure, the retaining collar portion is integrally molded into a bottle, container, or the like.

In an embodiment of the disclosure, the tether portion fixes the cap portion to the retaining collar portion which remains secured to the bottle, making it difficult to separate the cap portion from the bottle, thereby preventing its loss, while at the same time allowing rotation of the cap portion for facile removal and replacement of the same from and onto a bottle opening.

In the present disclosure, the bottle closure assembly is made in part or in full using a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

In an embodiment of the disclosure, the cap portion, optionally the tether portion, and optionally the retaining collar portion, are made from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

In an embodiment of the disclosure, the cap portion, the tether portion, and the retaining collar portion are all integrally molded from a polyethylene composition including: (1) 10 to 70 wt. % of a first ethylene copolymer having a melt index $I_2$, of less than 1.0 g/10 min; and a density of from 0.920 to 0.960 g/cm$^3$; and (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$; wherein the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

Further polyethylene compositions suitable for use in the manufacture of part or all of the bottle closure assembly discussed above are disclosed in for example U.S. Pat. Nos. 8,022,143; 8,962,755; 9,074,082; 9,371,442; 9,505,893; 9,475,927; 9,637,628; 9,758,653; 9,783,663; and 9,783,664 all of which are incorporated, in their entirety, herein.

Suitable polyethylene compositions for use in the manufacture of part or all of the bottle closure assembly are described in more detail below.

By the term "ethylene copolymer" it is meant that the copolymer includes both ethylene and at least one alpha-olefin comonomer. Generally, an "ethylene copolymer" or "polyethylene copolymer", is the product of a polymerization process, where ethylene and one or more than one alpha-olefin comonomer were deliberately added or was deliberately present as polymerizable olefins.

By the term "ethylene homopolymer" it is meant that the copolymer includes only ethylene (or a negligible amount of an alpha-olefin comonomer). Generally, an "ethylene homopolymer" or "polyethylene homopolymer", is the product of a polymerization process, where only ethylene was deliberately added as a polymerizable olefin.

The terms "homogeneous" or "homogeneously branched polymer" as used herein define homogeneously branched polyethylene which has a relatively narrow composition distribution, as indicated by a relatively high composition distribution breadth index (CDBI$_{50}$). That is, the comonomer is randomly distributed within a given polymer chain and a substantial portion of the polymer chains have same ethylene/comonomer ratio. It is well known that metallocene catalysts and other so called "single site catalysts" incorporate comonomer more evenly than traditional Ziegler-Natta catalysts when used for catalytic ethylene copolymerization with alpha-olefins. This fact is often demonstrated by measuring the composition distribution breadth index (CDBI$_{50}$) for corresponding ethylene copolymers. The composition distribution of a polymer can be characterized by the short chain distribution index (SCDI) or composition distribution breadth index (CDBI$_{50}$). The definition of composition distribution breadth index (CDBI$_{50}$) can be found in PCT publication WO 93/03093 and U.S. Pat. No. 5,206,075. The CDBI$_{50}$ is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 or in U.S. Pat. No. 4,798,081 can be employed. From the weight fraction versus composition distribution curve, the CDBI$_{50}$ is determined by establishing the weight percentage of a copolymer sample that has a comonomer content within 50% of the median comonomer content on each side of the median. Generally, Ziegler-Natta catalysts produce ethylene copolymers with a $CDBI_{50}$ of less than about 50 weight %, or less than about 55 weight %, consistent with a heterogeneously branched copolymer. In contrast, metallocenes and other single site catalysts will most often produce ethylene copolymers having a $CDBI_{50}$ of greater than about 55 weight %, or greater than about 60 weight %, consistent with a homogeneously branched copolymer.

In one embodiment of the disclosure, the polyethylene composition will comprise at least a first ethylene copolymer and a second ethylene copolymer which is different from the first ethylene polymer.

In one embodiment of the disclosure, the polyethylene composition will comprise at least a first ethylene copolymer and an ethylene homopolymer.

The First Ethylene Copolymer

In an embodiment of the disclosure, the first ethylene copolymer of the polyethylene composition has a density of from about 0.920 g/cm³ to about 0.955 g/cm³; a melt index, $I_2$, of less than about 0.4 g/10 min; a molecular weight distribution, $M_w/M_n$, of below about 3.0 and a weight average molecular weight, $M_w$, that is greater than the $M_w$ of the second ethylene copolymer or the ethylene homopolymer. In an embodiment of the disclosure, the weight average molecular weight, $M_w$, of the first ethylene copolymer is at least 110,000 (g/mol).

In an embodiment of the disclosure, the first ethylene copolymer of the polyethylene composition has a density of from about 0.920 g/cm³ to about 0.955 g/cm³; a melt index, $I_2$, of less than about 0.4 g/10 min; a molecular weight distribution, $M_w/M_n$, of below about 2.7 and a weight average molecular weight, $M_w$, that is greater than the $M_w$ of the second ethylene copolymer or the ethylene homopolymer.

In an embodiment of the disclosure, the first ethylene copolymer of the polyethylene composition has a density of from about 0.920 g/cm³ to about 0.955 g/cm³; a melt index, $I_2$, of less than about 0.4 g/10 min; a molecular weight distribution, $M_w/M_n$, of below about 2.7 and a weight average molecular weight, $M_w$, that is greater than the $M_w$ of the second ethylene copolymer or the ethylene homopolymer.

In an embodiment of the disclosure, the first ethylene copolymer is a homogeneously branched copolymer.

In an embodiment of the disclosure, the first ethylene copolymer is made with a single site catalyst, such as for example a phosphinimine catalyst.

In an embodiment of the disclosure, the comonomer (i.e. alpha-olefin) content in the first ethylene copolymer can be from about 0.05 to about 3.0 mol %. The comonomer content of the first ethylene polymer is determined by mathematical deconvolution methods applied to a bimodal polyethylene composition (see the Examples section).

In embodiments of the disclosure, the comonomer in the first ethylene copolymer is one or more olefin such as but not limited to 1-butene, 1-hexene, 1-octene, and the like.

In an embodiment of the disclosure, the first ethylene copolymer is a copolymer of ethylene and 1-octene.

In an embodiment of the disclosure, the short chain branching in the first ethylene copolymer can be from about 0.25 to about 15 short chain branches per thousand carbon atoms (SCB1/1000Cs). In further embodiments of the disclosure, the short chain branching in the first ethylene copolymer can be from 0.5 to 15, or from 0.5 to 12, or from 0.5 to 10, or from 0.75 to 15, or from 0.75 to 12, or from 0.75 to 10, or from 1.0 to 10, or from 1.0 to 8.0, or from 1.0 to 5, or from 1.0 to 3 branches per thousand carbon atoms (SCB1/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the first ethylene copolymer is determined by mathematical deconvolution methods applied to a bimodal polyethylene composition (see the Examples section).

In an embodiment of the disclosure, the comonomer content in the first ethylene copolymer is substantially similar or approximately equal (e.g., within about ±0.01 mol %) to the comonomer content of the second ethylene copolymer (as reported, for example, in mol %).

In an embodiment of the disclosure, the comonomer content in the first ethylene copolymer is greater than comonomer content of the second ethylene copolymer (as reported for example in mol %).

In an embodiment of the disclosure, the amount of short chain branching in the first ethylene copolymer is substantially similar or approximately equal (e.g., within about ±0.05 SCB/1000Cs) to the amount of short chain branching in the second ethylene copolymer (as reported in short chain branches, SCB per thousand carbons in the polymer backbone, 1000Cs).

In an embodiment of the disclosure, the amount of short chain branching in the first ethylene copolymer is greater than the amount of short chain branching in the second ethylene copolymer (as reported in short chain branches, SCB per thousand carbons in the polymer backbone, 1000Cs).

In some embodiments of the disclosure the melt index, $I_2$, of the first ethylene copolymer is 1.0 g/10 min or less (≤1.0 g/10 min), or less than 1.0 g/10 min (<1.0 g/10 min).

In an embodiment of the disclosure, the melt index, $I_2$ of the first ethylene copolymer is less than 0.4 g/10 min. The melt index of the first ethylene copolymer can, in an embodiment of the disclosure, be above 0.01, but below 0.4 g/10 min. In further embodiments of the disclosure, the melt index, $I_2$ of the first ethylene copolymer will be from 0.01 to 0.40 g/10 min, or from 0.01 to 0.30 g/10 min, or from 0.01 to 0.25 g/10 min, or from 0.01 to 0.20 g/10 min, or from 0.01 to 0.10 g/10 min.

In an embodiment of the disclosure, the first ethylene copolymer has a weight average molecular weight $M_w$ of from about 110,000 to about 300,000 (g/mol). In another embodiment of the disclosure, the first ethylene copolymer has a weight average molecular weight $M_w$ of from about 110,000 to about 275,000 or from about 110,000 to about 250,000. In another embodiment of the disclosure, the first ethylene copolymer has a weight average molecular weight $M_w$ of greater than about 110,000 to less than about 250,000. In further embodiments of the disclosure, the first ethylene copolymer has a weight average molecular weight $M_w$ of from about 125,000 to about 225,000, or from about 135,000 to about 200,000. In embodiments of the disclosure, the first ethylene copolymer has a weight average molecular weight $M_w$ of from about 125,000 to about 275,000, or from about 125,000 to about 250,000, or from about 150,000 to about 275,000, or from about 150,000 to about 250,000, or from about 175,000 to about 250,000. In embodiments of the disclosure, the first ethylene copolymer has a $M_w$ of greater than 110,000, or greater than 125,000, or greater than 150,000, or greater than 175,000. In embodiments of the disclosure the first ethylene copolymer has a $M_w$ of greater than 110,000, or greater than 125,000, or greater than 150,000, or greater than 175,000 while at the same time being lower than 275,000, or 250,000.

In some embodiments of the disclosure, the density of the first ethylene copolymer is from 0.920 to 0.960 g/cm³ or can be a narrower range within this range and any numbers encompassed by these ranges.

In embodiments of the disclosure, the density of the first ethylene copolymer is from 0.920 to 0.955 g/cm³ or can be a narrower range within this range. For example, in further embodiments of the disclosure, the density of the first ethylene copolymer can be from 0.925 to 0.955 g/cm³, or from 0.925 to 0.950 g/cm³, or from 0.925 to 0.945 g/cm³, or from 0.925 to 0.940 g/cm³, or from 0.925 to 0.935 g/cm³, or from 0.923 to 0.945 g/cm³, or from 0.923 to 0.940 g/cm³, or from 0.923 to 0.935 g/cm³, or from 0.927 to 0.945 g/cm³, or from 0.927 to 0.940 g/cm³, or from 0.927 to 0.935 g/cm³.

In an embodiment of the disclosure, the first ethylene copolymer has a molecular weight distribution $M_w/M_n$ of <3.0, or ≤2.7, or <2.7, or ≤2.5, or <2.5, or ≤2.3, or from 1.8 to 2.3.

The $M_w/M_n$ value of the first ethylene copolymer can in an embodiment of the disclosure be estimated by a deconvolution of a GPC profile obtained for a bimodal polyethylene composition of which the first ethylene copolymer is a component.

The density and the melt index, $I_2$, of the first ethylene copolymer can be estimated from GPC (gel permeation chromatography) and GPC-FTIR (gel permeation chromatography with Fourier transform infra-red detection) experiments and deconvolutions carried out on the bimodal polyethylene composition (see the Examples section).

In an embodiment of the disclosure, the first ethylene copolymer of the polyethylene composition is a homogeneously branched ethylene copolymer having a weight average molecular weight, $M_w$, of at least 110,000; a molecular weight distribution, $M_w/M_n$, of less than 2.7 and a density of from 0.920 to 0.948 g/cm³.

In an embodiment of the present disclosure, the first ethylene copolymer is a homogeneously branched ethylene copolymer and has a $CDBI_{50}$ of greater than about 50%, or greater than about 55% by weight. In further embodiments of the disclosure, the first ethylene copolymer has a CDBI of greater than about 60%, or greater than about 65%, or greater than about 70%, or greater than about 75%, or greater than about 80% by weight.

In an embodiment of the disclosure, the first ethylene copolymer can comprise from 10 to 90 wt. % of the weight of the polyethylene composition (e.g., 10 to 90 weight percent of the total weight of the first ethylene copolymer and the second ethylene copolymer or the ethylene homopolymer). In an embodiment of the disclosure, the first ethylene copolymer can include from 10 to 80 wt. % of the weight of the polyethylene composition (e.g., 10 to 80 weight percent of the total weight of the first ethylene copolymer and the second ethylene copolymer or the ethylene homopolymer). In an embodiment of the disclosure, the first ethylene copolymer can include from 10 to 70 wt. % of the weight of the polyethylene composition (e.g., 10 to 70 weight percent of the total weight of the first ethylene copolymer and the second ethylene copolymer or the ethylene homopolymer). In an embodiment of the disclosure, the first ethylene copolymer can include from 20 to 60 wt. % of the weight of the polyethylene composition (e.g., 20 to 60 weight percent of the total weight of the first ethylene copolymer and the second ethylene copolymer or the ethylene homopolymer). In an embodiment of the disclosure, the first ethylene copolymer can include from 30 to 60 wt. % of the weight of the polyethylene composition (e.g., 30 to 60 weight percent of the total weight of the first ethylene copolymer and the second ethylene copolymer or the ethylene homopolymer). In an embodiment of the disclosure, the first ethylene copolymer can include from 40 to 50 wt. % of the weight of the polyethylene composition (e.g., 40 to 50 weight percent of the total weight of the first ethylene copolymer and the second ethylene copolymer or the ethylene homopolymer).

The Second Ethylene Copolymer

In an embodiment of the disclosure, the second ethylene copolymer has a density which is higher than the density of the first ethylene copolymer.

In an embodiment of the disclosure, the second ethylene copolymer of the polyethylene composition has a density equal to or below 0.967 g/cm³ but which is higher than the density of the first ethylene copolymer; a melt index, $I_2$, of from about 100 to 10,000 g/10 min; a molecular weight distribution, $M_w/M_n$, of below about 3.0 and a weight average molecular weight $M_w$ that is less than the $M_w$ of the first ethylene copolymer. In an embodiment of the disclosure, the weight average molecular weight, $M_w$ of the second ethylene copolymer will be below 45,000.

In an embodiment of the disclosure, the second ethylene copolymer of the polyethylene composition has a density equal to or below 0.967 g/cm³ but which is higher than the density of the first ethylene copolymer; a melt index, $I_2$, of from about 500 to about 20,000 g/10 min; a molecular weight distribution, $M_w/M_n$, of below about 2.7, and a weight average molecular weight $M_w$ that is less than the $M_w$ of the first ethylene copolymer.

In an embodiment of the disclosure, the second ethylene copolymer is homogeneously branched copolymer.

In an embodiment of the disclosure, the second ethylene copolymer is made with a single site catalyst, such as for example a phosphinimine catalyst.

In an embodiment of the disclosure, the comonomer content in the second ethylene copolymer can be from about 0.05 to about 3 mol % as measured by $^{13}C$ NMR, or FTIR, or GPC-FTIR methods. The comonomer content of the second ethylene polymer can also be determined by mathematical deconvolution methods applied to a bimodal polyethylene composition (see the Examples section).

In an embodiment of the disclosure, the comonomer content in the second ethylene copolymer can be from about 0.01 to about 3 mol %, or from about 0.03 to about 3 mol % as measured by $^{13}C$ NMR, or FTIR, or GPC-FTIR methods. The comonomer content of the second ethylene polymer can also be determined by mathematical deconvolution methods applied to a bimodal polyethylene composition (see the Examples section).

In an embodiment of the disclosure, the comonomer in the second ethylene copolymer is one or more alpha-olefin such as but not limited to 1-butene, 1-hexene, 1-octene, and the like.

In an embodiment of the disclosure, the second ethylene copolymer is a copolymer of ethylene and 1-octene.

In an embodiment of the disclosure, the short chain branching in the second ethylene copolymer can be from about 0.25 to about 15 short chain branches per thousand carbon atoms (SCB2/1000Cs). In further embodiments of the disclosure, the short chain branching in the second ethylene copolymer can be from 0.25 to 12, or from 0.25 to 8, or from 0.25 to 5, or from 0.25 to 3, or from 0.25 to 2 branches per thousand carbon atoms (SCB2/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the second ethylene copolymer can be measured by $^{13}C$ NMR, or FTIR, or GPC-FTIR methods. Alternatively, the number of short chain branches in the second ethylene copolymer can be determined by mathematical deconvolution methods applied to a bimodal polyethylene composition (see the Examples section). The comonomer is one or more suitable alpha-olefin such as but not limited to 1-butene, 1-hexene, 1-octene, and the like, with 1-octene being preferred, in some embodiments.

In an embodiment of the disclosure, the short chain branching in the second ethylene copolymer can be from about 0.15 to about 15 short chain branches per thousand carbon atoms (SCB2/1000Cs). In further embodiments of the disclosure, the short chain branching in the second ethylene copolymer can be from 0.15 to 12, or from 0.15 to 8, or from 0.15 to 5, or from 0.15 to 3, or from 0.15 to 2 branches per thousand carbon atoms (SCB2/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the short chain branching in the second ethylene copolymer can be from about 0.05 to about 12 short chain branches per thousand carbon atoms (SCB1/1000Cs). In further embodiments of the disclosure, the short chain branching in the second ethylene copolymer can be from 0.05 to 7.5, or from 0.05 to 5.0, or from 0.05 to 2.5, or from 0.05 to 1.5, or from 0.1 to 12, or from 0.1 to 10, or from 0.1 to 7.5, or from 0.1 to 5.0, or from 0.1 to 2.5, or from 0.1 to 2.0, or from 0.1 to 1.0 branches per thousand carbon atoms (SCB1/1000Cs).

In an embodiment of the disclosure, the short chain branching in the second ethylene copolymer can be from about 0.05 to about 10 short chain branches per thousand carbon atoms (SCB1/1000Cs). In further embodiments of the disclosure, the short chain branching in the second copolymer can be from 0.05 to 7.5, or from 0.05 to 5.0, or from 0.05 to 2.5, or from 0.05 to 1.5, or from 0.1 to 12, or from 0.1 to 10, or from 0.1 to 7.5, or from 0.1 to 5.0, or from 0.1 to 2.5, or from 0.1 to 2.0, or from 0.1 to 1.0 branches per thousand carbon atoms (SCB1/1000Cs). In an embodiment of the disclosure, the comonomer content in the second ethylene copolymer is substantially similar or approximately equal (e.g., within about ±0.01 mol %) to the comonomer content of the first ethylene copolymer (as reported, for example, in mol %).

In an embodiment of the disclosure, the comonomer content in the second ethylene copolymer is less than the comonomer content of the first ethylene copolymer (as reported for example in mol %).

In an embodiment of the disclosure, the amount of short chain branching in the second ethylene copolymer is substantially similar or approximately equal (e.g., within about ±0.05 SCB/1000C) to the amount of short chain branching in the first ethylene copolymer (as reported in short chain branches, SCB per thousand carbons in the polymer backbone, 1000Cs).

In an embodiment of the disclosure, the amount of short chain branching in the second ethylene copolymer is less than the amount of short chain branching in the first ethylene copolymer (as reported in short chain branches, SCB per thousand carbons in the polymer backbone, 1000Cs).

In some embodiments of the disclosure, the density of the second ethylene copolymer is less than 0.970 g/cm$^3$.

In an embodiment of the present disclosure, the density of the second ethylene copolymer is less than 0.967 g/cm$^3$. The density of the second ethylene copolymer in another embodiment of the disclosure is less than 0.966 g/cm$^3$. In another embodiment of the disclosure, the density of the second ethylene copolymer is less than 0.965 g/cm$^3$. In another embodiment of the disclosure, the density of the second ethylene copolymer is less than 0.964 g/cm$^3$. In another embodiment of the disclosure, the density of the second ethylene copolymer is less than 0.963 g/cm$^3$. In another embodiment of the disclosure, the density of the second ethylene copolymer is less than 0.962 g/cm$^3$.

In some embodiments of the disclosure, the density of the second ethylene copolymer is higher than the density of the first ethylene copolymer, but is less than 0.970 g/cm$^3$.

In an embodiment of the present disclosure, the density of the second ethylene copolymer is higher than the density of the first ethylene copolymer, but is less than 0.967 g/cm$^3$. The density of the second ethylene copolymer in another embodiment of the disclosure is higher than the density of the first ethylene copolymer, but is less than 0.966 g/cm$^3$. In another embodiment of the disclosure, the density of the second ethylene copolymer is higher than the density of the first ethylene copolymer, but is less than 0.965 g/cm$^3$. In another embodiment of the disclosure, the density of the second ethylene copolymer is higher than the density of the first ethylene copolymer, but is less than 0.964 g/cm$^3$. In another embodiment of the disclosure, the density of the second ethylene copolymer is higher than the density of the first ethylene copolymer, but is less than 0.963 g/cm$^3$. In another embodiment of the disclosure, the density of the second ethylene copolymer is higher than the density of the first ethylene copolymer, but is less than 0.962 g/cm$^3$.

In an embodiment of the disclosure, the density of the second ethylene copolymer is from 0.952 to 0.967 g/cm$^3$ or can be a narrower range within this range. For example, the density of the second ethylene copolymer may in embodiments of the disclosure be from 0.952 to 0.966 g/cm$^3$, 0.952 to 0.965 g/cm$^3$, or from 0.952 to 0.964 g/cm$^3$, or from 0.952 to 0.963 g/cm$^3$, or from 0.954 to 0.963 g/cm$^3$, or from 0.954 to 0.964 g/cm$^3$, or from 0.956 to 0.964 g/cm$^3$, or from 0.952 to less than 0.965 g/cm$^3$, or from 0.954 to less than 0.965 g/cm$^3$.

In embodiments of the disclosure, the second ethylene copolymer has a weight average molecular weight $M_w$ of less than about 45,000, or less than about 40,000 or less than about 35,000. In another embodiment of the disclosure, the second ethylene copolymer has a weight average molecular weight $M_w$ of from about 7,500 to about 35,000. In further embodiments of the disclosure, the second ethylene copolymer has a weight average molecular weight $M_w$ of from about 9,000 to about 35,000, or from about 10,000 to about 35,000, or from about 12,500 to about 30,000, or from about 10,000 to about 25,000, or from about 10,000 to about 20,000.

In an embodiment of the disclosure, the second ethylene copolymer has a weight average molecular weight $M_w$ of less than 25,000. In another embodiment of the disclosure, the second ethylene copolymer has a weight average molecular weight $M_w$ of from about 7,500 to about 23,000. In further embodiments of the disclosure, the second ethylene copolymer has a weight average molecular weight $M_w$ of from about 9,000 to about 22,000, or from about 10,000 to about 17,500, or from about 7,500 to about 17,500. In still further embodiments of the disclosure, the second ethylene copolymer has a weight average molecular weight $M_w$ of from about 3,500 to about 25,000, or from about 5,000 to about 20,000, or from about 7,500 to about 17,500, or from about 5,000 to about 15,000, or from about 5,000 to about 17,500, or from about 7,500 to about 15,000 or from about 7,500 to about 12,500. In further embodiments of the disclosure, the second ethylene copolymer has a weight average molecular weight $M_w$ of from about 9,000 to about 22,000, or from about 10,000 to about 17,500, or from about 7,500 to 17,500.

In embodiments of the disclosure, the second ethylene copolymer has a molecular weight distribution, $M_w/M_n$ of <3.0, or ≤2.7, or <2.7, or ≤2.5, or <2.5, or ≤2.3, or from 1.8 to 2.3.

The Mw/Mn value of the second ethylene copolymer can in an embodiment of the disclosure be estimated by a de-convolution of a GPC profile obtained for a bimodal polyethylene composition of which the first ethylene copolymer is a component.

In an embodiment of the disclosure, the melt index $I_2$ of the second ethylene copolymer can be at least 20 g/10 min.

In an embodiment of the disclosure, the melt index $I_2$ of the second ethylene copolymer can be from 20 to 10,000 g/10 min. In another embodiment of the disclosure, the melt index $I_2$ of the second ethylene copolymer can be from 100 to 10,000 g/10 min. In yet another embodiment of the disclosure, the melt index $I_2$ of the second ethylene copolymer can be from 1,000 to 7,000 g/10 min. In yet another embodiment of the disclosure, the melt index $I_2$ of the second ethylene copolymer can be from 1,200 to 10,000 g/10 min. In yet another embodiment of the disclosure, the melt index $I_2$ of the second ethylene copolymer can be from 1500 to 10,000 g/10 min. In yet another embodiment of the disclosure, the melt index $I_2$ of the second ethylene copolymer can be greater than 1,500, but less than 7,000 g/10 min.

In an embodiment of the disclosure, the melt index $I_2$ of the second ethylene copolymer can be from 50 to 20,000 g/10 min. In another embodiment of the disclosure, the melt index $I_2$ of the second ethylene copolymer can be from 250 to 20,000 g/10 min. In another embodiment of the disclosure, the melt index $I_2$ of the second ethylene copolymer can be from 500 to 20,000 g/10 min. In another embodiment of the disclosure, the melt index $I_2$ of the second ethylene copolymer can be from 1,000 to 20,000 g/10 min. In yet another embodiment of the disclosure, the melt index $I_2$ of the second ethylene copolymer can be from 1500 to 20,000 g/10 min. In yet another embodiment of the disclosure, the melt index $I_2$ of the second ethylene copolymer can be from 1,500 to 10,000 g/10 min. In yet another embodiment of the disclosure, the melt index $I_2$ of the second ethylene copolymer can be from 1,500 to 7,000 g/10 min. In yet another embodiment of the disclosure, the melt index $I_2$ of the second ethylene copolymer can be greater than 1500, but less than 7,000 g/10 min. In yet another embodiment of the disclosure, the melt index $I_2$ of the second ethylene copolymer can be greater than 1,500, but less than 5,000 g/10 min. In yet another embodiment of the disclosure, the melt index $I_2$ of the second ethylene copolymer can be greater than 1,000, but less than 3,500 g/10 min.

In an embodiment of the disclosure, the melt index $I_2$ of the second ethylene copolymer can be from 250 to 20,000 g/10 min. In another embodiment of the disclosure, the melt index $I_2$ of the second ethylene copolymer can be from 500 to 20,000 g/10 min. In another embodiment of the disclosure, the melt index $I_2$ of the second ethylene copolymer can be from greater than 750 to 20,000 g/10 min. In further embodiments of the disclosure, the melt index $I_2$ of the second ethylene copolymer can be from 1,000 to 20,000 g/10 min, or from 1,500 to 20,000 g/10 min, or from 250 to 15,000 g/10 min, or from 250 to 10,000 g/10 min or from 500 to 17,500 g/10 min, or from 500 to 15,000 g/10 min, or from 1,500 to 15,000 g/10 min. In yet another embodiment of the disclosure, the melt index $I_2$ of the second ethylene copolymer can be from 1,200 to 10,000 g/10 min. In yet another embodiment of the disclosure, the melt index $I_2$ of the second ethylene copolymer can be from 1500 to 10,000 g/10 min. In yet another embodiment of the disclosure, the melt index $I_2$ of the second ethylene copolymer can be greater than 1,500, but less than 7,000 g/10 min.

In an embodiment of the disclosure, the melt index $I_2$ of the second ethylene copolymer is greater than 200 g/10 min. In an embodiment of the disclosure, the melt index $I_2$ of the second ethylene copolymer is greater than 250 g/10 min. In an embodiment of the disclosure, the melt index $I_2$ of the second ethylene copolymer is greater than 500 g/10 min. In an embodiment of the disclosure, the melt index $I_2$ of the second ethylene copolymer is greater than 650 g/10 min. In an embodiment of the disclosure, the melt index $I_2$ of the second ethylene copolymer is greater than 1,000 g/10 min. In an embodiment of the disclosure, the melt index $I_2$ of the second ethylene copolymer is greater than 1,200 g/10 min. In an embodiment of the disclosure, the melt index $I_2$ of the second ethylene copolymer is greater than 1,500 g/10 min. In an embodiment of the disclosure, the melt index $I_2$ of the second ethylene copolymer is greater than 1,750 g/10 min.

The density and the melt index, $I_2$, of the second ethylene copolymer can be estimated from GPC and GPC-FTIR experiments and deconvolutions carried out on a bimodal polyethylene composition (see the below Examples section).

In an embodiment of the disclosure, the second ethylene copolymer of the polyethylene composition is a homogeneous ethylene copolymer having a weight average molecular weight, Mw, of at most 45,000; a molecular weight distribution, $M_w/M_n$, of less than 2.7 and a density higher than the density of the first ethylene copolymer, but less than 0.967 g/cm³.

In an embodiment of the present disclosure, the second ethylene copolymer is homogeneously branched ethylene copolymer and has a $CDBI_{50}$ of greater than about 50 weight %, or of greater than about 55 weight %. In further embodiments of the disclosure, the second ethylene copolymer has a $CDBI_{50}$ of greater than about 60 weight %, or greater than about 65 weight %, or greater than about 70 weight %, or greater than about 75 weight %, or greater than about 80 weight %.

In an embodiment of the disclosure, the second ethylene copolymer can include from 90 to 10 wt. % of the of the polyethylene composition (e.g., 90 to 10 weight percent of the total weight of the first ethylene copolymer and the second ethylene copolymer). In an embodiment of the disclosure, the second ethylene copolymer can include from 90 to 20 wt. % of the of the polyethylene composition (e.g., 90 to 20 weight percent of the total weight of the first ethylene copolymer and the second ethylene copolymer). In an embodiment of the disclosure, the second ethylene copolymer can include from 90 to 30 wt. % of the of the polyethylene composition (e.g., 90 to 30 weight percent of the total weight of the first ethylene copolymer and the second ethylene copolymer). In an embodiment of the disclosure, the second ethylene copolymer can include from 80 to 40 wt. % of the weight of the polyethylene composition (e.g., 80 to 40 weight percent of the total weight of the first ethylene copolymer and the second ethylene copolymer). In an embodiment of the disclosure, the second ethylene copolymer can include from 70 to 40 wt. % of the weight of the polyethylene composition (e.g., 70 to 40 weight percent of the total weight of the first ethylene copolymer and the second ethylene copolymer). In an embodiment of the disclosure, the second ethylene copolymer can include from 60 to 50 wt. % of the weight of the polyethylene composition (e.g., 60 to 50 weight percent of the total weight of the first ethylene copolymer and the second ethylene copolymer).

In an embodiment the present disclosure, the second ethylene copolymer has a density which is higher than the density of the first ethylene copolymer, but less than about 0.037 g/cm$^3$ higher than the density of the first ethylene copolymer. In an embodiment of the disclosure, the second ethylene copolymer has a density which is higher than the density of the first ethylene copolymer, but less than about 0.036 g/cm$^3$ higher than the density of the first ethylene copolymer. In an embodiment of the disclosure, the second ethylene copolymer has a density which is higher than the density of the first ethylene copolymer, but less than about 0.035 g/cm$^3$ higher than the density of the first ethylene copolymer. In an embodiment of the disclosure, the second ethylene copolymer has a density which is higher than the density of the first ethylene copolymer, but less than about 0.034 g/cm$^3$ higher than the density of the first ethylene copolymer. In an embodiment of the disclosure, the second ethylene copolymer has a density which is higher than the density of the first ethylene copolymer, but less than about 0.033 g/cm$^3$ higher than the density of the first ethylene copolymer. In an embodiment of the disclosure, the second ethylene copolymer has a density which is higher than the density of the first ethylene copolymer, but less than about 0.032 g/cm$^3$ higher than the density of the first ethylene copolymer. In another embodiment of the disclosure, the second ethylene copolymer has a density which is higher than the density of the first ethylene copolymer, but less than about 0.031 g/cm$^3$ higher than the density of the first ethylene copolymer. In still another embodiment of the disclosure, the second ethylene copolymer has a density which is higher than the density of the first ethylene copolymer, but less than about 0.030 g/cm$^3$ higher than the density of the first ethylene copolymer.

In embodiments of the disclosure, the $I_2$ of the second ethylene copolymer is at least 20 times, or at least 100 times, or at least 1000 times, or at least 10,000, or at least 50,000 times the $I_2$ of the first ethylene copolymer.

The Ethylene Homopolymer

In an embodiment of the disclosure, the ethylene homopolymer has a density which is higher than the density of the first ethylene copolymer.

In an embodiment of the disclosure, the ethylene homopolymer of the polyethylene composition has a density equal to or below 0.967 g/cm$^3$ but which is higher than the density of the first ethylene copolymer; a melt index, $I_2$, of from about 100 to 10,000 g/10 min; a molecular weight distribution, $M_w/M_n$, of below about 3.0 and a weight average molecular weight $M_w$ that is less than the $M_w$ of the first ethylene copolymer. In an embodiment of the disclosure, the weight average molecular weight, $M_w$ of the ethylene homopolymer will be below 45,000.

In an embodiment of the disclosure, the ethylene homopolymer of the polyethylene composition has a density equal to or below 0.967 g/cm$^3$ but which is higher than the density of the first ethylene copolymer; a melt index, $I_2$, of from about 500 to about 20,000 g/10 min; a molecular weight distribution, $M_w/M_n$, of below about 2.7, and a weight average molecular weight $M_w$ that is less than the $M_w$ of the first ethylene copolymer.

In an embodiment of the disclosure, the ethylene homopolymer is made with a single site catalyst, such as for example a phosphinimine catalyst.

In some embodiments of the disclosure, the density of the ethylene homopolymer is less than 0.970 g/cm$^3$.

In an embodiment of the present disclosure, the density of the ethylene homopolymer is less than 0.967 g/cm$^3$. The density of the ethylene homopolymer in another embodiment of the disclosure is less than 0.966 g/cm$^3$. In another embodiment of the disclosure, the density of the ethylene homopolymer is less than 0.965 g/cm$^3$. In another embodiment of the disclosure, the density of the ethylene homopolymer is less than 0.964 g/cm$^3$. In another embodiment of the disclosure, the density of the ethylene homopolymer is less than 0.963 g/cm$^3$. In another embodiment of the disclosure, the density of the ethylene homopolymer is less than 0.962 g/cm$^3$.

In some embodiments of the disclosure, the density of the ethylene homopolymer is higher than the density of the first ethylene copolymer, but is less than 0.970 g/cm$^3$.

In an embodiment of the present disclosure, the density of the ethylene homopolymer is higher than the density of the first ethylene copolymer, but is less than 0.967 g/cm$^3$. The density of the ethylene homopolymer in another embodiment of the disclosure is higher than the density of the first ethylene copolymer, but is less than 0.966 g/cm$^3$. In another embodiment of the disclosure, the density of the ethylene homopolymer is higher than the density of the first ethylene copolymer, but is less than 0.965 g/cm$^3$. In another embodiment of the disclosure, the density of the ethylene homopolymer is higher than the density of the first ethylene copolymer, but is less than 0.964 g/cm$^3$. In another embodiment of the disclosure, the density of the ethylene homopolymer is higher than the density of the first ethylene copolymer, but is less than 0.963 g/cm$^3$. In another embodiment of the disclosure, the density of the ethylene homopolymer is higher than the density of the first ethylene copolymer, but is less than 0.962 g/cm$^3$.

In an embodiment of the disclosure, the density of the ethylene homopolymer is from 0.952 to 0.967 g/cm$^3$ or can be a narrower range within this range. For example, the density of the ethylene homopolymer may in embodiments of the disclosure be from 0.952 to 0.966 g/cm$^3$, 0.952 to 0.965 g/cm$^3$, or from 0.952 to 0.964 g/cm$^3$, or from 0.952 to 0.963 g/cm$^3$, or from 0.954 to 0.963 g/cm$^3$, or from 0.954 to 0.964 g/cm$^3$, or from 0.956 to 0.964 g/cm$^3$, or from 0.952 to less than 0.965 g/cm$^3$, or from 0.954 to less than 0.965 g/cm$^3$.

In embodiments of the disclosure, the ethylene homopolymer has a weight average molecular weight $M_w$ of less than about 45,000, or less than about 40,000 or less than about 35,000. In another embodiment of the disclosure, the ethylene homopolymer has a weight average molecular weight $M_w$ of from about 7,500 to about 35,000. In further embodiments of the disclosure, the ethylene homopolymer has a weight average molecular weight $M_w$ of from about 9,000 to about 35,000, or from about 10,000 to about 35,000, or from about 12,500 to about 30,000, or from about 10,000 to about 25,000, or from about 10,000 to about 20,000.

In an embodiment of the disclosure, the ethylene homopolymer has a weight average molecular weight $M_w$ of less than 25,000. In another embodiment of the disclosure, the ethylene homopolymer has a weight average molecular weight $M_w$ of from about 7,500 to about 23,000. In further embodiments of the disclosure, the ethylene homopolymer has a weight average molecular weight $M_w$ of from about 9,000 to about 22,000, or from about 10,000 to about 17,500, or from about 7,500 to about 17,500. In still further embodiments of the disclosure, the ethylene homopolymer has a weight average molecular weight $M_w$ of from about 3,500 to about 25,000, or from about 5,000 to about 20,000, or from about 7,500 to about 17,500, or from about 5,000 to about 15,000, or from about 5,000 to about 17,500, or from about 7,500 to about 15,000 or from about 7,500 to about 12,500. In further embodiments of the disclosure, the ethylene homopolymer has a weight average molecular weight $M_w$ of from about 9,000 to about 22,000, or from about 10,000 to about 17,500, or from about 7,500 to 17,500.

In embodiments of the disclosure, the ethylene homopolymer has a molecular weight distribution, $M_w/M_n$ of <3.0, or ≤2.7, or <2.7, or ≤2.5, or <2.5, or ≤2.3, or from 1.8 to 2.3.

The Mw/Mn value of the ethylene homopolymer can in an embodiment of the disclosure be estimated by a de-convolution of a GPC profile obtained for a bimodal polyethylene composition of which the first ethylene copolymer is a component.

In an embodiment of the disclosure, the melt index $I_2$ of the ethylene homopolymer can be at least 20 g/10 min.

In an embodiment of the disclosure, the melt index $I_2$ of the ethylene homopolymer can be from 20 to 10,000 g/10 min. In another embodiment of the disclosure, the melt index $I_2$ of the ethylene homopolymer can be from 100 to 10,000 g/10 min. In yet another embodiment of the disclosure, the melt index $I_2$ of the ethylene homopolymer can be from 1,000 to 7,000 g/10 min. In yet another embodiment of the disclosure, the melt index $I_2$ of the ethylene homopolymer can be from 1,200 to 10,000 g/10 min. In yet another embodiment of the disclosure, the melt index $I_2$ of the ethylene homopolymer can be from 1,500 to 10,000 g/10 min. In yet another embodiment of the disclosure, the melt index $I_2$ of the ethylene homopolymer can be greater than 1,500, but less than 7,000 g/10 min.

In an embodiment of the disclosure, the melt index $I_2$ of the ethylene homopolymer can be from 50 to 20,000 g/10 min. In another embodiment of the disclosure, the melt index $I_2$ of the ethylene homopolymer can be from 250 to 20,000 g/10 min. In another embodiment of the disclosure, the melt index $I_2$ of the ethylene homopolymer can be from 500 to 20,000 g/10 min. In another embodiment of the disclosure, the melt index $I_2$ of the ethylene homopolymer can be from 1,000 to 20,000 g/10 min. In yet another embodiment of the disclosure, the melt index $I_2$ of the ethylene homopolymer can be from 1,500 to 20,000 g/10 min. In yet another embodiment of the disclosure, the melt index $I_2$ of the ethylene homopolymer can be from 1,500 to 10,000 g/10 min. In yet another embodiment of the disclosure, the melt index $I_2$ of the ethylene homopolymer can be from 1,500 to 7,000 g/10 min. In yet another embodiment of the disclosure, the melt index $I_2$ of the ethylene homopolymer can be greater than 1,500, but less than 7,000 g/10 min. In yet another embodiment of the disclosure, the melt index $I_2$ of the ethylene homopolymer can be greater than 1,500, but less than 5,000 g/10 min. In yet another embodiment of the disclosure, the melt index $I_2$ of the ethylene homopolymer can be greater than 1,000, but less than 3,500 g/10 min.

In an embodiment of the disclosure, the melt index $I_2$ of the ethylene homopolymer can be from 250 to 20,000 g/10 min. In another embodiment of the disclosure, the melt index $I_2$ of the ethylene homopolymer can be from 500 to 20,000 g/10 min. In another embodiment of the disclosure, the melt index $I_2$ of the ethylene homopolymer can be from greater than 750 to 20,000 g/10 min. In further embodiments of the disclosure, the melt index $I_2$ of the ethylene homopolymer can be from 1,000 to 20,000 g/10 min, or from 1,500 to 20,000 g/10 min, or from 250 to 15,000 g/10 min, or from 250 to 10,000 g/10 min or from 500 to 17,500 g/10 min, or from 500 to 15,000 g/10 min, or from 1,500 to 15,000 g/10 min. In yet another embodiment of the disclosure, the melt index $I_2$ of the ethylene homopolymer can be from 1,200 to 10,000 g/10 min. In yet another embodiment of the disclosure, the melt index $I_2$ of the ethylene homopolymer can be from 1,500 to 10,000 g/10 min. In yet another embodiment of the disclosure, the melt index $I_2$ of the ethylene homopolymer can be greater than 1,500, but less than 7,000 g/10 min.

In an embodiment of the disclosure, the melt index $I_2$ of the ethylene homopolymer is greater than 200 g/10 min. In an embodiment of the disclosure, the melt index $I_2$ of the ethylene homopolymer is greater than 250 g/10 min. In an embodiment of the disclosure, the melt index $I_2$ of the ethylene homopolymer is greater than 500 g/10 min. In an embodiment of the disclosure, the melt index $I_2$ of the ethylene homopolymer is greater than 650 g/10 min. In an embodiment of the disclosure, the melt index $I_2$ of the ethylene homopolymer is greater than 1000 g/10 min. In an embodiment of the disclosure, the melt index $I_2$ of the ethylene homopolymer is greater than 1,200 g/10 min. In an embodiment of the disclosure, the melt index $I_2$ of the ethylene homopolymer is greater than 1,500 g/10 min. In an embodiment of the disclosure, the melt index $I_2$ of the ethylene homopolymer is greater than 1,750 g/10 min.

The density and the melt index, $I_2$, of the ethylene homopolymer can be estimated from GPC and GPC-FTIR experiments and deconvolutions carried out on a bimodal polyethylene composition (see the below Examples section).

In an embodiment of the disclosure, the ethylene homopolymer of the polyethylene composition is a homogeneous ethylene copolymer having a weight average molecular weight, $M_w$, of at most 45,000; a molecular weight distribution, $M_w/M_n$, of less than 2.7 and a density higher than the density of the first ethylene copolymer, but less than 0.967 g/cm³.

In an embodiment of the disclosure, the ethylene homopolymer can include from 90 to 10 wt. % of the of the polyethylene composition (e.g., 90 to 10 weight percent of the total weight of the first ethylene copolymer and the ethylene homopolymer). In an embodiment of the disclosure, the ethylene homopolymer can include from 90 to 20 wt. % of the of the polyethylene composition (e.g., 90 to 20 weight percent of the total weight of the first ethylene copolymer and the ethylene homopolymer). In an embodiment of the disclosure, the ethylene homopolymer can include from 90 to 30 wt. % of the of the polyethylene composition (e.g., 90 to 30 weight percent of the total weight of the first ethylene copolymer and the ethylene homopolymer). In an embodiment of the disclosure, the ethylene homopolymer can include from 80 to 40 wt. % of the weight of the polyethylene composition (e.g., 80 to 40 weight percent of the total weight of the first ethylene copolymer and the ethylene homopolymer). In an embodiment of the disclosure, the ethylene homopolymer can include from 70 to 40 wt. % of the weight of the polyethylene composition (i.e. e.g., 70 to 40 weight percent of the total weight of the first ethylene copolymer and the ethylene homopolymer). In an embodiment of the disclosure, the ethylene homopolymer can include from 60 to 50 wt. % of the weight of the polyethylene composition (e.g., 60 to 50 weight percent of the total weight of the first ethylene copolymer and the ethylene homopolymer).

In an embodiment the present disclosure, the ethylene homopolymer has a density which is higher than the density of the first ethylene copolymer, but less than about 0.037 g/cm$^3$ higher than the density of the first ethylene copolymer. In an embodiment of the disclosure, the ethylene homopolymer has a density which is higher than the density of the first ethylene copolymer, but less than about 0.036 g/cm$^3$ higher than the density of the first ethylene copolymer. In an embodiment of the disclosure, the ethylene homopolymer has a density which is higher than the density of the first ethylene copolymer, but less than about 0.035 g/cm$^3$ higher than the density of the first ethylene copolymer. In an embodiment of the disclosure, the ethylene homopolymer has a density which is higher than the density of the first ethylene copolymer, but less than about 0.034 g/cm$^3$ higher than the density of the first ethylene copolymer. In an embodiment of the disclosure, the ethylene homopolymer has a density which is higher than the density of the first ethylene copolymer, but less than about 0.033 g/cm$^3$ higher than the density of the first ethylene copolymer. In an embodiment of the disclosure, the ethylene homopolymer has a density which is higher than the density of the first ethylene copolymer, but less than about 0.032 g/cm$^3$ higher than the density of the first ethylene copolymer. In another embodiment of the disclosure, the ethylene homopolymer has a density which is higher than the density of the first ethylene copolymer, but less than about 0.031 g/cm$^3$ higher than the density of the first ethylene copolymer. In still another embodiment of the disclosure, the ethylene homopolymer has a density which is higher than the density of the first ethylene copolymer, but less than about 0.030 g/cm$^3$ higher than the density of the first ethylene copolymer.

In embodiments of the disclosure, the $I_2$ of the ethylene homopolymer is at least 20 times, or at least 100 times, or at least 1000 times, or at least 10,000, or at least 50,000 times the $I_2$ of the first ethylene copolymer.

The Polyethylene Composition

In embodiments of the disclosure, the polyethylene composition has a broad, bimodal or multimodal molecular weight distribution.

In an embodiment of the disclosure, the polyethylene composition will include a first ethylene copolymer and a second ethylene copolymer or an ethylene homopolymer, which are of different weight average molecular weight ($M_w$) and/or melt index, $I_2$ than the first ethylene copolymer In an embodiment of the present disclosure, the polyethylene composition will minimally include a first ethylene copolymer and a second ethylene copolymer (as defined above) and the ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) will be greater than 0.5 (i.e., SCB1/SCB2>0.5).

In an embodiment of the present disclosure, the polyethylene composition will minimally include a first ethylene copolymer and an ethylene homopolymer (as defined above).

In an embodiment of the disclosure, the ratio of the short chain branching in the first ethylene copolymer (SCB1) to the short chain branching in the second ethylene copolymer (SCB2) is at least 0.60. In an embodiment of the disclosure, the ratio of the short chain branching in the first ethylene copolymer (SCB1) to the short chain branching in the second ethylene copolymer (SCB2) is at least 0.75. In another embodiment of the disclosure, the ratio of the short chain branching in the first ethylene copolymer (SCB1) to the short chain branching in the second ethylene copolymer (SCB2) is at least 1.0. In another embodiment of the disclosure, the ratio of the short chain branching in the first ethylene copolymer (SCB1) to the short chain branching in the second ethylene copolymer (SCB2) is at greater than 1.10. In yet another embodiment of the disclosure, the ratio of the short chain branching in the first ethylene copolymer (SCB1) to the short chain branching in the second ethylene copolymer (SCB2) is at least 1.25. In still further embodiments of the disclosure, the ratio of the short chain branching in the first ethylene copolymer (SCB1) to the short chain branching in the second ethylene copolymer (SCB2) is at least 1.5, or at least 2.0, or at least 2.5, or at least 3.0, or at least 3.5, or at least 4.0 or at least 4.5.

In an embodiment of the disclosure, the ratio of the short chain branching in the first ethylene copolymer (SCB1) to the short chain branching in the second ethylene copolymer (SCB2) will be greater than 0.5, but less than 1.0.

In embodiments of the disclosure, the ratio (SCB1/SCB2) of the short chain branching in the first ethylene copolymer (SCB1) to the short chain branching in the second ethylene copolymer (SCB2) will be from 1.0 to 12.0, or from 1.0 to 10, or from 1.0 to 7.0, or from 1.0 to 5.0, or from 1.0 to 3.0.

In embodiments of the disclosure, the ratio (SCB1/SCB2) of the short chain branching in the first ethylene copolymer (SCB1) to the short chain branching in the second ethylene copolymer (SCB2) will be from 1.0 to 15.0, or from 2.0 to 12.0, or from 2.5 to 12.0, or from 3.0 to 12.0, or from 3.5 to 12.0.

In an embodiment of the disclosure, the polyethylene composition has a bimodal molecular weight distribution. In the current disclosure, the term "bimodal" means that the polyethylene composition includes at least two components, one of which has a lower weight average molecular weight and a higher density and another of which has a higher weight average molecular weight and a lower density. Typically, a bimodal or multimodal polyethylene composition can be identified by using gel permeation chromatography (GPC). Generally, the GPC chromatograph will exhibit two or more component ethylene copolymers, where the number of component ethylene copolymers corresponds to the number of discernible peaks. One or more component ethylene copolymers may also exist as a hump, shoulder or tail relative to the molecular weight distribution of the other ethylene copolymer component.

In an embodiment of the disclosure, the polyethylene composition has a density of greater than or equal to 0.949 g/cm$^3$, as measured according to ASTM D792; a melt index, $I_2$, of from about 0.4 to about 5.0 g/10 min, as measured according to ASTM D1238 (when conducted at 190° C., using a 2.16 kg weight); a molecular weight distribution, $M_w/M_n$, of from about 3 to about 11, a Z-average molecular weight, $M_z$ of less than 400,000, a stress exponent of less than 1.50 and an ESCR Condition B at 10% IGEPAL® CO-630 and 50° C. of at least 20 hours.

In an embodiment of the disclosure, the polyethylene composition of the current disclosure has a density of greater than or equal to 0.949 g/cm$^3$, as measured according to ASTM D792; a melt index, $I_2$, of from about 0.2 to about 5.0 g/10 min, as measured according to ASTM D1238 (when conducted at 190° C., using a 2.16 kg weight); a molecular weight distribution, $M_w/M_n$, of from about 6 to about 13, a Z-average molecular weight, $M_z$ of less than 450,000, a stress exponent of less than 1.50 and an ESCR Condition B at 10% IGEPAL® CO-630 and 50° C. of at least 200 hours.

In embodiments of the disclosure, the polyethylene composition has a comonomer content of less than 0.75 mol %, or less than 0.70 mol %, or less than 0.65 mol %, or less than 0.60 mol %, or less than 0.55 mol % as measured by FTIR or $^{13}$C NMR methods, with $^{13}$C NMR being preferred, where the comonomer is one or more suitable alpha-olefins such as but not limited to 1-butene, 1-hexene, 1-octene and the like. In an embodiment of the disclosure, the polyethylene composition has a comonomer content of from 0.1 to 0.75 mol %, or from 0.20 to 0.55 mol %, or from 0.25 to 0.50 mol %.

In the present disclosure, the polyethylene composition has a density of at least 0.949 g/cm$^3$. In further embodiments of the disclosure, the polyethylene composition has a density of >0.949 g/cm$^3$, or ≥0.950 g/cm$^3$, or >0.950 g/cm$^3$, or ≥0.953 g/cm$^3$, or ≥0.955 g/cm$^3$, or >0.955 g/cm$^3$.

In an embodiment of the current disclosure, the polyethylene composition has a density in the range of from 0.949 to 0.969 g/cm$^3$.

In an embodiment of the current disclosure, the polyethylene composition has a density in the range of from 0.949 to 0.960 g/cm$^3$.

In an embodiment of the current disclosure, the polyethylene composition has a density in the range of from 0.949 to 0.959 g/cm$^3$.

In an embodiment of the current disclosure, the polyethylene composition has a density in the range of from 0.949 to 0.957 g/cm$^3$.

In an embodiment of the current disclosure, the polyethylene composition has a density in the range of from 0.949 to 0.956 g/cm$^3$.

In an embodiment of the current disclosure, the polyethylene composition has a density in the range of from 0.949 to 0.955 g/cm$^3$.

In an embodiment of the current disclosure, the polyethylene composition has a density in the range of from 0.950 to 0.955 g/cm$^3$.

In an embodiment of the current disclosure, the polyethylene composition has a density in the range of from 0.951 to 0.957 g/cm$^3$.

In an embodiment of the current disclosure, the polyethylene composition has a density in the range of from 0.951 to 0.955 g/cm$^3$.

In an embodiment of the disclosure, the polyethylene composition has a melt index, $I_2$, of from 0.1 to 5.0 g/10 min according to ASTM D1238 (when conducted at 190° C., using a 2.16 kg weight) including narrower ranges within this range and all the numbers within this range. For example, in further embodiments of the disclosure, the polyethylene composition has a melt index, $I_2$, of from 0.3 to 4.0 g/10 min, or from 0.4 to 3.5 g/10 min, or from 0.4 to 3.0 g/10 min, or from 0.3 to 3.5 g/10 min, or from 0.3 to 3.0 g/10 min, or from 0.3 to 2.5 g/10 min, or from 0.1 to 4.0 g/10 min, or from 0.1 to 3.5 g/10 min, or from 0.1 to 3.0 g/10 min, or from 0.1 to 2.5 g/10 min, or from 0.1 to 2.0 g/10 min, or from 0.1 to 1.5 g/10 min, or from 0.25 to 1.5 g/10 min, or from 0.3 to 2.0 g/10 min, or from 0.3 to 1.5 g/10 min, or less than 1.0 g/10 min, or from greater than 0.1 to less than 1.0 g/10 min, or from greater than 0.2 to less than 1.0 g/10 min, or from greater than 0.3 to less than 1.0 g/10 min.

In an embodiment of the disclosure, the polyethylene composition has a melt index, $I_2$, of between 0.4 and 5.0 g/10 min according to ASTM D1238 (when conducted at 190° C., using a 2.16 kg weight) and including narrower ranges within this range. For example, in further embodiments of the disclosure, the polyethylene composition has a melt index, $I_2$, of from 0.5 to 5.0 g/10 min, or from 0.4 to 3.5 g/10 min, or from 0.4 to 3.0 g/10 min, or from 0.4 to 2.5 g/10 min, or from 0.4 to 2.0 g/10 min, or from 0.5 to 3.5 g/10 min, or from 0.5 to 3.0 g/10 min, or from 1.0 to 3.0 g/10 min, or from about 1.0 to about 2.0 g/10 min, or from more than 0.5 to less than 2.0 g 10/min.

In an embodiment of the disclosure, the polyethylene composition has a melt index, $I_2$, of between 0.1 and 5.0 g/10 min according to ASTM D1238 (when conducted at 190° C., using a 2.16 kg weight) and including narrower ranges within this range. For example, in further embodiments of the disclosure, the polyethylene composition has a melt index, $I_2$, of from 0.2 to 5.0 g/10 min, or from 0.3 to 4.0 g/10 min, or from 0.3 to 3.5 g/10 min, or from 0.3 to 3.0 g/10 min, or from 0.2 to 3.5 g/10 min, or from 0.2 to 3.0 g/10 min, or from 0.1 to 2.5 g/10 min, or from 0.1 to 2.0 g/10 min.

In an embodiment of the disclosure, the polyethylene composition has a melt index $I_5$ of at least 1.0 g/10 min according to ASTM D1238 (when conducted at 190° C., using a 5 kg weight). In another embodiment of the disclosure, the polyethylene composition has a melt index, $I_5$, of greater than about 1.1 g/10 min, as measured according to ASTM D1238 (when conducted at 190° C., using a 5 kg weight). In still further embodiments of the disclosure, the polyethylene composition has a melt index $I_5$ of from about 1.0 to about 10.0 g/10 min, or from about 2.0 to about 8.0 g/10 min, or from about 1.0 to about 5.0 g/10 min, or from about 1.5 to about 6.5 g/10 min, or from about 4.0 to about 7.0 g/10 min, or from about 3.0 to about 6.5 g/10 min. In still further embodiments of the disclosure, the polyethylene composition has a melt index $I_5$ of from about 1.0 to about 5.0 g/10 min, or from about 1.5 to about 5.0 g/10 min, or from about 2.0 to about 5.0 g/10 min, or from about 2.0 to about 4.5 g/10 min.

In an embodiment of the disclosure, the polyethylene composition has a high load melt index, $I_{21}$ of at least 25 g/10 min according to ASTM D1238 (when conducted at 190° C., using a 21 kg weight). In another embodiment of the disclosure, the polyethylene composition has a high load melt index, $I_{21}$, of greater than about 30 g/10 min. In yet another embodiment of the disclosure, the polyethylene composition has a high load melt index, $I_{21}$, of greater than about 35 g/10 min. In still another embodiment of the disclosure, the polyethylene composition has a high load melt index, $I_{21}$, of greater than about 40 g/10 min. In still another embodiment of the disclosure, the polyethylene composition has a high load melt index, $I_{21}$, of greater than about 50 g/10 min. In still another embodiment of the disclosure, the polyethylene composition has a high load melt index, $I_{21}$, of greater than about 60 g/10 min. In yet another embodiment of the disclosure, the polyethylene composition has a high load melt index, $I_{21}$, of greater than about 65 g/10 min.

In still another embodiment of the disclosure, the polyethylene composition has a high load melt index, $I_{21}$, of greater than about 75 g/10 min.

In an embodiment of the disclosure, the ratio of the melt index, $I_2$, of the second ethylene copolymer to the melt index, $I_5$, of the polyethylene composition is from 200 to 1500. In another embodiment of the disclosure, the ratio of the melt index, $I_2$, of the second ethylene copolymer to the melt index, $I_5$, of the polyethylene composition is from 400 to 1300. In yet another embodiment of the disclosure, the ratio of the melt index, $I_2$, of the second ethylene copolymer to the melt index, $I_5$, of the polyethylene composition is from 600 to 1200.

In an embodiment of the disclosure, the ratio of the melt index, $I_2$, of the ethylene homopolymer to the melt index, $I_5$, of the polyethylene composition is from 200 to 1500. In another embodiment of the disclosure, the ratio of the melt index, $I_2$, of the ethylene homopolymer to the melt index, $I_5$, of the polyethylene composition is from 400 to 1300. In yet another embodiment of the disclosure, the ratio of the melt index, $I_2$, of the ethylene homopolymer to the melt index, $I_5$, of the polyethylene composition is from 600 to 1200.

In an embodiment of the disclosure, the ratio of the melt index, $I_2$, of the second ethylene copolymer to the melt index, $I_5$, of the polyethylene composition is from 200 to 2000. In another embodiment of the disclosure, the ratio of the melt index, $I_2$, of the second ethylene copolymer to the melt index, $I_5$, of the polyethylene composition is from 400 to 1300. In yet another embodiment of the disclosure, the ratio of the melt index, $I_2$, of the second ethylene copolymer to the melt index, $I_5$, of the polyethylene composition is from 600 to 1200.

In an embodiment of the disclosure, the ratio of the melt index, $I_2$, of the second ethylene copolymer to the melt index, $I_5$, of the polyethylene composition is from 500 to 5,000. In another embodiment of the disclosure, the ratio of the melt index, $I_2$, of the second ethylene copolymer to the melt index, $I_5$, of the polyethylene composition is from 750 to 4,500. In yet another embodiment of the disclosure, the ratio of the melt index, $I_2$, of the second ethylene copolymer to the melt index, $I_5$, of the polyethylene composition is from 1,000 to 4,000.

In an embodiment of the disclosure, the ratio of the melt index, $I_2$, of the ethylene homopolymer to the melt index, $I_5$, of the polyethylene composition is from 500 to 5,000. In another embodiment of the disclosure, the ratio of the melt index, $I_2$, of the ethylene homopolymer to the melt index, $I_5$, of the polyethylene composition is from 7,50 to 4,500. In yet another embodiment of the disclosure, the ratio of the melt index, $I_2$, of the ethylene homopolymer to the melt index, $I_5$, of the polyethylene composition is from 1,000 to 4,000.

In an embodiment of the disclosure, the polyethylene composition has a complex viscosity, $\eta^*$ at a shear stress (G*) anywhere between from about 1 to about 10 kPa which is between 1,000 to 25,000 Pa·s. In an embodiment of the disclosure, the polyethylene composition has a complex viscosity, $\eta^*$ at a shear stress (G*) anywhere from about 1 to about 10 kPa which is between 1,000 and 10,000 Pa·s.

In an embodiment of the disclosure, the polyethylene composition has a complex viscosity, $\eta^*$ at a shear stress (G*) anywhere between from about 1 to about 10 kPa which is between 1,000 and 25,000 Pa·s. In an embodiment of the disclosure, the polyethylene composition has a complex viscosity, $\eta^*$ at a shear stress (G*) anywhere from about 1 to about 10 kPa which is between 1,000 and 10,000 Pa·s, or between 1,000 and 15,000 Pa·s, or from 3,000 to 12,500 Pa·s. In an embodiment of the disclosure, the polyethylene composition has a complex viscosity, $\eta^*$ at a shear stress (G*) anywhere from about 1 to about 10 kPa which is between 1,000 and 15,000, or from 5,000 to 15,000.

In an embodiment of the disclosure, the polyethylene composition has a number average molecular weight, $M_n$, of below about 30,000. In another embodiment of the disclosure, the polyethylene composition has a number average molecular weight, $M_n$, of below about 20,000 or below about 17,500. In further embodiments of the disclosure, the polyethylene composition has a number average molecular weight, $M_n$, of from about 5,000 to 25,000, or from about 5,000 to 20,000, or from about 7,000 to 15,000. In further embodiments of the disclosure, the polyethylene composition has a number average molecular weight, $M_n$, of below about 20,000 or below about 17,500. In further embodiments of the disclosure, the polyethylene composition has a number average molecular weight, $M_n$, of from about 9,000 to 28,000, or from about 10,000 to 25,000, or from about 10,000 to about 20,000.

In embodiments of the disclosure, the polyethylene composition has a weight average molecular weight, $M_w$, of from about 60,000 to about 200,000 including narrower ranges within this range and the numbers within this range. For example, in further embodiments of the disclosure, the polyethylene composition has a weight average molecular weight, $M_w$, of from about 65,000 to 175,000, or from about 65,000 to about 150,000, or from about 65,000 to about 140,000. In embodiments of the disclosure, the polyethylene composition has a weight average molecular weight, $M_w$, of from about 65,000 to about 200,000 including narrower ranges within this range and the numbers within this range. For example, in further embodiments of the disclosure, the polyethylene composition has a weight average molecular weight, $M_w$, of from about 75,000 to about 175,000, or from about 90,000 to about 150,000, or from about 100,000 to about 140,000.

In an embodiment of the disclosure, the polyethylene composition has a z-average molecular weight, $M_z$, of less than 450,000.

In embodiments of the disclosure, the polyethylene composition has a z-average molecular weight, $M_z$ of from 250,000 to 450,000 including narrower ranges within this range and the numbers within this range. For example, in further embodiments of the disclosure, the polyethylene composition has a z-average molecular weight, $M_w$, of from 250,000 to 425,000, or from 275,000 to 425,000, or from 250,000 to below 450,000, or from 250,000 to 410,000.

In embodiments of the disclosure, the polyethylene composition has a z-average molecular weight, $M_z$, of from 400,000 to 520,000 including narrower ranges within this range and the numbers within this range. For example, in further embodiments of the disclosure, the polyethylene composition has a z-average molecular weight, $M_z$, of from 400,000 to 510,000, or from 400,000 to 500,000, or from 400,000 to 490,000, or from 410,000 to 480,000.

In embodiments of the disclosure, the polyethylene composition has a z-average molecular weight, $M_z$ which satisfies: $400,000 < M_z < 500,000$ or $400,000 \leq M_z \leq 500,000$.

In embodiments of the present disclosure, the polyethylene composition has a molecular weight distribution $M_w/M_n$ of from 3.0 to 13.0, including narrower ranges within this range and all the numbers within this range. For example, in further embodiments of the disclosure, the polyethylene composition has a $M_w/M_n$ of from 5.0 to 13.0, or from 4.0 to 12.0, or from 5.0 to 12.0 or from 6.0 to 12.0, or from 6.0 to 11.0, or from 5.0 to 12.0, or from 5.0 to 10.0, or from 6.0 to 10.0, or from 6.0 to 11.0, or from 7.0 to 11.0, or from greater than 7.0 to 11.0, or from 7.0 to 10.0, or from greater than 7.0 to 12.0.

In embodiments of the present disclosure, the polyethylene composition has a molecular weight distribution $M_w/M_n$ of from 3.0 to 11.0 or a narrower range within this range. For example, in further embodiments of the disclosure, the polyethylene composition has a $M_w/M_n$ of from 4.0 to 10.0, or from 4.0 to 9.0 or from 5.0 to 10.0, or from 5.0 to 9.0, or from 4.5 to 10.0, or from 4.5 to 9.5, or from 4.5 to 9.0, or from 4.5 to 8.5, or from 5.0 to 8.5.

In embodiments of the present disclosure, the polyethylene composition has a molecular weight distribution $M_w/M_n$ of from 6.0 to 13.0 or a narrower range within this range. For example, in further embodiments of the disclosure, the polyethylene composition has a $M_w/M_n$ of from 7.0 to 12.0, or from 8.0 to 12.0, or from 8.5 to 12.0, or from 9.0 to 12.0, or from 9.0, to 12.5 or from 8.5 to 12.5.

In embodiments of the disclosure, the polyethylene composition has a ratio of Z-average molecular weight to weight average molecular weight ($M_z/M_w$) of from 2.0 to 5.0, or from 2.25 to 4.75, or from 2.25 to 4.5, or from 2.5 to 4.25, or from 2.75 to 4.0, or from 2.75 to 3.75, or between 3.0 and 4.0. In embodiments of the disclosure, the polyethylene composition has a ratio of Z-average molecular weight to weight average molecular weight ($M_z/M_w$) of from 2.25 to 5.0, or from 2.5 to 4.5, or from 2.75 to 5.0, or from 2.75 to 4.25, or from 3.0 to 4.0.

In embodiments of the disclosure, the polyethylene composition has a ratio of Z-average molecular weight to weight average molecular weight ($M_z/M_w$) of less than 5.0, or less than 4.5, or less than 4.0, or less than 3.5.

In an embodiment of the disclosure, the polyethylene composition has a broadness factor defined as $(M_w/M_n)/(M_z/M_w)$ of at least 2.70, or at least 2.75, or at least 2.8, or at least 2.85, or at least 2.90, or at least 2.95, or at least 3.00, or at least 3.05. In an embodiment of the disclosure, the polyethylene composition has a broadness factor defined as $(M_w/M_n)/(M_z/M_w)$ of less than 3.00, or less than 2.95, or less than 2.90, or less than 2.85, or less than 2.80, or less than 2.75, or less than 2.70, or less than 2.65, or less than 2.60, or less than 2.55, or less than 2.50, or less than 2.45, or less than 2.40, or less than 2.35, or ≤2.75, or ≤2.70, or ≤2.65, or ≤2.60, or ≤2.55, or ≤2.50, or ≤2.45, or ≤2.40, or ≤2.35.

In embodiments of the disclosure, the polyethylene composition has a melt flow ratio defined as $I_{21}/I_2$ of >40, or ≥45, or ≥50, or ≥60, or ≥65. In a further embodiment of the disclosure, the polyethylene composition has a melt flow ratio $I_{21}/I_2$ of from about 40 to about 100, and including narrower ranges within this range. For example, the polyethylene composition may have a melt flow ratio $I_{21}/I_2$ of from about 45 to about 90, or from about 45 to about 80, or from about 45 to about 75, or from about 45 to about 70, or from about 50 to about 90, or from about 50 to about 80, or from about 50 to about 75, or from about 50 to about 70. In embodiments of the disclosure, the polyethylene composition has a melt flow ratio defined as $I_{21}/I_2$ of >40, or ≥45, or ≥50, or ≥55, or ≥60, or ≥65, or ≥70. In a further embodiment of the disclosure, the polyethylene composition has a melt flow ratio $I_{21}/I_2$ of from about 40 to about 120, including narrower ranges within this range and all the numbers within this range. For example, the polyethylene composition may have a melt flow ratio $I_{21}/I_2$ of from about 50 to about 120, or from about 40 to about 110, or from about 45 to about 100, or from about 50 to about 110, or from about 55 to about 95.

In an embodiment of the disclosure, the polyethylene composition has a melt flow rate defined as $I_{21}/I_5$ of less than 35. In an embodiment of the disclosure, the polyethylene composition has a melt flow rate defined as $I_{21}/I_5$ of less than 30. In another embodiment of the disclosure, the polyethylene composition has a melt flow rate defined as $I_{21}/I_5$ of less than 25. In another embodiment of the disclosure, the polyethylene composition has a melt flow rate defined as $I_{21}/I_5$ of less than 20.

In an embodiment of the disclosure, the polyethylene composition has a shear viscosity at about $10^5$ s$^{-1}$ (240° C.) of less than about 10 (Pa·s). In further embodiments of the disclosure, the polyethylene composition has a shear viscosity at about $10^5$ s$^{-1}$ (240° C.) of less than 7.5 Pa·s, or less than 7.0 Pa·s, or less than 6.5 Pa·s.

In an embodiment of the disclosure, the polyethylene composition has a hexane extractables level of below 0.55 wt. %.

In an embodiment of the disclosure, the polyethylene composition has at least one type of alpha-olefin that has at least 4 carbon atoms and its content is less than 0.75 mol % as determined by $^{13}$C NMR. In an embodiment of the disclosure, the polyethylene composition has at least one type of alpha-olefin that has at least 4 carbon atoms and its content is less than 0.65 mol % as determined by $^{13}$C NMR. In an embodiment of the disclosure, the polyethylene composition has at least one type of alpha-olefin that has at least 4 carbon atoms and its content is less than 0.55 mol % as determined by $^{13}$C NMR.

In an embodiment of the disclosure, the shear viscosity ratio, SVR$_{(10,1000)}$ at 240° C. of the polyethylene composition can be from about 4.0 to 25, or from 4.0 to 20, or from 4.0 to 17. The shear viscosity ratio SVR$_{(10,1000)}$ is determined by taking the ratio of shear viscosity at shear rate of 10 s$^{-1}$ and shear viscosity at shear rate of 1000 s$^{-1}$ as measured with a capillary rheometer at constant temperature (e.g., 240° C.), and a die with L/D ratio of 20 and diameter of 0.06". Without wishing to be bound by theory, the higher the value for the shear viscosity ratio, the easier the polyethylene composition is to be processed on a converting equipment for caps and closures.

In an embodiment of the disclosure, the shear viscosity ratio, SVR$_{(10,1000)}$ at 240° C. of the polyethylene composition can be from about 10 to 30, or from 12 to 27, or from 12.5 to 25, or from 15 to 25, or from 17.5 to 23.0. The shear viscosity ratio SVR$_{(10,1000)}$ is determined by taking the ratio of shear viscosity at shear rate of 10 s$^{-1}$ and shear viscosity at shear rate of 1000 s$^{-1}$ as measured with a capillary rheometer at a constant temperature (e.g., 240° C.), and a die with L/D ratio of 20 and diameter of 0.06". Without wishing to be bound by theory, the higher the value for the shear viscosity ratio, the easier the polyethylene composition is to be processed on converting equipment for caps and closures. The "shear viscosity ratio" is used herein as a means to describe the relative processability of a polyethylene composition.

In embodiments of the disclosure, the polyethylene composition has a shear viscosity ratio ($\eta_{10}/\eta_{1000}$ at 240° C.) of ≥12.0, ≥12.5, or ≥13.0, or ≥13.5, or ≥14.0, or ≥14.5, or ≥15.0, or ≥17.5, or ≥20.0. The "shear viscosity ratio" is used herein as a means to describe the relative processability of a polyethylene composition.

In further embodiments of the disclosure, the shear viscosity ratio, SVR$_{(10,1000)}$ at 240° C. of the polyethylene composition is from 10.0 to 30, or from 12.0 to 30, or from 12.0 to 27.5, or from 12.0 to 25, or from 12.5 to 30, or from 12.5 to 27.5, or from 12.5 to 25.

In an embodiment of the disclosure, the shear thinning index, SHI$_{(1,100)}$ of the polyethylene composition is less than about 10; in another embodiment the SHI$_{(1,100)}$ will be less than about 7. The shear thinning index (SHI), was calculated using dynamic mechanical analysis (DMA) frequency sweep methods as disclosed in PCT applications WO 2006/048253 and WO 2006/048254. The SHI value is obtained by calculating the complex viscosities $\eta^*(1)$ and $\eta^*(100)$ at a constant shear stress of 1 kPa (G*) and 100 kPa (G*), respectively.

In an embodiment of the disclosure, the SHI$_{(1,100)}$ of the polyethylene composition satisfies the equation: SHI$_{(1,100)}$ <−10.58 (log $I_2$ of polyethylene composition in g/10 min)/(g/10 min)+12.94. In another embodiment of the disclosure, the SHI$_{(1,100)}$ of the polyethylene composition satisfies the equation: $SHI_{(1,100)} < -5.5$ (log $I_2$ of the polyethylene composition in g/10 min)/(g/10 min)+9.66.

In an embodiment of the disclosure, the polyethylene composition has a Rosand melt strength in centiNewtons (cN) of at least 2.0, or at least 2.25, or at least 2.5, or at least 2.75, or at least 3.0, or at least 3.25, or at least 3.5, or at least 3.75, or from 2.5 to 6.0, or from 2.75 to 6.0, or from 2.75 to 5.5, or from 3.0 to 6.0, or from 3.0 to 5.5, or from 3.25 to 6.0, or from 3.5 to 6.0, or from 3.25 to 5.5.

In an embodiment of the disclosure, the polyethylene composition or a molded article (or plaque) made from the polyethylene composition, has an environmental stress crack resistance ESCR Condition B at 10% of at least 20 hours, or at least 50 hours, or at least 60 hours, or at least 80 hours, or at least 100 hours, or at least 120 hours, or at least 150 hours, or from 60 to 400 hours, or from 100 to 250 hours, or from 60 to 250 hours as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 200 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 250 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 300 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 350 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 400 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of at least 500 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 200 to 1500 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 200 to 1250 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 300 to 1500 hours, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 50 to 600 hrs, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 100 to 500 hrs, as measured according to ASTM D1693 (at 10% IGEPAL® CO-630 and 50° C. under condition B).

In an embodiment of the disclosure, the polyethylene composition or a molded article (or plaque) made from the polyethylene composition, has an environmental stress crack resistance ESCR Condition B at 10% of from 150 to 500 hrs, as measured according to ASTM D1693 (at 10% IGEPAL® CO-630 and 50° C. under condition B).

In an embodiment of the disclosure, the polyethylene composition or a molded article (or plaque) made from the polyethylene composition has a notched Izod impact strength of at least 60 J/m, or at least 70 J/m, or at least 80 J/m, or at least 90 J/m, or at least 100 J/m as measured according to ASTM D256.

In embodiments of the disclosure, the polyethylene composition or a molded article (e.g., a plaque) made from the polyethylene composition, has a tensile elongation at break (i.e. tensile ultimate elongation) of at least 500 percent, or at least 550 percent, or at least 600 percent, or at least 650 percent, or at least 700 percent, or at least 750 percent, or at least 800 percent. In embodiments of the disclosure, the polyethylene composition or a molded article (e.g., a plaque) made from the polyethylene composition, has a tensile elongation at break of from 550 to 1,000 percent, or from 600 to 900 percent.

In embodiments of the disclosure, the polyethylene composition or a molded article (e.g., a plaque) made from the polyethylene composition, has a tensile strength at break (i.e. tensile ultimate strength) of at least 18 MPa, or at least 20 MPa, or at least 22 MPa, or at least 25 MPa, or at least 28 MPa, or at least 30 MPa, or at least 32 MPa. In embodiments of the disclosure, the polyethylene composition or a molded article (e.g., a plaque) made from the polyethylene composition, has a tensile strength at break of from 15 to 40 MPa, or from 17 to 38 MPa, or from 20 to 35 MPa.

In an embodiment of the disclosure, the polyethylene composition of the current disclosure has a density of from 0.949 to 0.956 g/cm$^3$; a melt index, $I_2$, of from 0.5 to 3.0 g/10 min; a molecular weight distribution of from 4.0 to 10.0; a number average molecular weight, $M_n$, of below 30,000; a shear viscosity at $10^5$ s$^{-1}$ (240° C.) of less than 10 (Pa·s), a hexane extractables of less than 0.55%, a notched Izod impact strength of more than 60 J/m, and an ESCR B at 10% of at least 20 hours.

In an embodiment of the disclosure, the polyethylene composition of the current disclosure has a density of from 0.949 to 0.957 g/cm$^3$; a melt index, $I_2$, of from 0.3 to 2.0 g/10 min; a molecular weight distribution of from 6.0 to 12.0; a number average molecular weight, $M_n$, of below 30,000; a shear viscosity at $10^5$ s$^{-1}$ (240° C.) of less than 10

(Pa·s), a hexane extractables of less than 0.55%, a notched Izod impact strength of more than 60 J/m, and an ESCR B at 10% of at least 150 hrs.

In an embodiment of the disclosure, the polyethylene composition of the current disclosure has a density of from 0.949 to 0.956 g/cm$^3$; a melt index, $I_2$, of from 0.5 to 3.0 g/10 min; a molecular weight distribution of from 4.5 to 9.5; a number average molecular weight, $M_n$, of below 30,000; a shear viscosity at $10^5$ s$^{-1}$ (240° C.) of less than 7 (Pa·s), a hexane extractables of less than 0.55%, a notched Izod impact strength of more than 60 J/m and an ESCR B at 10% of at least 80 hours.

In an embodiment of the disclosure, the polyethylene composition of the current disclosure has a density of from 0.949 to 0.956 g/cm$^3$; a melt index, $I_2$, of from 0.2 to 3.0 g/10 min; a molecular weight distribution of from 6.0 to 13.0; a number average molecular weight, $M_n$, of below 30,000; a shear viscosity at $10^5$ s$^{-1}$ (240° C.) of less than 10 (Pa·s), a hexane extractables of less than 0.55%, a notched Izod impact strength of more than 60 J/m, and an ESCR B at 10% of at least 200 hours.

In embodiments of the disclosure, the polyethylene composition has a 2% secant flexural modulus in megapascals (MPa) of greater than about 750, or greater than about 850, or greater than about 1,000, or from about 750 to about 1,600, or from about 750 to about 1250, or from about 850 to about 1150. In some embodiments the polyethylene composition further includes a nucleating agent which increases the 2% secant flexural modulus in megapascals (MPa) to above these ranges to for example from more than about 1,000 and up to about 1600. Without wishing to be bound by theory, the 2% secant flexural modulus is a measure of polymer stiffness. The higher the 2% secant flexural modulus, the higher the polymer stiffness.

In an embodiment of the disclosure, the polyethylene composition of the current disclosure has a density of from 0.949 to 0.956 g/cm$^3$; a melt index, $I_2$, of from 0.2 to 3.0 g/10 min; a molecular weight distribution of from 7.0 to 12.0; a number average molecular weight, $M_n$, of below 30,000; a shear viscosity at $10^5$ s$^{-1}$ (240° C.) of less than 7 (Pa·s), a hexane extractables of less than 0.55%, a notched Izod impact strength of more than 60 J/m and an ESCR B at 10% of at least 200 hours.

In an embodiment of the disclosure, the polyethylene composition has a stress exponent, defined as $\mathrm{Log}_{10}[I_6/I_2]/\mathrm{Log}_{10}[6.48/2.16]$, which is ≤1.53. In further embodiments of the disclosure the polyethylene composition has a stress exponent, $\mathrm{Log}_{10}[I_6/I_2]/\mathrm{Log}_{10}[6.48/2.16]$ of less than 1.53, or less than 1.50, or less than 1.48, or less than 1.45, or less than 1.43, or less than 1.40.

In an embodiment of the disclosure, the polyethylene composition has a composition distribution breadth index (CDBI$_{50}$), as determined by temperature elution fractionation (TREF), of ≥60 weight %. In further embodiments of the disclosure, the polyethylene composition will have a CDBI$_{50}$ of greater than 65 weight %, or greater than 70 weight %, or greater than 75 weight %, or greater than 80 weight %.

In an embodiment of the disclosure, the polyethylene composition has a composition distribution breadth index (CDBI$_{25}$), as determined by temperature elution fractionation (TREF), of ≥50 weight %. In further embodiments of the disclosure, the polyethylene composition will have a CDBI$_{25}$ of greater than 55 weight %, or greater than 60 weight %, or greater than 65 weight %, or greater than 70 weight %.

The polyethylene composition of this disclosure can be made using any conventional blending method such as but not limited to physical blending and in-situ blending by polymerization in multi reactor systems. For example, it is possible to perform the mixing of the first ethylene copolymer with the second ethylene copolymer or the ethylene homopolymer by molten mixing of the two preformed polymers. Preferred are processes in which the first ethylene copolymer and the second ethylene copolymer or ethylene homopolymer are prepared in at least two sequential polymerization stages, however, both in-series and in-parallel reactor process are contemplated for use in the current disclosure. If the at least two reactors are configured in parallel, comonomer addition to each reactor makes an ethylene copolymer in each reactor. If the at least two reactors are configured in series, comonomer may be added to at least the first reactor, and unreacted comonomer can flow into later reactors to make an ethylene copolymer in each reactor. Alternatively, if the at least two reactors are configured in series, comonomer may be added to each reactor, to make an ethylene copolymer in each reactor. Gas phase, slurry phase or solution phase reactor systems may be used, with solution phase reactor systems being preferred, in some embodiments.

In an embodiment of the current disclosure, a dual reactor solution process is used as has been described in for example U.S. Pat. No. 6,372,864 and U.S. Patent Publication Application No. 20060247373A1 which are incorporated herein by reference.

Homogeneously branched ethylene copolymers can be prepared using any catalyst capable of producing homogeneous branching. Generally, the catalysts will be based on a group 4 metal having at least one cyclopentadienyl ligand that is well known in the art. Examples of such catalysts which include metallocenes, constrained geometry catalysts and phosphinimine catalysts are typically used in combination with activators selected from methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such catalysts may also be referred to as "single site catalysts" to distinguish them from traditional Ziegler-Natta or Phillips catalysts which are also well known in the art. In general, single site catalysts produce ethylene copolymers having a molecular weight distribution ($M_w/M_n$) of less than about 3.0 and a composition distribution breadth index (CDBI$_{50}$) of greater than about 50% by weight.

In an embodiment of the current disclosure, homogeneously branched ethylene polymers are prepared using an organometallic complex of a group 3, 4 or 5 metal that is further characterized as having a phosphinimine ligand. Such catalysts are known generally as phosphinimine catalysts. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety.

In an embodiment of the disclosure, use of a single site catalyst that does not produce long chain branching (LCB)

is used. Hexyl (C6) branches detected by NMR are excluded from the definition of a long chain branch as disclosed herein.

Without wishing to be bound by any single theory, long chain branching can increase viscosity at low shear rates, thereby negatively impacting cycle times during the manufacture of bottle closure assemblies, such as during the processes of injection molding or compression molding. Long chain branching may be determined using $^{13}$C NMR methods and may be quantitatively assessed using the method disclosed by Randall in Rev. Macromol. Chem. Phys. C29 (2 and 3), p. 285.

In an embodiment of the disclosure, the polyethylene composition will contain fewer than 0.3 long chain branches per 1000 carbon atoms. In another embodiment of the disclosure, the polyethylene composition will contain fewer than 0.01 long chain branches per 1000 carbon atoms.

In an embodiment of the disclosure, the polyethylene composition (defined as above) is prepared by contacting ethylene and at least one alpha-olefin with a polymerization catalyst under solution phase polymerization conditions in at least two polymerization reactors (for an example of solution phase polymerization conditions see, for example, U.S. Pat. Nos. 6,372,864; 6,984,695 and U.S. Patent Publication Application No. 2006/0247373A1 which are incorporated herein by reference).

In an embodiment of the disclosure, the polyethylene composition is prepared by contacting at least one single site polymerization catalyst system (including at least one single site catalyst and at least one activator) with ethylene and a least one comonomer (e.g., a $C_3$-$C_8$ alpha-olefin) under solution polymerization conditions in at least two polymerization reactors.

In an embodiment of the disclosure, a group 4 single site catalyst system, including a single site catalyst and an activator, is used in a solution phase dual reactor system to prepare a polyethylene composition by polymerization of ethylene in the presence of an alpha-olefin comonomer.

In an embodiment of the disclosure, a group 4 single site catalyst system, including a single site catalyst and an activator, is used in a solution phase dual reactor system to prepare a polyethylene composition by polymerization of ethylene in the presence of 1-octene.

In an embodiment of the disclosure, a group 4 phosphinimine catalyst system, including a phosphinimine catalyst and an activator, is used in a solution phase dual reactor system to prepare a polyethylene composition by polymerization of ethylene in the presence of an alpha-olefin comonomer.

In an embodiment of the disclosure, a group 4 phosphinimine catalyst system, including a phosphinimine catalyst and an activator, is used in a solution phase dual reactor system to prepare a polyethylene composition by polymerization of ethylene in the presence of 1-octene.

In an embodiment of the disclosure, a solution phase dual reactor system includes two solution phase reactors connected in series.

In an embodiment of the disclosure, a polymerization process to prepare the polyethylene composition includes contacting at least one single site polymerization catalyst system with ethylene and at least one alpha-olefin comonomer under solution polymerization conditions in at least two polymerization reactors.

In an embodiment of the disclosure, a polymerization process to prepare the polyethylene composition includes contacting at least one single site polymerization catalyst system with ethylene and at least one alpha-olefin comonomer under solution polymerization conditions in at least a first reactor and a second reactor configured in series.

In an embodiment of the disclosure, a polymerization process to prepare the polyethylene composition includes contacting at least one single site polymerization catalyst system with ethylene and at least one alpha-olefin comonomer under solution polymerization conditions in at least a first reactor and a second reactor configured in series, with the at least one alpha-olefin comonomer being fed exclusively to the first reactor.

The production of the polyethylene composition of the present disclosure will typically include an extrusion or compounding step. Such steps are well known in the art.

The polyethylene composition can include further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e., not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents (including nucleators, pigments or any other chemicals which may provide a nucleating effect to the polyethylene composition). The additives that can be optionally added are typically added in amount of up to 20 wt. %.

One or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers, and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. Another compound known to have nucleating capacity is talc. The effectiveness of nucleation may be monitored microscopically by observation of the degree of reduction in size of the spherulites into which the crystallites are aggregated.

Examples of nucleating agents which are commercially available and which may be added to the polyethylene composition are dibenzylidene sorbital esters (such as the products sold under the trademark Millad™ 3988 by Milliken Chemical and Irgaclear Ciba Specialty Chemicals). Further examples of nucleating agents which may added to the polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally includes a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the polyethylene composition include those disclosed in WO2015042561, WO2015042563, WO2015042562, and WO 2011050042.

Many of the above described nucleating agents may be difficult to mix with the polyethylene composition that is being nucleated and it is known to use dispersion aids, such as for example, zinc stearate, to mitigate this problem.

In an embodiment of the disclosure, the nucleating agents are well dispersed in the polyethylene composition.

In an embodiment of the disclosure, the amount of nucleating agent used is comparatively small (from 100 to 3000 parts by million per weight (based on the weight of the polyethylene composition)) so it will be appreciated by those skilled in the art that some care should be taken to ensure that the nucleating agent is well dispersed. In an embodiment of the disclosure, the nucleating agent is added in finely divided form (less than 50 microns, especially less than 10 microns) to the polyethylene composition to facilitate mixing. This type of "physical blend" (i.e., a mixture of the nucleating agent and the resin in solid form) is generally preferable to the use of a "masterbatch" of the nucleator (where the term "masterbatch" refers to the practice of first melt mixing the additive—the nucleator, in this case—with a small amount of the polyethylene composition resin—then melt mixing the "masterbatch" with the remaining bulk of the polyethylene composition resin).

In an embodiment of the disclosure, an additive such as nucleating agent may be added to the polyethylene composition by way of a "masterbatch", where the term "masterbatch" refers to the practice of first melt mixing the additive (e.g., a nucleator) with a small amount of the polyethylene composition, followed by melt mixing the "masterbatch" with the remaining bulk of the polyethylene composition.

In an embodiment of the disclosure, the polymer composition further includes a nucleating agent or a mixture of nucleating agents.

In an embodiment of the disclosure, homogeneously branched ethylene copolymers are prepared using an organometallic complex of a group 3, 4 or 5 metal that is further characterized as having a phosphinimine ligand. Such a complex, when active toward olefin polymerization, is known generally as a phosphinimine (polymerization) catalyst.

The polyethylene compositions described above are used in the formation of bottle closure assemblies. For example, bottle closure assemblies formed in part on in whole by compression molding and injection molding are contemplated.

In one embodiment, the bottle closure assembly includes the polyethylene composition described above which has good processability and good ESCR values. The bottle closure assemblies are well suited for sealing bottles, containers and the like, for examples bottles that may contain drinkable water, and other foodstuffs, including but not limited to liquids that are pressurized (e.g., carbonated beverages or appropriately pressurized drinkable liquids). The bottle closure assemblies may also be used for sealing bottles containing drinkable water or non-carbonated beverages (e.g., juice). Other applications, include bottle closure assemblies for bottles and containers containing foodstuffs, such as for example ketchup bottles and the like.

The bottle closure assemblies of the current disclosure can be made according to any known method, including for example injection molding or compression molding techniques that are well known to persons skilled in the art. Hence, in an embodiment of the disclosure, a bottle closure assembly including the polyethylene composition (defined above) is prepared with a process including at least one compression molding step and/or at least one injection molding step.

The disclosure is further illustrated by the following non-limiting examples.

EXAMPLES $M_n$, $M_w$, and $M_z$ (g/mol) were determined by high temperature Gel Permeation Chromatography (GPC) with differential refractive index (DRI) detection using universal calibration (e.g., ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 00° C. at a cooling rate of 10° C./min and kept at 00° C. for five minutes; the specimen was then heated to 200° C. at a heating rate of 10° C./min. The DSC Tm, heat of fusion and crystallinity are reported from the $2^{nd}$ heating cycle.

The short chain branch frequency (SCB per 1000 carbon atoms) of copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Comonomer content can also be measured using $^{13}C$ NMR techniques as discussed in Randall, Rev. Macromol. Chem. Phys., C29 (2&3), p. 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model # D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

The Shear viscosity ratio as the term is used in the present disclosure is defined as: $\eta_{10}/\eta_{1000}$ at 240° C. The $\eta_{10}$ is the melt shear viscosity at the shear rate of 10 s$^{-1}$ and the $\eta_{1000}$ is the melt shear viscosity at the shear rate of 1000 s$^{-1}$ measured at 240° C.

Melt indexes, $I_2$, $I_5$, $I_6$ and $I_{21}$ for the polyethylene composition were measured according to ASTM D1238 (when conducted at 190° C., using a 2.16 kg, a 5 kg, a 6.48 kg and a 21 kg weight, respectively).

To determine CDBI$_{50}$, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI$_{50}$ is determined by establishing the weight percentage of a copolymer sample that has a comonomer content within 50% of the median comonomer content on each side of the median (See WO 93/03093 and U.S. Pat. No. 5,376,439). The CDBI$_{25}$ is determined by establishing the weight percentage of a copolymer sample that has a comonomer content within 25% of the median comonomer content on each side of the median.

The specific temperature rising elution fractionation (TREF) method used herein was as follows. Polymer samples (50 to 150 mg) were introduced into the reactor vessel of a crystallization-TREF unit (POLYMER CHAR™). The reactor vessel was filled with 20 to 40 ml 1,2,4-trichlorobenzene (TCB), and heated to the desired dissolution temperature (e.g., 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer Char software, Excel spreadsheet and TREF software developed in-house.

The melt index, $I_2$ and density of the first and second ethylene copolymers were estimated by GPC and GPC-FTIR deconvolutions as discussed further below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these single site catalyzed resins, the GPC data from GPC chromatographs was fit based on Flory's molecular weight distribution function.

To improve the deconvolution accuracy and consistency, as a constraint, the melt index, $I_2$, of the targeted resin was set and the following relationship was satisfied during the deconvolution:

$$\mathrm{Log}_{10}(I_2) = 22.326528 + 0.003467 * [\mathrm{Log}_{10}(M_n)]^3 - 4.322582 * \mathrm{Log}_{10}(M_w) - 0.180061 * [\mathrm{Log}_{10}(M_z)]^2 + 0.026478 * [\mathrm{Log}_{10}(M_z)]^3$$

where the experimentally measured overall melt index, $I_2$, was used on the left side of the equation, while $M_n$ of each component ($M_w = 2 \times M_n$ and $M_z = 1.5 \times M_w$ for each component) was adjusted to change the calculated overall $M_n$, $M_w$ and $M_z$ of the composition until the fitting criteria were met. During the deconvolution, the overall $M_n$, $M_w$ and $M_z$ are calculated with the following relationships: $M_n = 1/\mathrm{Sum}(w_i/M_n(i))$, $M_w = \mathrm{Sum}(w_i \times M_w(i))$, $M_z = \mathrm{Sum}(w_i \times M_z(i)^2)$, where i represents the i-th component and $w_i$ represents the relative weight fraction of the i-th component in the composition.

The uniform comonomer distribution (which results from the use of a single site catalyst) of the resin components (i.e., the first and second ethylene copolymers) allowed the estimation of the short chain branching content (SCB) from the GPC-FTIR data, in branches per 1000 carbon atoms and calculation of comonomer content (in mol %) and density (in g/cm$^3$) for the first and second ethylene copolymers, based on the deconvoluted relative amounts of first and second ethylene copolymer components in the polyethylene composition, and their estimated resin molecular weight parameters from the above procedure.

A component (or composition) density model and a component (or composition) melt index, $I_2$, model was used according to the following equations to calculate the density and melt index $I_2$ of the first and second ethylene polymers:

$$\mathrm{density} = 0.979863 - 0.00594808 * (\mathrm{FTIR\ SCB}/1000C)^{0.65} - 0.000383133 * [\mathrm{Log}_{10}(M_n)]^3 \\ 0.00000577986 * (M_w/M_n)^3 + 0.00557395 * (M_z/M_w)^{0.25};$$

$$\mathrm{Log}_{10}(\mathrm{melt\ index}, I_2) = 22.326528 + 0.003467 * [\mathrm{Log}_{10}(M_n)]^3 - 4.322582 * \mathrm{Log}_{10}(M_w) - 0.180061 * [\mathrm{Log}_{10}(M_z)]^2 + 0.026478 * [\mathrm{Log}_{10}(M_z)]^3$$

where the $M_n$, $M_w$ and $M_z$ were the deconvoluted values of the individual ethylene polymer components, as obtained from the results of the above GPC deconvolutions. Hence, these two models were used to estimate the melt indexes and the densities of the components (i.e., the first and second ethylene copolymers).

Plaques molded from the polyethylene compositions were tested according to the following ASTM methods: Bent Strip Environmental Stress Crack Resistance (ESCR) at Condition B at 10% IGEPAL® CO-630 at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity ($\eta$*) were obtained as a function of frequency. The same rheological data can also be obtained by using a 25 mm diameter parallel plate geometry at 190° C. under nitrogen atmosphere. The SHI(1,100) value is calculated according to the methods described in WO 2006/048253 and WO 2006/048254.

Examples of the polyethylene compositions were produced in a dual reactor solution polymerization process in which the contents of the first reactor flow into the second reactor. This in-series "dual reactor" process produces an "in-situ" polyethylene blend (i.e., the polyethylene composition). Note, that when an in-series reactor configuration is used, un-reacted ethylene monomer, and un-reacted alpha-olefin comonomer present in the first reactor will flow into the downstream second reactor for further polymerization.

In the present examples, although no co-monomer is fed directly to the downstream second reactor, an ethylene copolymer is nevertheless formed in the second reactor due to the significant presence of un-reacted 1-octene flowing from the first reactor to the second reactor where it is copolymerized with ethylene. Each reactor is sufficiently agitated to give conditions in which components are well mixed. The volume of the first reactor was 12 liters and the volume of the second reactor was 22 liters. Optionally, a tubular reactor section which receives the discharge from the second reactor may be also be present as described in U.S. Pat. No. 8,101,693. These are the pilot plant scales. The first reactor was operated at a pressure of 10,500 to 35,000 kPa and the second reactor was operated at a lower pressure to facilitate continuous flow from the first reactor to the second. The solvent employed was methylpentane. The process operates using continuous feed streams. The catalyst employed in the dual reactor solution process experiments was a titanium complex having a phosphinimine ligand (e.g., (tert-butyl)$_3$P=N), a cyclopentadienide ligand (e.g., Cp) and two activatable ligands, such as but not limited to chloride ligands. A boron based co-catalyst (e.g., Ph$_3$CB (C$_6$F$_5$)$_4$) was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

The polymerization conditions used to make the polyethylene compositions are provided in Table 1.

Polyethylene composition properties are described in Tables 2.

Calculated properties for the first ethylene copolymer and the second ethylene copolymer for selected polyethylene compositions, as obtained from GPC-FTIR deconvolution studies, are provided in Table 3.

The properties of pressed plaques made the polyethylene compositions are provided in Table 4.

Polyethylene compositions 1-9 are made using a single site phosphinimine catalyst in a dual reactor solution process as described above and have an ESCR at condition B10 of greater than 20 hours and a SCB1/SCB2 ratio of greater than 0.50. These examples also have a Mz values of less than 400,000.

Polyethylene compositions 10-13 are made using a single site phosphinimine catalyst in a dual reactor solution process as described above and have an ESCR at condition B10 of greater than 250 hours and a SCB1/SCB2 ratio of greater than 1.5. These examples also have a Mz values of less than 450,000.

Polyethylene compositions A, B, C, D, and E are made using a single site phosphinimine catalyst in a dual reactor solution process and have an ESCR at condition B10 of less than 24 hours and a SCB1/SCB2 ratio of 0.50 or less.

TABLE 1

Reactor Conditions for Examples

| | Ex. 1 | Ex. 2 | Ex. 3 | Ex. 4 | Ex. 5 |
|---|---|---|---|---|---|
| Reactor 1 | | | | | |
| Ethylene (kg/h) | 35.6 | 38.1 | 35.7 | 36.7 | 37.5 |
| 1-Octene (kg/h) | 4.9 | 4 | 5.3 | 4.1 | 4.8 |
| Hydrogen (g/h) | 0.51 | 0.58 | 0.51 | 0.50 | 0.50 |
| Solvent (kg/h) | 319.2 | 329 | 296.5 | 296.8 | 286.8 |
| Reactor Feed Inlet Temperature (° C.) | 30 | 30 | 30 | 30 | 30 |
| Reactor Temperature (° C.) | 138.2 | 140.5 | 141.1 | 143.8 | 149.2 |
| Titanium Catalyst to the Reactor (ppm) | 0.14 | 0.10 | 0.12 | 0.1 | 0.1 |
| Reactor 2 | | | | | |
| Ethylene (kg/h) | 43.6 | 51.6 | 43.6 | 44.9 | 45.9 |
| 1-Octene (kg/h) | 0 | 0 | 0 | 0 | 0 |
| Hydrogen (g/h) | 22.2 | 13.46 | 22.2 | 16.4 | 21 |
| Solvent (kg/h) | 106.7 | 137.2 | 129.1 | 127.5 | 135 |
| Reactor Feed Inlet Temperature (° C.) | 30 | 30 | 30 | 31.3 | 29.8 |
| Reactor Temperature (° C.) | 186.9 | 192.1 | 186.3 | 190.9 | 194 |
| Titanium Catalyst to the Reactor (ppm) | 0.29 | 0.23 | 0.21 | 0.21 | 0.24 |

| | Ex. 6 | Ex. 7 | Ex. 8 | Ex. 9 |
|---|---|---|---|---|
| Reactor 1 | | | | |
| Ethylene (kg/h) | 35.7 | 35.6 | 35.7 | 38.4 |
| 1-Octene (kg/h) | 2.6 | 4.7 | 4.9 | 1.5 |
| Hydrogen (g/h) | 0.45 | 0.46 | 0.46 | 0.62 |
| Solvent (kg/h) | 256.6 | 259.1 | 258.9 | 346.3 |
| Reactor Feed Inlet Temperature (° C.) | 30 | 30 | 30 | 30 |
| Reactor Temperature (° C.) | 152.5 | 151 | 147 | 141.1 |
| Titanium Catalyst to the Reactor (ppm) | 0.08 | 0.13 | 0.10 | 0.10 |
| Reactor 2 | | | | |
| Ethylene (kg/h) | 43.6 | 43.6 | 43.6 | 51.9 |
| 1-Octene (kg/h) | 0 | 0 | 0 | 0 |
| Hydrogen (g/h) | 10.2 | 21.59 | 16.21 | 15.07 |
| Solvent (kg/h) | 171.6 | 167 | 167.1 | 121.7 |
| Reactor Feed Inlet Temperature (° C.) | 30 | 30 | 30 | 30 |

TABLE 1-continued

Reactor Conditions for Examples

|  | | | | |
|---|---|---|---|---|
| Reactor Temperature (° C.) | 185.7 | 186.2 | 186.4 | 192.8 |
| Titanium Catalyst to the Reactor (ppm) | 0.13 | 0.22 | 0.20 | 0.31 |

|  | Example No. | | | |
|---|---|---|---|---|
|  | Ex. 10 | Ex. 11 | Ex. 12 | Ex. 13 |
| Reactor 1 | | | | |
| Ethylene (kg/h) | 34.1 | 34.1 | 34.1 | 32.6 |
| 1-Octene (kg/h) | 4 | 3.1 | 4.8 | 4.9 |
| Hydrogen (g/h) | 0.27 | 0.22 | 0.35 | 0.29 |
| Solvent (kg/h) | 331.3 | 345.1 | 314.4 | 311.4 |
| Reactor Feed Inlet Temperature (° C.) | 30 | 30 | 30 | 30 |

TABLE 1-continued

Reactor Conditions for Examples

| | | | | |
|---|---|---|---|---|
| Reactor Temperature (° C.) | 135.8 | 137 | 139.9 | 140 |
| Titanium Catalyst to the Reactor (ppm) | 0.08 | 0.13 | 0.09 | 0.13 |
| Reactor 2 | | | | |
| Ethylene (kg/h) | 41.7 | 41.7 | 41.7 | 40.0 |
| 1-Octene (kg/h) | 0 | 0 | 0 | 0 |
| Hydrogen (g/h) | 19.8 | 19.25 | 23.10 | 20.35 |
| Solvent (kg/h) | 128.8 | 115.7 | 144.9 | 151.1 |
| Reactor Feed Inlet Temperature (° C.) | 29.8 | 34.2 | 30 | 30.5 |
| Reactor Temperature (° C.) | 192.2 | 192 | 191.9 | 186.3 |
| Titanium Catalyst to the Reactor (ppm) | 0.29 | 0.21 | 0.28 | 0.21 |

TABLE 2

Resin Properties

| | Example No. | | | | |
|---|---|---|---|---|---|
| | Ex. A | Ex. B | Ex. C | Ex. D | Ex. E |
| Density (g/cm³) | 0.9534 | 0.9523 | 0.9526 | 0.952 | 0.953 |
| Rheology/Flow Properties | | | | | |
| Melt Index $I_2$ (g/10 min) | 1.88 | 0.625 | 1.42 | 1.92 | 0.68 |
| Melt Flow Ratio ($I_{21}/I_2$) | 56.9 | 51.2 | 50.5 | 77.1 | 73.2 |
| Stress Exponent | 1.41 | 1.38 | 1.36 | 1.38 | 1.38 |
| $I_{21}$ (g/10 min) | 107 | 33.1 | 71.3 | 146.0 | 49.8 |
| $I_5$ (g/10 min) | | | 4.23 | | |
| $I_{21}/I_5$ | | | 16.86 | | |
| Shear Viscosity at $10^5$ $s^{-1}$ (240° C., Pa-s) | | | 5.8 | | |
| Shear Viscosity Ratio $\eta$ (10 $s^{-1}$)/$\eta$ (1000 $s^{-1}$) at 240° C. | | | 12.0 | | |
| DMA Data (190° C.) | | | $\eta^* = 5832$ Pa * s at $G^* = 2.099$ kPa; $\eta^* = 5591$ Pa * s at $G^* = 2.795$ kPa | | |
| GPC | | | | | |
| $M_n$ | 14393 | 22392 | 17827 | 9891 | 12424 |
| $M_w$ | 91663 | 109626 | 105289 | 77319 | 104353 |
| $M_z$ | 325841 | 299470 | 282159 | 245479 | 327007 |
| Polydispersity Index ($M_w/M_n$) | 6.37 | 4.9 | 5.91 | 7.82 | 8.4 |
| $M_z/M_w$ | 3.55 | 3.56 | 2.68 | 3.17 | 3.13 |
| Broadness Factor ($M_w/M_n$)/($M_z/M_w$) | 1.79 | 1.38 | 2.21 | 2.47 | 2.68 |
| Branch Frequency - FTIR (uncorrected for chain end —$CH_3$) | | | | | |
| Uncorrected SCB/1000 C | 2.2 | 2 | 2.2 | 3.7 | 2.5 |
| Uncorrected comonomer content (mol %) | 0.4 | 0.4 | 0.4 | 0.7 | 0.5 |
| Comonomer ID | 1-octene | 1-octene | 1-octene | 1-octene | 1-octene |
| Comonomer mol % measured by $^{13}$C-NMR | | | | | |
| Hexyl+ branches (≥4 carbon atoms), mol % | 0.3 | 0.2 | 0.28 | | |
| Slow-CTREF | | | | | |
| $CDBI_{50}$ (wt. %) | | | 63 | | |
| $CDBI_{25}$ (wt. %) | | | | | |
| DSC | | | | | |
| Primary Melting Peak (° C.) | 128.3 | 129.7 | 129.11 | 126.8 | 128.42 |

TABLE 2-continued

| Resin Properties | | | | | |
|---|---|---|---|---|---|
| Heat of Fusion (J/g) | 204.7 | 198.2 | 207.7 | 200.3 | 213.80 |
| Crystallinity (%) | 70.58 | 68.34 | 71.61 | 69.08 | 73.72 |
| Other properties | | | | | |
| Hexane Extractables (wt. %) | 0.44 | 0.46 | 0.32 | 0.73 | 0.57 |
| VICAT Soft. Pt. (° C.) - Plaque | 126 | 127 | 127.3 | 122 | 125 |
| Heat Deflection Temp. [° C.] @ 66 PSI | 72 | 71 | 68.2 | 68 | 71 |

| | Example No. | | |
|---|---|---|---|
| | Example 1 | Example 2 | Example 3 |
| Density (g/cm$^3$) | 0.9529 | 0.9524 | 0.9524 |
| Rheology/Flow Properties | | | |
| Melt Index $I_2$ (g/10 min) | 1.57 | 2.94 | 1.69 |
| Melt Flow Ratio ($I_{21}/I_2$) | 58 | 44.1 | 61 |
| Stress Exponent | 1.38 | 1.36 | 1.38 |
| $I_{21}$ (g/10 min) | 90 | 129 | 104 |
| $I_5$ (g/10 min) | 4.72 | | 4.94 |
| $I_{21}/I_5$ | 19.07 | | 21.05 |
| Shear Viscosity at $10^5$ s$^{-1}$ (240° C., Pa-s) | 5.1 | 6.2 | 4.8 |
| Shear Viscosity Ratio η (10 s$^{-1}$)/ η (1000 s$^{-1}$) at 240° C. | 13.5 | 8.1 | 13.0 |
| DMA Data (190° C.) | η* = 5294 Pa * s at G* = 2.647 kPa; η* = 5106 Pa * s at G* = 3.547 kPa | | η* = 4889 Pa * s at G* = 2.445 kPa; η* = 4739 Pa * s at G* = 3.292 kPa |
| GPC | | | |
| $M_n$ | 10524 | 15679 | 10579 |
| $M_w$ | 83712 | 74090 | 86319 |
| $M_z$ | 256210 | 215369 | 291056 |
| Polydispersity Index ($M_w/M_n$) | 7.95 | 4.73 | 8.16 |
| $M_z/M_w$ | 3.06 | 2.91 | 3.37 |
| Broadness Factor ($M_w/M_n$)/($M_z/M_w$) | 2.60 | 1.63 | 2.42 |
| Branch Frequency - FTIR (uncorrected for chain end —CH$_3$) | | | |
| Uncorrected SCB/1000 C | 3 | 1.8 | 3 |
| Uncorrected comonomer content (mol %) | 0.6 | 0.4 | 0.6 |
| Comonomer ID | 1-octene | 1-octene | 1-octene |
| Comonomer mol % measured by $^{13}$C-NMR | | | |
| Hexyl + branches (≥4 carbon atoms), mol % | 0.4 | | 0.4 |
| Slow-CTREF | | | |
| CDBI$_{50}$ (wt. %) | | | |
| CDBI$_{25}$ (wt. %) | 65.4 | 61.8 | 61.8 |
| DSC | | | |
| Primary Melting Peak (° C.) | 127.3 | 128.8 | 127.5 |
| Heat of Fusion (J/g) | 203.8 | 206.1 | 207.3 |
| Crystallinity (%) | 70.27 | 71.08 | 71.48 |
| Other properties | | | |
| Hexane Extractables (wt. %) | 0.36 | 0.22 | 0.42 |
| VICAT Soft. Pt. (° C.) - Plaque | 125.2 | 126.8 | 124.8 |
| Heat Deflection Temp. [° C.] @ 66 PSI | 68 | 74.1 | 76 |

| | Example No. | | | | |
|---|---|---|---|---|---|
| | Example 4 | Example 5 | Example 6 | Example 7 | Example 8 |
| Density (g/cm$^3$) | 0.9523 | 0.9532 | 0.9527 | 0.9534 | 0.9522 |
| Rheology/Flow Properties | | | | | |
| Melt Index $I_2$ (g/10 min) | 1.5 | 1.78 | 1.29 | 2.05 | 1.31 |
| Melt Flow Ratio ($I_{21}/I_2$) | 54.8 | 55.6 | 44.1 | 55 | 64 |

TABLE 2-continued

| Resin Properties | | | | | |
|---|---|---|---|---|---|
| Stress Exponent | 1.4 | 1.37 | 1.35 | 1.34 | 1.39 |
| $I_{21}$ (g/10 min) | 82.3 | 99.1 | 57 | 113 | 83 |
| $I_5$ (g/10 min) | 4.5 | 5.33 | | 6.21 | |
| $I_{21}/I_5$ | 18.29 | 18.59 | | 18.20 | |
| Shear Viscosity at $10^5$ s$^{-1}$ (240° C., Pa-s) | 5.8 | 5.1 | 6.3 | 5.0 | 5.8 |
| Shear Viscosity Ratio $\eta$ (10 s$^{-1}$)/$\eta$ (1000 s$^{-1}$) at 240° C. | 14.8 | 13.3 | 11.6 | 12.1 | 14.8 |
| DMA Data (190° C.) | | | $\eta^*$ = 6707 Pa * s at G* = 2.413 kPa; $\eta^*$ = 6465 Pa * s at G* = 3.232 kPa | | $\eta^*$ = 6688 Pa * s at G* = 2.407 kPa; $\eta^*$ = 6472 Pa * s at G* = 3.236 kPa |
| GPC | | | | | |
| $M_n$ | 13309 | 9716 | 18449 | 11145 | 14021 |
| $M_w$ | 88295 | 84943 | 93080 | 80630 | 93175 |
| $M_z$ | 278141 | 288665 | 272788 | 243944 | 303823 |
| Polydispersity Index ($M_w/M_n$) | 6.63 | 8.74 | 5.05 | 7.23 | 6.65 |
| $M_z/M_w$ | 3.15 | 3.40 | 2.93 | 3.03 | 3.26 |
| Broadness Factor ($M_w/M_n$)/($M_z/M_w$) | 2.10 | 2.57 | 1.72 | 1.43 | 2.04 |
| Branch Frequency - FTIR (uncorrected for chain end —CH$_3$) | | | | | |
| Uncorrected SCB/1000 C | 2.1 | 2.5 | 1.7 | 2.8 | 2.2 |
| Uncorrected comonomer content (mol %) | 0.4 | 0.5 | 0.3 | 0.6 | 0.4 |
| Comonomer ID | 1-octene | 1-octene | 1-octene | 1-octene | 1-octene |
| Comonomer mol % measured by $^{13}$C-NMR | | | | | |
| Hexyl + branches (>=4 carbon atoms), mol % | 0.3 | | | | |
| Slow-CTREF | | | | | |
| CDBI$_{50}$ (wt. %) | 76.5 | 75.2 | 86.2 | 79.7 | 80.4 |
| CDBI$_{25}$ (wt. %) | | | | | |
| DSC | | | | | |
| Primary Melting Peak (° C.) | 129 | 128.3 | 129.8 | 127.9 | 128.4 |
| Heat of Fusion (J/g) | 209 | 207.3 | 208.5 | 211.1 | 205.4 |
| Crystallinity (%) | 72.08 | 71.48 | 71.9 | 72.8 | 70.82 |
| Other properties | | | | | |
| Hexane Extractables (wt. %) | 0.25 | 0.33 | 0.25 | 0.38 | 0.27 |
| VICAT Soft. Pt. (° C.) - Plaque | 126.4 | 125.4 | 128.2 | 125.2 | 126.2 |
| Heat Deflection Temp. [° C.] @ 66 PSI | 67.3 | 69.8 | 68.2 | 66.8 | 69 |

| | Example No. | | | | |
|---|---|---|---|---|---|
| | Example 9 | Example 10 | Example 11 | Example 12 | Example 13 |
| Density (g/cm$^3$) | 0.9568 | 0.9545 | 0.9532 | 0.9543 | 0.9522 |
| Rheology/Flow Properties | | | | | |
| Melt Index $I_2$ (g/10 min) | 1.68 | 0.67 | 0.76 | 1.15 | 1.35 |
| Melt Flow Ratio ($I_{21}/I_2$) | 54.2 | 53 | 48.3 | 84 | 88 |
| Stress Exponent | 1.40 | 1.38 | 1.39 | 1.39 | 1.38 |
| $I_{21}$ (g/10 min) | 91 | 53 | 48.3 | 84 | 88 |
| $I_5$ (g/10 min) | | 2.14 | 2.36 | 3.54 | 4.12 |
| $I_6$ (g/10 min) | | 3.07 | 3.5 | 5.29 | 6.18 |
| $I_{21}/I_5$ | | 24.77 | 20.47 | 23.73 | 21.36 |
| Shear Viscosity at $10^5$ s$^{-1}$ (240° C., Pa-s) | 6.0 | 4.8 | 5.1 | 4.4 | 4.6 |
| Shear Viscosity Ratio $\eta$ (10 s$^{-1}$)/$\eta$ (1000 s$^{-1}$) at 240° C. | 11.2 | 22.3 | 19.1 | 17.9 | 14.6 |
| DMA Data (190° C.) | | | | | |
| GPC | | | | | |
| $M_n$ | 15110 | 10953 | 10876 | 9202 | 9424 |
| $M_w$ | 85227 | 112697 | 112804 | 98160 | 86829 |
| $M_z$ | 287035 | 388883 | 375939 | 332900 | 286320 |
| Polydispersity Index ($M_w/M_n$) | 5.64 | 10.29 | 10.37 | 10.67 | 9.21 |
| $M_z/M_w$ | 3.37 | 3.45 | 3.33 | 3.39 | 3.30 |

TABLE 2-continued

| Resin Properties | | | | | |
|---|---|---|---|---|---|
| Broadness Factor $(M_w/M_n)/(M_z/M_w)$ | 1.67 | 2.98 | 3.11 | 3.15. | 2.79 |
| Branch Frequency - FTIR (uncorrected for chain end —$CH_3$) | | | | | |
| Uncorrected SCB/1000 C | 1.3 | 2.5 | 2.5 | 2.9 | 3.2 |
| Uncorrected comonomer content (mol %) | 0.3 | 0.5 | 0.5 | 0.6 | 0.6 |
| Comonomer ID | 1-octene | 1-octene | 1-octene | 1-octene | 1-octene |
| Comonomer mol % measured by $^{13}C$-NMR | | | | | |
| Hexyl + branches (>=4 carbon atoms), mol % | | | | | |
| Slow-CTREF | | | | | |
| $CDBI_{50}$ (wt. %) | 77.8 | 73 | 75.7 | 71.9 | 77.3 |
| $CDBI_{25}$ (wt. %) | | 64.4 | 66.5 | 64.1 | 69.4 |
| DSC | | | | | |
| Primary Melting Peak (° C.) | 130.7 | 128.76 | 128.69 | 128.29 | 127.52 |
| Heat of Fusion (J/g) | 213.8 | 221.5 | 217.1 | 218.8 | 215.2 |
| Crystallinity (%) | 73.73 | 76.39 | 74.86 | 75.45 | 74.22 |
| Other properties | | | | | |
| Hexane Extractables (wt. %) | 0.24 | 0.40 | 0.30 | 0.53 | 0.46 |
| VICAT Soft. Pt. (° C.) - Plaque | 128.4 | 126.1 | 126.2 | 125.6 | 124.7 |
| Heat Deflection Temp. [° C.] @ 66 PSI | 77.6 | 78 | 74.6 | 75.7 | 67.4 |

TABLE 3

| Polyethylene Component Properties | | | | | |
|---|---|---|---|---|---|
| | Example No. | | | | |
| | Example A | Example B | Example C | Example D | Example E |
| Density (g/cm³) | 0.9534 | 0.9523 | 0.9526 | 0.952 | 0.953 |
| $I_2$ (g/10 min.) | 1.88 | 0.625 | 1.42 | 1.92 | 0.68 |
| Stress Exponent | 1.41 | 1.38 | 1.36 | 1.38 | 1.38 |
| MFR ($I_{21}/I_2$) | 56.9 | 51.2 | 50.5 | 77.1 | 73.2 |
| Mw/Mn | 6.37 | 4.9 | 6.34 | 7.82 | 8.39 |
| 1st Ethylene Copolymer | | | | | |
| weight % | 0.43 | 0.43 | 0.433 | 0.426 | 0.449 |
| Mw | 162400 | 214300 | 176200 | 169500 | 213200 |
| $I_2$ (g/10 min.) | 0.13 | 0.05 | 0.10 | 0.11 | 0.05 |
| Density 1, $d_1$ (g/cm³) | 0.9389 | 0.9356 | 0.9334 | 0.9382 | 0.9363 |
| SCB1 per 1000Cs | 0.15 | 0.13 | 1.07 | 0.18 | 0.06 |
| mol % 1-octene | 0.03 | 0.03 | 0.21 | 0.04 | 0.01 |
| 2nd Ethylene Copolymer | | | | | |
| weight % | 0.57 | 0.57 | 0.567 | 0.574 | 0.551 |
| Mw | 18500 | 25600 | 17300 | 11700 | 14300 |
| $I_2$ (g/10 min.) | 736 | 190 | 979 | 5082 | 2148 |
| Density 2, $d_2$ (g/cm³) | 0.9559 | 0.9522 | 0.9528 | 0.9559 | 0.9565 |
| SCB2 per 1000Cs | 1.06 | 1.37 | 2.16 | 2.1 | 1.42 |
| mol % 1-octene | 0.21 | 0.27 | 0.43 | 0.42 | 0.28 |
| Estimated ($d_2 - d_1$), g/cm³ | 0.017 | 0.0166 | 0.0194 | 0.0177 | 0.0202 |
| Estimated (SCB2 - SCB1) | 0.91 | 1.24 | 1.09 | 1.92 | 1.36 |
| SCB1/SCB2 | 0.14 | 0.09 | 0.50 | 0.09 | 0.04 |

TABLE 3-continued

Polyethylene Component Properties

| | Example 3 | Example 4 | Example 5 | Example 7 |
|---|---|---|---|---|
| Density (g/cm$^3$) | 0.9524 | 0.9523 | 0.9532 | 0.9534 |
| I$_2$ (g/10 min.) | 1.69 | 1.5 | 1.78 | 2.05 |
| Stress Exponent | 1.38 | 1.4 | 1.37 | 1.34 |
| MFR (I$_{21}$/I$_2$) | 61 | 54.8 | 55.6 | 55 |
| Mw/Mn | 8.16 | 6.63 | 8.74 | 7.23 |
| 1$^{st}$ Ethylene Copolymer | | | | |
| weight % | 0.455 | 0.454 | 0.454 | 0.453 |
| Mw | 165100 | 168100 | 162700 | 157200 |
| I$_2$ (g/10 min.) | 0.13 | 0.12 | 0.13 | 0.15 |
| Density 1, d$_1$ (g/cm$^3$) | 0.9325 | 0.9302 | 0.9322 | 0.9316 |
| SCB1 per 1000Cs | 1.57 | 2.24 | 1.71 | 2.02 |
| mol % 1-octene | 0.31 | 0.45 | 0.34 | 0.40 |
| 2$^{nd}$ Ethylene Copolymer | | | | |
| weight % | 0.545 | 0.546 | 0.546 | 0.547 |
| Mw | 11100 | 14900 | 12100 | 11400 |
| I$_2$ (g/10 min.) | 6318 | 1817 | 4419 | 5739 |
| Density 2, d$_2$ (g/cm$^3$) | 0.9614 | 0.9555 | 0.959 | 0.9577 |
| SCB2 per 1000Cs | 0.63 | 1.64 | 1.08 | 1.59 |
| mol % 1-octene | 0.13 | 0.33 | 0.22 | 0.32 |
| Estimated (d$_2$ − d$_1$), g/cm$^3$ | 0.0289 | 0.0253 | 0.0268 | 0.0261 |
| Estimated (SCB2 − SCB1) | −0.94 | −0.6 | −0.63 | −0.43 |
| SCB1/SCB2 | 2.5 | 1.37 | 1.58 | 1.27 |

| | Example 10 | Example 11 | Example 12 | Example 13 |
|---|---|---|---|---|
| Density (g/cm$^3$) | 0.9545 | 0.9532 | 0.9543 | 0.9522 |
| I$_2$ (g/10 min.) | 0.67 | 0.76 | 1.15 | 1.35 |
| Stress Exponent | 1.38 | 1.39 | 1.39 | 1.38 |
| MFR (I$_{21}$/I$_2$) | 79 | 64 | 73 | 64 |
| Mw/Mn | 10.29 | 10.37 | 10.67 | 9.21 |
| 1$^{st}$ Ethylene Copolymer | | | | |
| weight % | 0.429 | 0.464 | 0.423 | 0.433 |
| Mw | 226800 | 201800 | 199000 | 185900 |
| I$_2$ (g/10 min.) | 0.04 | 0.06 | 0.06 | 0.08 |
| Density 1, d$_1$ (g/cm$^3$) | 0.9295 | 0.9299 | 0.9312 | 0.9318 |
| SCB1 per 1000Cs | 1.3 | 1.6 | 1.28 | 1.35 |
| mol % 1-octene | 0.26 | 0.32 | 0.26 | 0.27 |
| 2$^{nd}$ Ethylene Copolymer | | | | |
| weight % | 0.571 | 0.536 | 0.577 | 0.567 |
| Mw | 10900 | 11200 | 9300 | 10000 |
| I$_2$ (g/10 min.) | 6980 | 6163 | 13434 | 10206 |
| Density 2, d$_2$ (g/cm$^3$) | 0.9643 | 0.9631 | 0.9639 | 0.9640 |
| SCB2 per 1000Cs | 0.15 | 0.29 | 0.38 | 0.29 |
| mol % 1-octene | 0.03 | 0.06 | 0.08 | 0.06 |
| Estimated (d$_2$ − d$_1$), g/cm$^3$ | 0.0348 | 0.0332 | 0.0327 | 0.0322 |
| SCB1/SCB2 | 8.67 | 5.52 | 3.37 | 4.66 |

TABLE 4

Plaque Properties

| | Example A | Example B | Example C | Example D | Example E |
|---|---|---|---|---|---|
| Environmental Stress Crack Resistance | | | | | |
| ESCR Cond. B at 10% (hours) | <24 | <24 | <24 | <24 | <24 |

TABLE 4-continued

| Plaque Properties | | | | | |
|---|---|---|---|---|---|
| Flexural Properties (Plaques) | | | | | |
| Flex Secant Mod. 1% (MPa) | 1035 | 1070 | 1198 | 1062 | 1201 |
| Flex Sec Mod 1% (MPa) Dev. | 25 | 37 | 38 | 34 | 41 |
| Flex Secant Mod. 2% (MPa) | 877 | 906 | 1011 | 904 | 1002 |
| Flex Sec Mod 2% (MPa) Dev. | 19 | 29 | 22 | 28 | 32 |
| Flexural Strength (MPa) | 31.5 | 33.4 | 35.1 | 33 | 35.5 |
| Flexural Strength Dev. (MPa) | 0.6 | 0.7 | 0.4 | 0.9 | 0.6 |
| Tensile Properties (Plaques) | | | | | |
| Elong. at Yield (%) | 10.2 | 10.3 | 10 | 10.3 | 10.2 |
| Elong. at Yield Dev. (%) | 0.8 | 1 | 0 | 0.3 | 0.4 |
| Yield Strength (MPa) | 26.6 | 25.4 | 26.3 | 25.7 | 26.9 |
| Yield Strength Dev. (MPa) | 0.3 | 0.4 | 0.6 | 0.6 | 0.3 |
| Ultimate Elong. (%) | 920 | 1003 | 858 | 535 | 800 |
| Ultimate Elong. Dev. (%) | 94.6 | 23.7 | 37 | 167.4 | 86.1 |
| Ultimate Strength (MPa) | 21.5 | 33.8 | 21.4 | 14.8 | 20.7 |
| Ultimate Strength Dev. (MPa) | 4.1 | 1.1 | 1.8 | 0.7 | 6.7 |
| Sec Mod 1% (MPa) | 1374 | 1138 | 1294 | 1244 | 1237 |
| Sec Mod 1% (MPa) Dev. | 276.4 | 210.8 | 188 | 47.1 | 83 |
| Sec Mod 2% (MPa) | 937 | 834 | 900 | 858 | 888 |
| Sec Mod 2% (MPa) Dev. | 71 | 61 | 44 | 24 | 47 |
| Impact Properties (Plaques) | | | | | |
| Notched Izod Impact (J/m) | 76 | 139 | 64.1 | 69.4 | 97.1 |
| IZOD DV (J/m) | 7 | 7 | 5.3 | 6.9 | 2.8 |

| | Example No. | | |
|---|---|---|---|
| | Example 1 | Example 2 | Example 3 |
| Environmental Stress Crack Resistance | | | |
| ESCR Cond. B at 10% (hours) | 309 | 23 | 212 |
| Flexural Properties (Plaques) | | | |
| Flex Secant Mod. 1% (MPa) | 1274 | 1247 | 1267 |
| Flex Sec Mod 1% (MPa) Dev. | 39 | 44 | 19 |
| Flex Secant Mod. 2% (MPa) | 1064 | 1035 | 1060 |
| Flex Sec Mod 2% (MPa) Dev. | 29 | 33 | 14 |
| Flexural Strength (MPa) | 37.5 | 36.7 | 37.1 |
| Flexural Strength Dev. (MPa) | 0.8 | 0.4 | 0.3 |
| Tensile Properties (Plaques) | | | |
| Elong. at Yield (%) | 9 | 10 | 8 |
| Elong. at Yield Dev. (%) | 1 | 1 | 0 |
| Yield Strength (MPa) | 26 | 25.6 | 26.4 |
| Yield Strength Dev. (MPa) | 0.2 | 0.1 | 0.3 |
| Ultimate Elong. (%) | 701 | 988 | 762 |
| Ultimate Elong. Dev. (%) | 106 | 58 | 98 |
| Ultimate Strength (MPa) | 21.8 | 32.2 | 24.7 |
| Ultimate Strength Dev. (MPa) | 6.8 | 1.9 | 7.4 |

TABLE 4-continued

| Plaque Properties | | | |
|---|---|---|---|
| Sec Mod 1% (MPa) | 1483 | 1256 | 1331 |
| Sec Mod 1% (MPa) Dev. | 121 | 333 | 241 |
| Sec Mod 2% (MPa) | 973 | 880 | 939 |
| Sec Mod 2% (MPa) Dev. | 33 | 88 | 62 |
| Impact Properties (Plaques) | | | |
| Notched Izod Impact (J/m) | 74.7 | 69.4 | 69.4 |
| IZOD DV (J/m) | 0.0 | 0.0 | 0.0 |

| | Example No. | | | | |
|---|---|---|---|---|---|
| | Example 4 | Example 5 | Example 6 | Example 7 | Example 8 |
| Environmental Stress Crack Resistance | | | | | |
| ESCR Cond. B at 10% (hours) | 86 | 83 | 60 | 73 | 157 |
| Flexural Properties (Plaques) | | | | | |
| Flex Secant Mod. 1% (MPa) | 1295 | 1304 | 1240 | 1318 | 1260 |
| Flex Sec Mod 1% (MPa) Dev. | 23 | 57 | 31 | 37 | 25 |
| Flex Secant Mod. 2% (MPa) | 1085 | 1092 | 1026 | 1098 | 1049 |
| Flex Sec Mod 2% (MPa) Dev. | 21 | 40 | 26 | 24 | 15 |
| Flexural Strength (MPa) | 37.3 | 37.6 | 36.1 | 38.2 | 36.9 |
| Flexural Strength Dev. (MPa) | 0.4 | 0.8 | 0.6 | 0.3 | 0.6 |
| Tensile Properties (Plaques) | | | | | |
| Elong. at Yield (%) | 10 | 9 | 10 | 8 | 9 |
| Elong. at Yield Dev. (%) | 0 | 0 | 0 | 0 | 1 |
| Yield Strength (MPa) | 26.3 | 26.4 | 25.6 | 26.9 | 26.1 |
| Yield Strength Dev. (MPa) | 0.3 | 0.2 | 0.2 | 0.2 | 0.2 |
| Ultimate Elong. (%) | 891 | 862 | 974 | 766 | 836 |
| Ultimate Elong. Dev. (%) | 23 | 47 | 35 | 130 | 103 |
| Ultimate Strength (MPa) | 33.3 | 297 | 36.3 | 22.9 | 29.6 |
| Ultimate Strength Dev. (MPa) | 2 | 2.7 | 1.5 | 7 | 5.5 |
| Sec Mod 1% (MPa) | 1230 | 1197 | 1333 | 1429 | 1395 |
| Sec Mod 1% (MPa) Dev. | 90 | 128 | 213 | 183 | 217 |
| Sec Mod 2% (MPa) | 913 | 881 | 893 | 979 | 934 |
| Sec Mod 2% (MPa) Dev. | 34 | 40 | 70 | 52 | 73 |
| Impact Properties (Plaques) | | | | | |
| Notched Izod Impact (J/m) | 80.1 | 64.1 | 128.1 | 64.1 | 80.1 |
| IZOD DV (J/m) | 2.7 | 2.1 | 5.3 | 0.0 | 0.0 |

| | Example No. | | | | |
|---|---|---|---|---|---|
| | Example 9 | Example 10 | Example 11 | Example 12 | Example 13 |
| Environmental Stress Crack Resistance | | | | | |
| ESCR Cond. B at 10% (hours) | 24 | 1100 | 720 | 399 to 484 | 655 |
| Flexural Properties (Plaques) | | | | | |
| Flex Secant Mod. 1% (MPa) | 1402 | 1341 | 1330 | 1354 | 1297 |
| Flex Sec Mod 1% (MPa) Dev. | 48 | 34 | 30 | 34 | 27 |
| Flex Secant Mod. 2% (MPa) | 1159 | 1131 | 1119 | 1138 | 1095 |
| Flex Sec Mod 2% (MPa) Dev. | 35 | 26 | 22 | 26 | 16 |
| Flexural Strength (MPa) | 39.8 | 39.1 | 38.4 | 38.7 | 38.1 |
| Flexural Strength Dev. (MPa) | 1.1 | 0.4 | 0.5 | 0.4 | 0.6 |
| Tensile Properties (Plaques) | | | | | |
| Elong. at Yield (%) | 10 | 9 | 8 | 8 | 9 |
| Elong. at Yield Dev. (%) | 0 | 1 | 1 | 1 | 1 |
| Yield Strength (MPa) | 28.2 | 27.2 | 26.9 | 27.7 | 26.1 |
| Yield Strength Dev. (MPa) | 0.6 | 0.5 | 0.4 | 0.5 | 0.5 |
| Ultimate Elong. (%) | 923 | 810 | 821 | 747 | 694 |
| Ultimate Elong. Dev. (%) | 104 | 73 | 103 | 94 | 95 |
| Ultimate Strength (MPa) | 26.9 | 33 | 33.2 | 24.3 | 23 |
| Ultimate Strength Dev. (MPa) | 6.9 | 5.7 | 8.4 | 7.4 | 6.9 |

TABLE 4-continued

| Plaque Properties | | | | | |
|---|---|---|---|---|---|
| Sec Mod 1% (MPa) | 1367 | 1586 | 1624 | 1506 | 1358 |
| Sec Mod 1% (MPa) Dev. | 190 | 258 | 323 | 369 | 207 |
| Sec Mod 2% (MPa) | 966 | 1031 | 1031 | 1034 | 950 |
| Sec Mod 2% (MPa) Dev. | 67 | 65 | 97 | 113 | 48 |
| Impact Properties (Plaques) | | | | | |
| Notched Izod Impact (J/m) | 90.7 | 107.0 | 107.0 | 69.4 | 80.0 |
| IZOD DV (J/m) | 5.3 | 5.3 | 5.3 | 0.0 | 5.3 |

As can be seen from the data provided in Tables 2, 3 and 4, the polyethylene compositions, Examples 1-13, which have a ratio of short chain branching SCB1/SCB2 of greater than 0.5, generally have improved ESCR B properties while maintaining good processability, relative to polyethylene compositions A-E.

Figure 8:
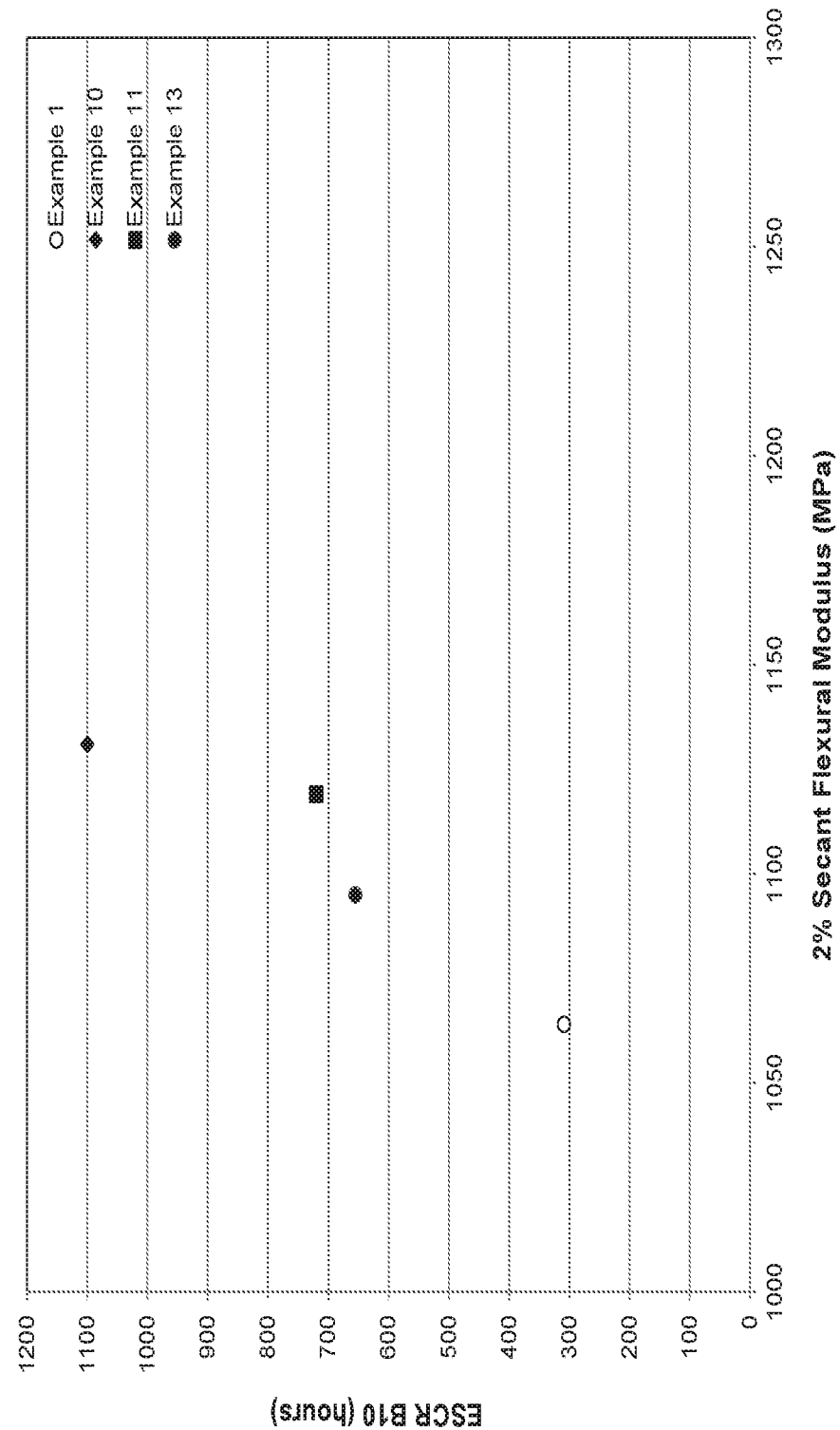
FIG. 8 shows a plot of the ESCR in hours (the ESCR B10 for a molded plaque) against the 2% secant flexural modulus (MPa) for selected polyethylene composition examples.

As shown in FIG. 8, polyethylene compositions 1, 10, 11 and 13 have a good balance of ESCR and stiffness (as indicated by 2% secant floral modulus).

Figure 9:
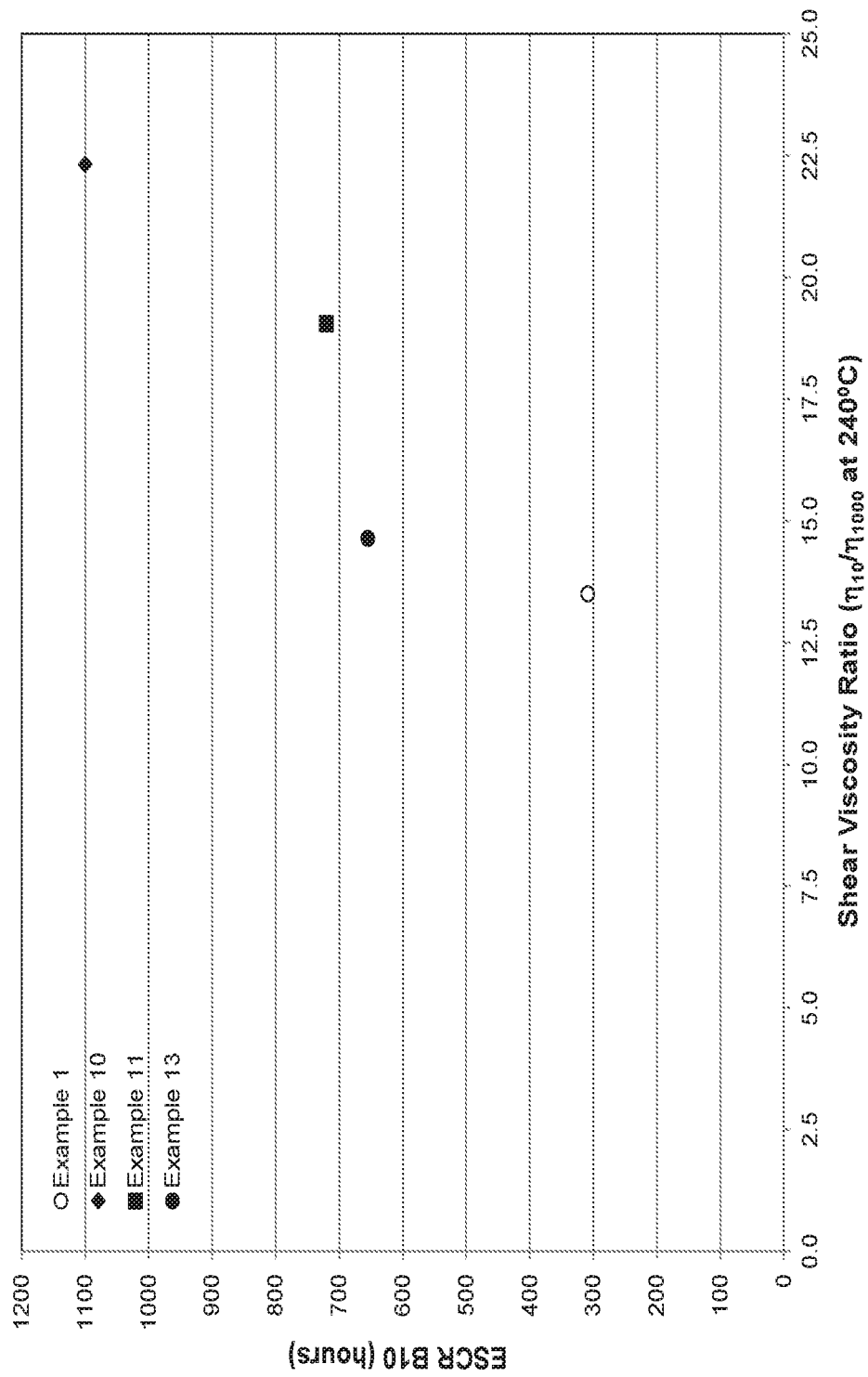
FIG. 9 shows a plot of the ESCR in hours (the ESCR B10 for a molded plaque) against the shear viscosity ratio ($\eta_{10}/\eta_{1000}$ at 240° C.) for selected polyethylene composition examples.

As shown in FIG. 9, polyethylene compositions 1, 10, 11 and 13 have a good balance of ESCR and processability (as indicated by the "shear viscosity ratio").

Figure 10:
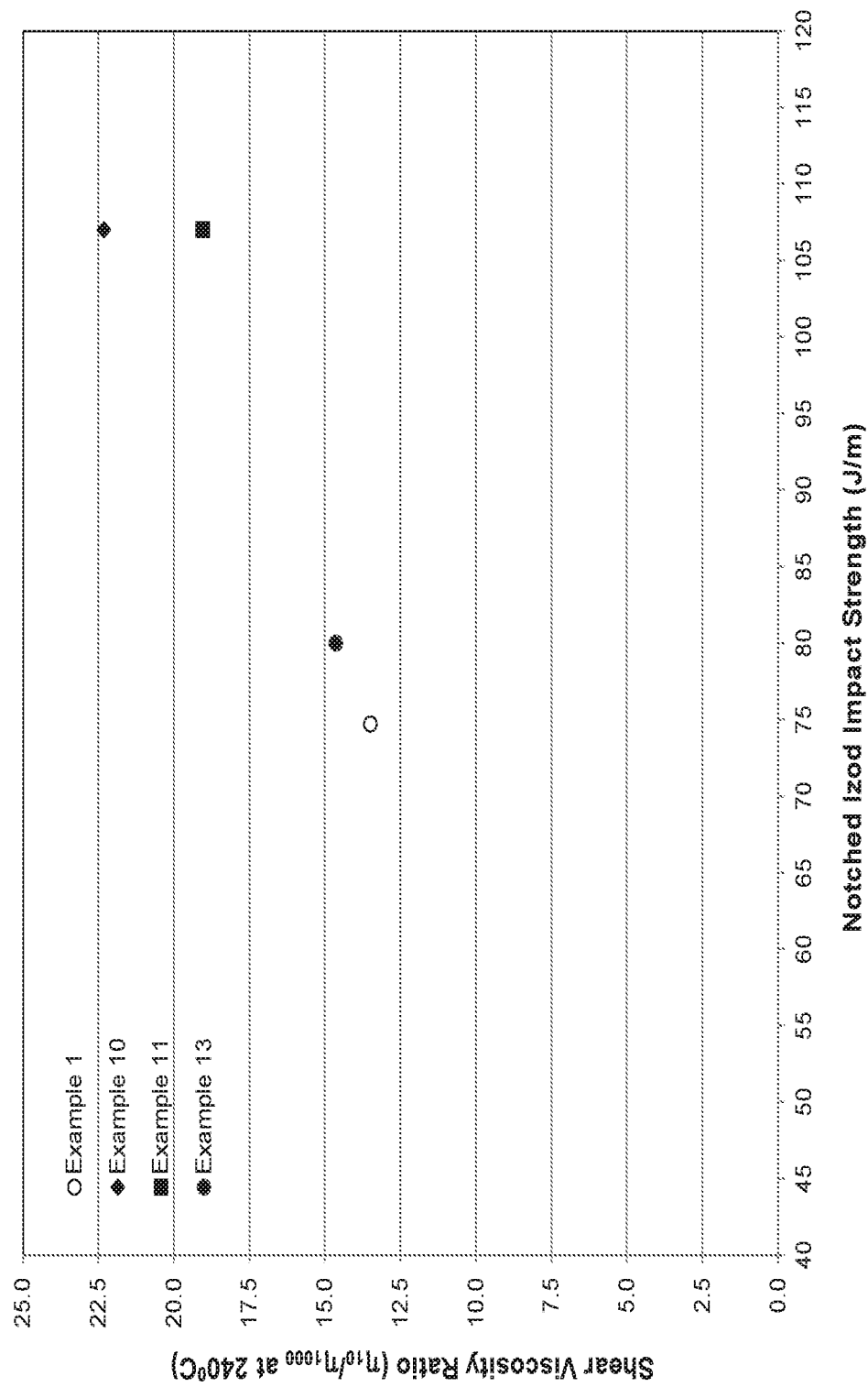
FIG. 10 shows a plot of the shear viscosity ratio ($\eta_{10}/\eta_{1000}$ at 240° C.) against the notched Izod Impact Strength (J/m) for selected polyethylene composition examples.

As shown in FIG. 10, polyethylene compositions 1, 10, 11 and 13 have a good balance of processability (as indicated by the "shear viscosity ratio") and Notched Izod Impact Strength.

Figure 11:
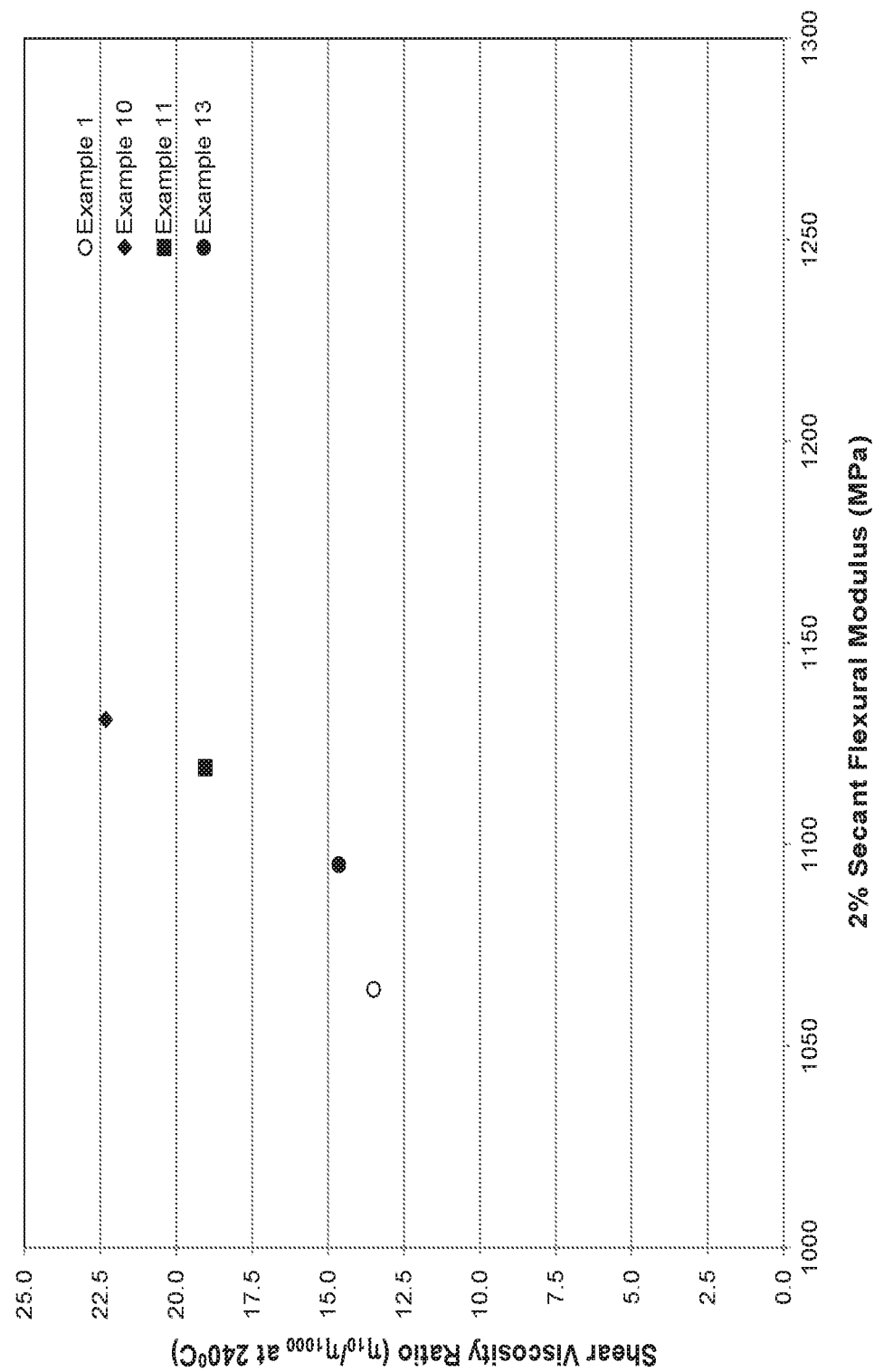
FIG. 11 shows a plot of the shear viscosity ratio ($\eta_{10}/\eta_{1000}$ at 240° C.) against the 2% secant flexural modulus (MPa) for selected polyethylene composition examples.

FIG. 11 shows that polyethylene compositions 1, 10, 11 and 13 have a good balance of balance of processability (as indicated by the "shear viscosity ratio") and stiffness (as indicated by 2% secant floral modulus).

Figure 12:
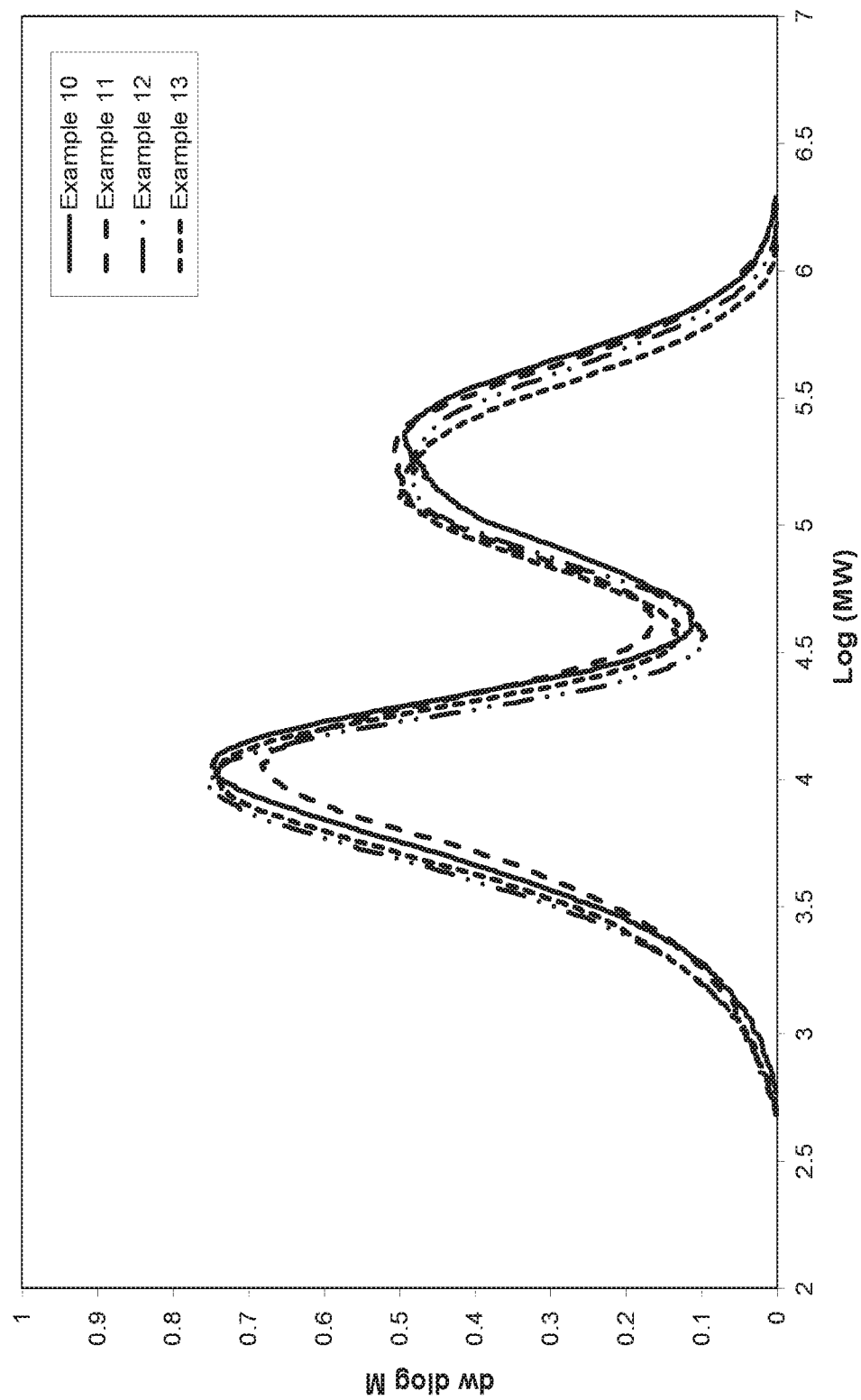
FIG. 12 shows a gel permeation chromatograph for the polyethylene compositions of Examples 10-13.

FIG. 12 shows the bimodal nature of the polyethylene compositions 10-13. Each ethylene copolymer component has a $M_w/M_n$ value of less than 2.5.

Figure 13:
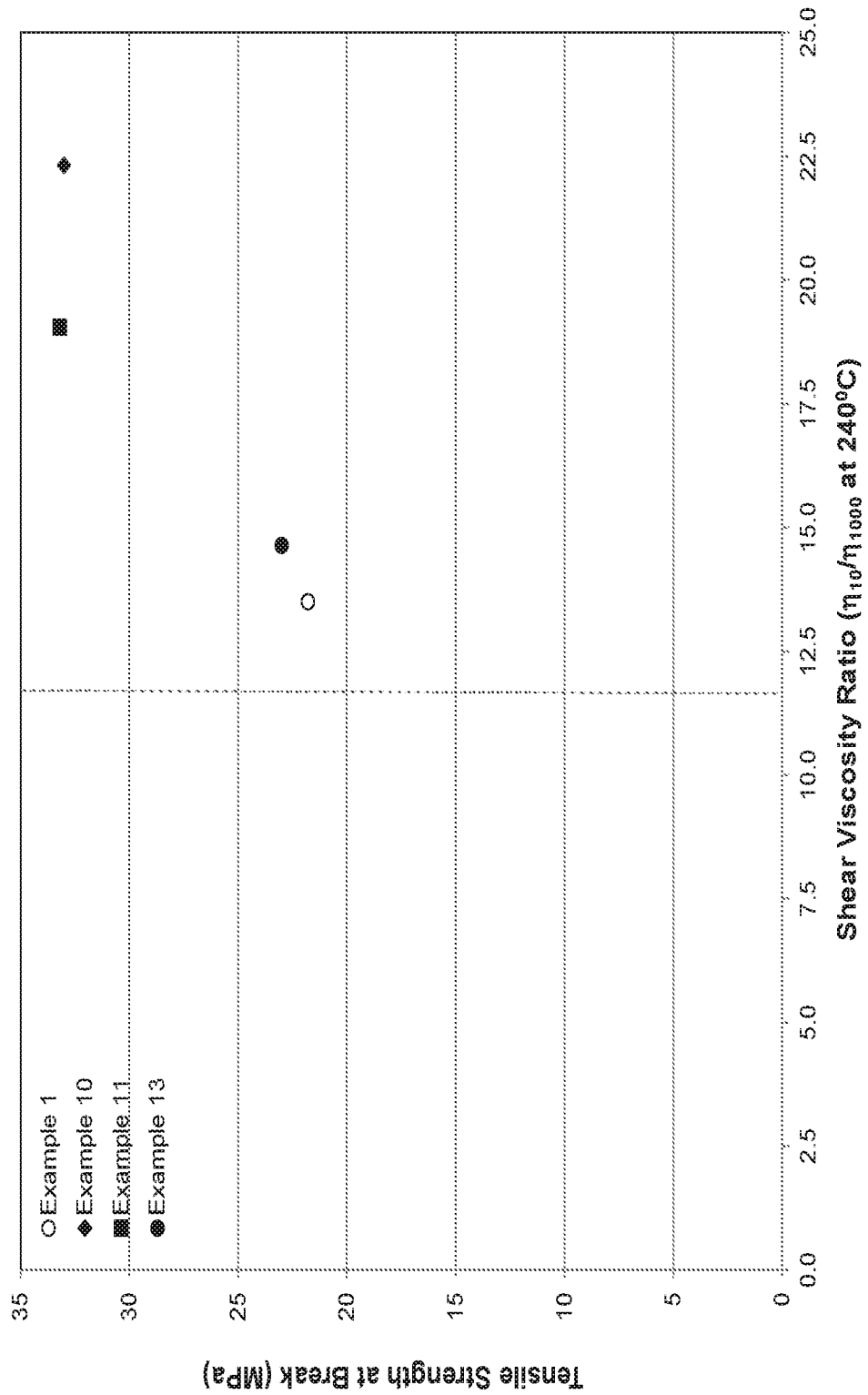
FIG. 13 shows the balance of tensile strength and processability for selected polyethylene composition examples as demonstrated by a plot of the tensile strength at break (MPa) against the shear viscosity ratio ($\eta_{10}/\eta_{1000}$ at 240° C.).
Figure 14:
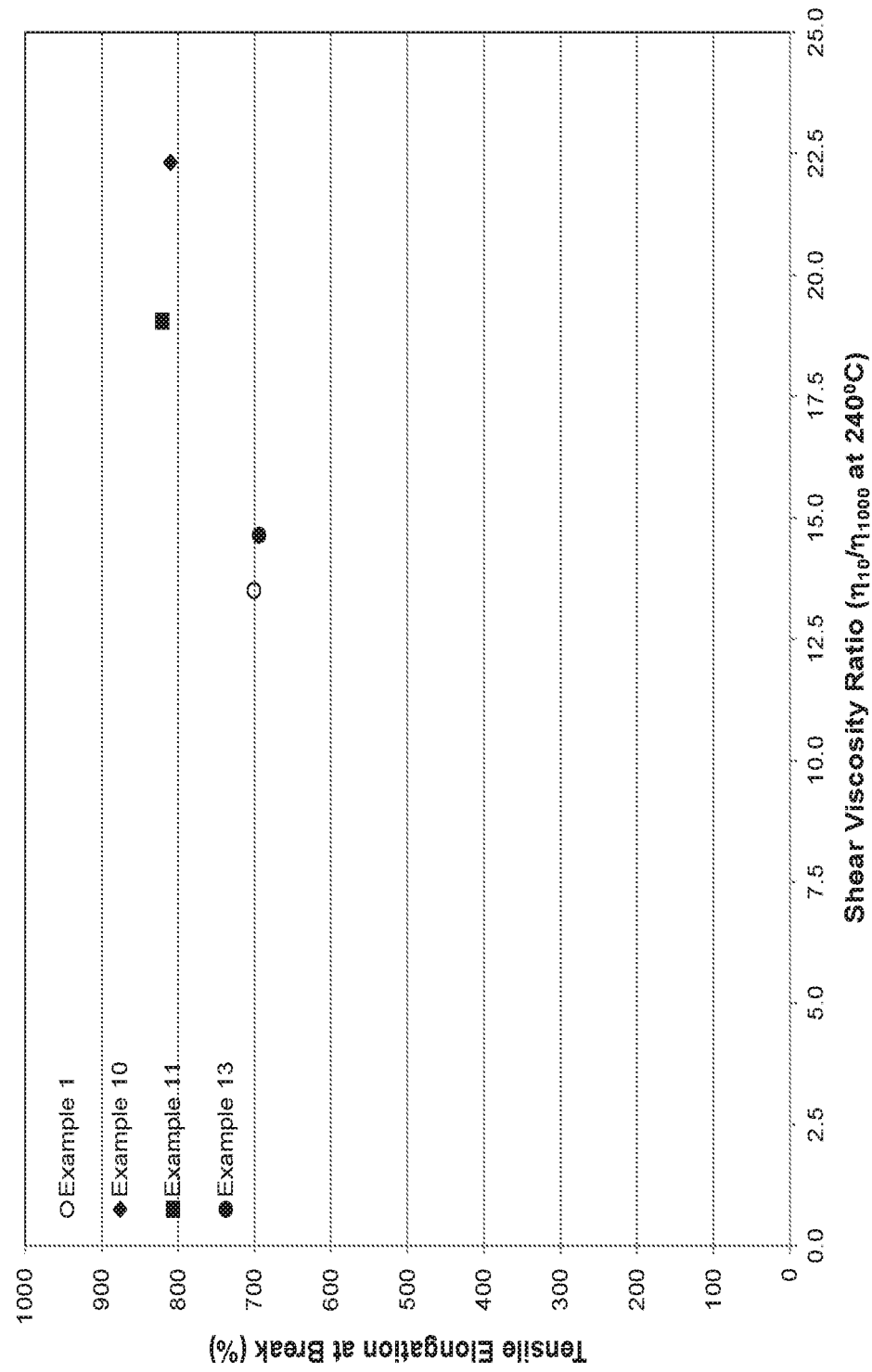
FIG. 14 shows the balance of tensile elongation and processability for selected polyethylene composition examples as demonstrated by a plot of the tensile elongation at break (in percent) against the shear viscosity ratio ($\eta_{10}/\eta_{1000}$ at 240° C.).

FIGS. 13 and 14 show that the polyethylene compositions 1, 10, 11 and 13 have a good balance of tensile strength or tensile elongation and processability (as indicated by the "shear viscosity ratio"). Without wishing to be bound by theory, a plastic material having good processability while at the same time having high tensile strength and elongation at break would be useful in the manufacture of a closure assembly where a tether portion should be strong enough to withstand normal use and resist abuse without breaking or deforming inappropriately.

The polyethylene compositions described above can be used in the formation of bottle closure assemblies. For example, bottle closure assemblies formed in part on in whole by compression molding and/or injection molding are contemplated.

In one embodiment, the bottle closure assembly includes the polyethylene composition described above and have a good balance of stiffness, processability and ESCR values. Hence the bottle closure assemblies are well suited for sealing bottles, containers and the like, for examples bottles that may contain drinkable water, and other foodstuffs, including but not limited to liquids that are pressurized.

In an embodiment of the disclosure, a bottle closure assembly including a polyethylene composition defined as above is prepared with a process including at least one compression molding step and/or at least one injection molding step.

Preparation of a Tether Proxy for Deformation Testing

Figure 15A:
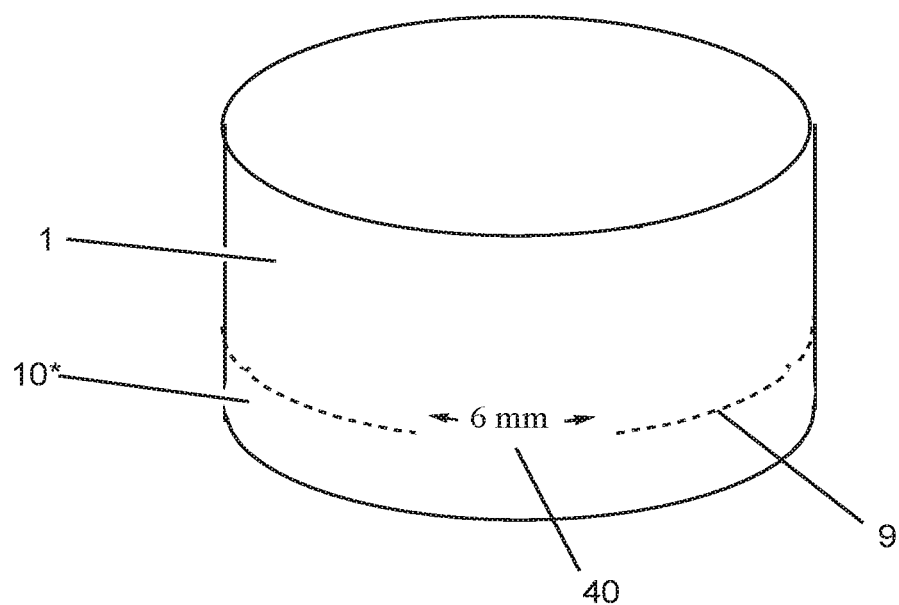
FIG. 15A shows a perspective view of a closure having a tether proxy.
Figure 15B:
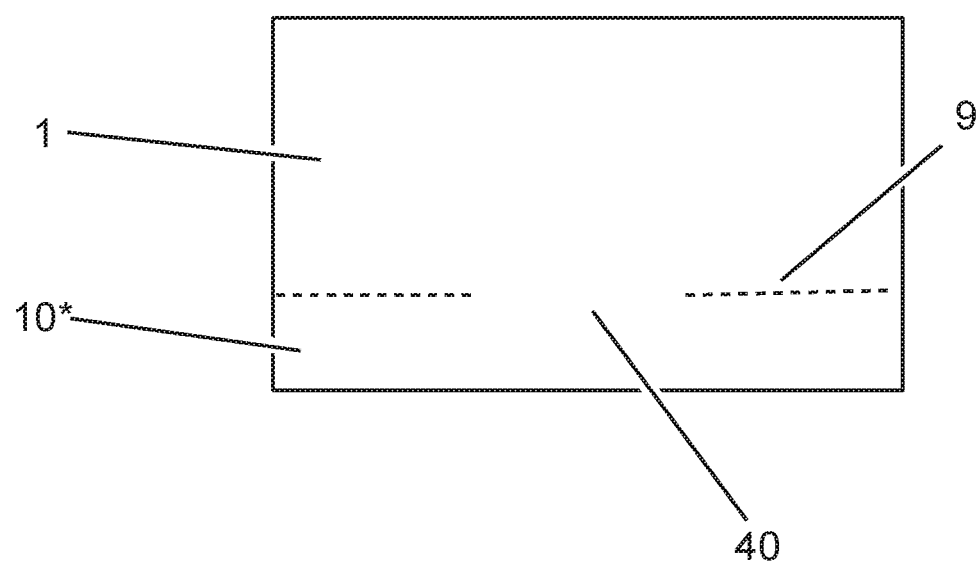
FIG. 15B shows a front elevation view of a closure having a tether proxy.

In order to provide a proxy of a tether portion which can be analyzed under conditions of shear, tear and tensile deformation, a closure (see FIGS. 15A and 15B) was compression molded as described below and then a tamper evident band, 10* (a proxy for a retaining means portion, 10) was formed by folding in and cutting the bottom circular edge of the closure using a folding/slitting machine with a modified blade, so that a tamper evident band (10*) which was joined to the cap portion (1) by several narrow ("pin" like) connecting sections (marked by the frangible line, 9 in FIGS. 15A and 15B) and one larger continuous section (i.e. continuous with a portion of the cap portion side wall), with the larger continuous section serving as a proxy for a tether (the area marked as 40 in FIGS. 15A and 15B). The larger continuous section or "tether proxy" section was designed to have an arcuate length of 6 mm. The "tether proxy" section had a cross-sectional width (or thickness) of 0.6 mm as determined by the dimensions of the closure mold used for the compression molding process (see below). The "tether proxy" section, or simply "tether proxy" 40 was then subjected to shear and tear deformations and to tensile deformation using a toque tester unit and tensile tester unit respectively (see below).

Method of Making a Closure by Compression Molding

A SACMI Compression molding machine (model CCM24SB) and a PCO (plastic closure only) 1881 carbonated soft drink (CSD) closure mold was used to prepare the closures. Depending on material density, melt index ($I_2$) and chosen plug size, the closure weight varied between 2.15 g and 2.45 grams, with the process conditions adjusted to target a closure having a weight of about 2.3 grams. During the closure preparation process, the overall closure dimensions, such as, for the example, the closure diameter and the closure height were measured and maintained within desired "quality-controlled" specifications. Closures with poor circularity or with significant deformation away from the pre-defined specifications were rejected by an automatic vision system installed on the compression molding machine. Once the closure had been compression molded, a tamper evident band, inclusive of one larger continuous section (a proxy for a tether portion) was cut into the closure bottom edge using a folding/slitting machine fitted with a modified blade. Both experimental and simulated data confirmed that 99% of any closure weight differences were due to differences in the top panel thickness (of the cap portion, see FIG. 15A) for each of the compression molded closures. For example, in the closures prepared by compression molding, the top panel thickness values of closures having a weight ranging from 2.15 grams to 2.45 grams were found to be slightly different, but each of the closure side wall thicknesses were found to be identical. As a result, any small differences in the compression molded cap weight were expected to have no impact on the dimensions of the tamper evident band or the tether proxy section (see above): in each case, the tether proxy had an arcuate length of 6 mm and a cross-sectional thickness of 0.6 mm.

Type 1 closures were compression molded from the polyethylene composition of Example 14, which was made in a manner substantially as described above for the polyethylene compositions of Examples 1-9. The Example 14 polyethylene composition properties and the properties of a pressed plaque made with the polyethylene composition are provided in Table 5.

TABLE 5

Polymer and Polymer Plaque Properties

| | Example No. 14 |
|---|---|
| Density (g/cm$^3$) | 0.954 |
| Rheology/Flow Properties | |
| Melt Index I$_2$ (g/10 min) | 1.12 |
| Melt Flow Ratio (I$_{21}$/I$_2$) | 56 |
| Stress Exponent | 1.33 |
| Shear Viscosity ($\eta$) at 10$^5$ s$^{-1}$ (240° C., Pa-s) | 5.6 |
| Shear viscosity Ratio ($\eta_{100}/\eta_{100000}$, 240° C.) | 183 |
| GPC - conventional | |
| M$_n$ | 12513 |
| M$_w$ | 99834 |
| M$_z$ | 295018 |
| Polydispersity Index (M$_w$/M$_n$) | 7.98 |
| M$_z$/M$_w$ | 2.96 |
| Branch Frequency - FTIR (uncorrected for chain end —CH$_3$) | |
| Uncorrected SCB/1000 C | 2.3 |
| Uncorrected comonomer content (mol %) | 0.50 |
| Internal unsaturation (/1000 C) | 0.02 |
| Side chain unsaturation (/1000 C) | 0.01 |
| Terminal unsaturation (/1000C) | 0.09 |
| Comonomer ID | 1-octene |
| Slow-CTREF | |
| CDBI$_{50}$ (%) | 73.1 |
| CDBI$_{25}$ (%) | 63.8 |
| DSC | |
| Primary Melting Peak (° C.) | 128.89 |
| Heat of Fusion (J/g) | 217.9 |
| Crystallinity (%) | 75.16 |
| Environmental Stress Crack Resistance | |
| ESCR Cond. B at 10% (hrs) | 182 |
| Flexural Properties (Plaques) | |
| Flex Secant Mod. 2% (MPa) | 1133 |

TABLE 5-continued

Polymer and Polymer Plaque Properties

| | Example No. 14 |
|---|---|
| Impact Properties (Plaques) | |
| Izod Impact (ft-lb/in) | 1.8 |
| IZOD DV (ft-lb/inch) | 0.1 |
| Other properties | |
| Hexane Extractables (%) | 0.45 |
| VICAT Soft. Pt. (° C.) - Plaque | 127.3 |
| Heat Deflection Temp. [° C.] @ 66 PSI | 71.3 |

Type 2 closures (Comparative) were compression molded from a unimodal polyethylene copolymer of ethylene and 1-butene having a melt index I$_2$ of 32 g/10 min, a density of 0.951 g/cm$^3$, and a molecular weight distribution, Mw/Mn of 2.88, and which is made using a Ziegler-Natta catalyst in a solution olefin polymerization process. This resin is commercially available from NOVA Chemicals Corporation as SCLAIR 2712.

The compression molding conditions used to make each closure type are provided in Table 6.

TABLE 6

Compression Molding Processing Conditions

| | Closure Type No. | |
|---|---|---|
| | 1 | 2 |
| Closure Weight (g) | 2.31 | 2.39 |
| BT1 Temp (° C.) | 167 | 163 |
| BT2 Temp (° C.) | 170 | 164 |
| BT3 Temp (° C.) | 174 | 163 |
| BT4 Temp (° C.) | 175 | 161 |
| BT6 Temp (° C.) | 175 | 170 |
| BT7 Temp (° C.) | 185 | 187 |
| BT8 Temp (° C.) | 185 | 184 |
| BT9 Temp (° C.) | 185 | 184 |
| BT15 Temp (° C.) | 175 | 170 |
| BT16 Temp (° C.) | 174 | 165 |
| BT17 Temp (° C.) | 183 | 174 |
| Metering Pump Set Press (bar) | 50 | 50 |
| Metering Pump Actual Press 1 (bar) IN | 46 | 50 |
| Metering Pump Actual Press 2 (bar) OUT | 144 | 30.6 |
| Pump Speed (%) | 59.5 | 57 |
| Hydraulic Operating Temp (° C.) | 45 | 46 |
| Punch Cooling BT18 (° C.) | 20 | 20 |
| Cavity Cooling BT19 (° C.) | 20 | 20 |
| Ausiliari Cooling BT20 (° C.) | 30 | 30 |

Shear Deformation of a Tether Proxy

Figure 16A:
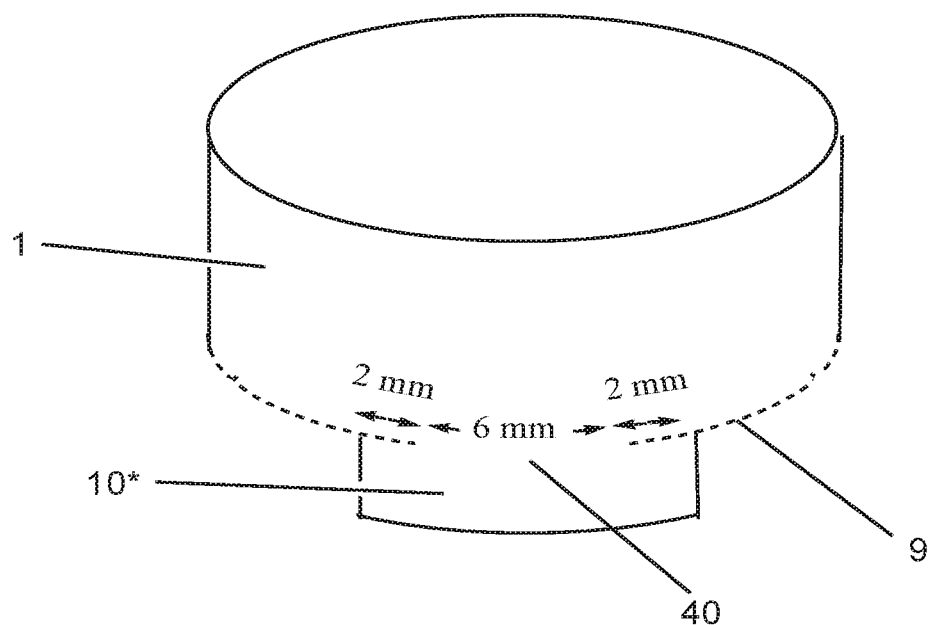
FIG. 16A shows a perspective view of a closure having a tether proxy after much of the tamper evident band has been removed.
Figure 16B:
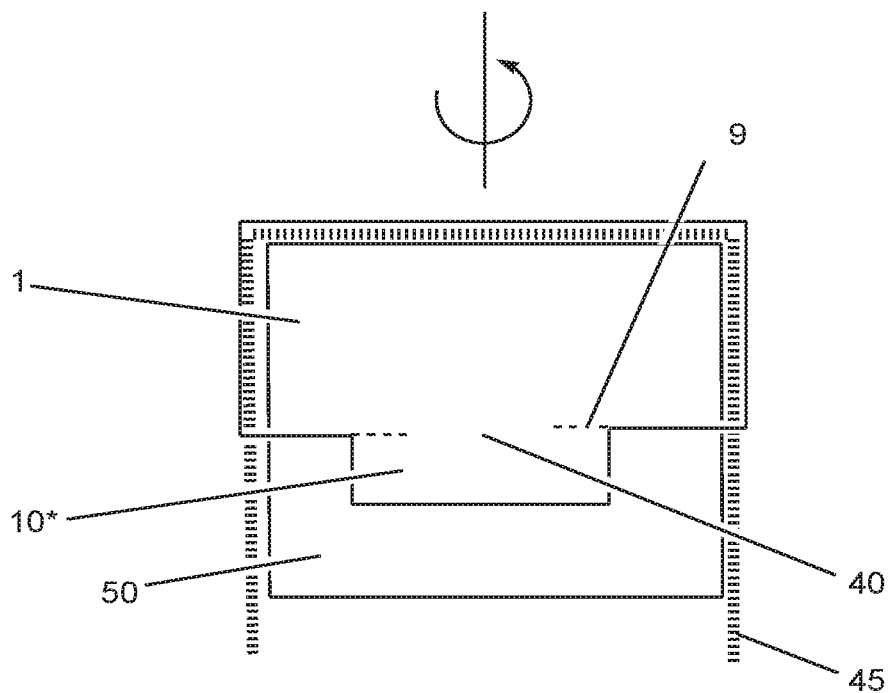
FIG. 16B shows a front elevation partial cross-sectional schematic view of a closure having a tether proxy and being mounted on a pre-form for shear deformation testing. Prior to mounting the closure on the pre-form, much of the tamper evident band was removed. The tether proxy connects a cap portion to the remaining section of the tamper evident band. To measure shear deformation of the tether proxy, the remaining section of the tamper evident band is clamped in a stationary position to the pre-form, while the cap portion is rotated within a torque tester, as shown.

A TMS 5000 Torque Tester unit manufactured by Steinfurth was used to carry out the tether proxy shear deformation testing. The unit was adjusted to operate in "removal torque mode". A closure having a tether proxy section (area 40 in FIGS. 15A and 15B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. Prior to testing, the tamper evident band (10*) was unfolded and then almost entirely removed, by cutting through the tamper evident band at a distance of approximately 2 mm from each end of the tether proxy section. The remaining portion of the tamper evident band (as shown in FIGS. 16A and 16B) then, includes the tether proxy section having an arcuate length of 6 mm, and a further 2 mm arcuate length section on either side of the tether proxy section, all of which has a cross sectional width of 0.6 mm. Adding 2 mm to either side of the tether proxy section provides a larger surface area to grip when carrying out the shear deformation testing. In order to support the closure for testing in the Torque Tester unit, a modified tubular preform was used (item 45 in FIG. 16B). The tubular pre-form 45 was made of polyethylene terephthalate and was modified to have smooth outer walls. Following this, a brass rod (50), having a diameter which fit snuggly within the preform (45) was inserted as a plug to afford rigidity to the pre-form and to prevent its deformation during testing. Next, the closure was placed on top of the pre-form and the remaining section of the tamper evident band (10*) was clamped to the preform using vice grips. The closure and preform were then mounted within the Torque Tester. The cap portion (1) was gripped from above within a suitably designed chuck and rotated at a removal torque speed of 0.8 rpm, relative to the clamped section of the tamper evident band, using the Torque Tester. The shear strength of the tether proxy (40) is defined as the maximum torque (in inches.pounds) required to separate the cap portion (1) from the remaining section of the tamper evident band section (10*) by breaking the tether proxy (40). The reported shear strength in Table 7 is the average of at least 5 such shear deformation tests.

Tear Deformation of a Tether Proxy

Figure 16C:
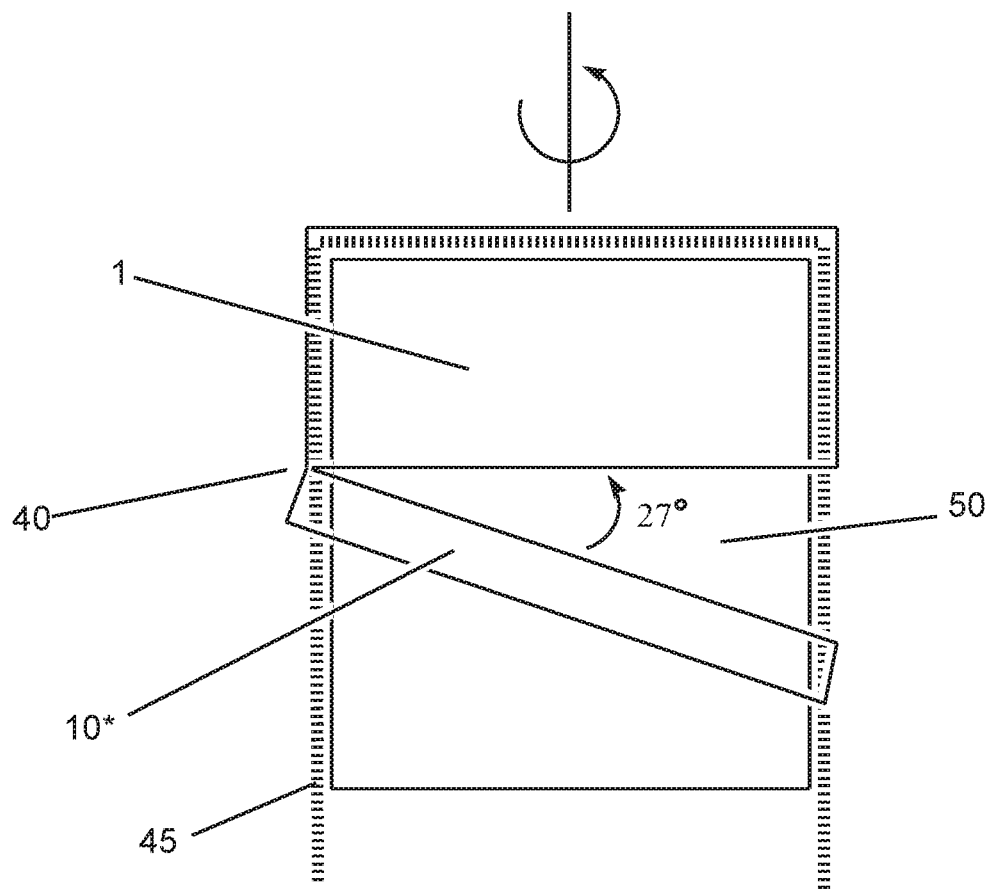
FIG. 16C shows a side elevation partial cross-sectional schematic view of a closure having a tether proxy and being mounted on a pre-form for tear deformation testing. The tamper evident band was deflected down and away from the cap portion, while leaving the tether proxy intact. The tether proxy connects the cap portion to the downwardly deflected tamper evident band. To measure tear deformation of the tether proxy, the downwardly deflected tamper evident band is clamped in a stationary position to the pre-form, while the cap portion is rotated within a torque tester, as shown.

A TMS 5000 Torque Tester unit manufactured by Steinfurth was used to carry out the tether proxy shear deformation testing. The unit was adjusted to operate in "removal torque mode". A closure having a tether proxy section (area 40 in FIGS. 15A and 15B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. In order to support the closure for testing in the Torque Tester unit, a modified tubular pre-form was used (item 45 in FIG. 16C). The tubular pre-form 45 was made of polyethylene terephthalate and was modified to have smooth outer walls. Following this, a brass rod (50), having a diameter which fit snuggly within the pre-form (45) was inserted as a plug to afford rigidity to the pre-form and to prevent its deformation during testing. Next, the closure was placed on top of the preform. Prior to testing, the tamper evident band (10*) was deflected downward (on the opposite side of the tether proxy section) and away from the cap portion (1) as is shown in FIG. 16C. The downward deflection breaks all the narrow pin sections (the frangible line 9 in FIGS. 15A and 15B) joining the top edge of the tamper evident band to the lower edge of the cap portion while leaving the larger continuous section, the tether proxy section (40), intact. The tamper evident band (10*) is deflected downward and away from the cap portion (1) until the top edge of the tamper evident band makes an angle with the lower edge of the cap portion of about 27 degrees, while the tether portion remains intact along its 6 mm arcuate length (see FIG. 16C). The tamper evident band (10*) was then clamped to the pre-form in this downwardly deflected position using vice grips. The closure and pre-form were then mounted within the Torque Tester. The cap portion (1) was gripped from above within a suitably designed chuck and rotated at a removal torque speed of 0.8 rpm, relative to the clamped tamper evident band (10*), using the Torque Tester. The tear strength of the tether proxy (40) is defined as the maximum torque (in inches.pounds) required to separate the cap portion (1) from the downwardly deflected tamper evident band (10*) by breaking the tether proxy (40). The reported tear strength in Table 7 is the average of at least 5 such tear deformation tests.

Tensile Deformation of a Tether Proxy

Figure 17A:
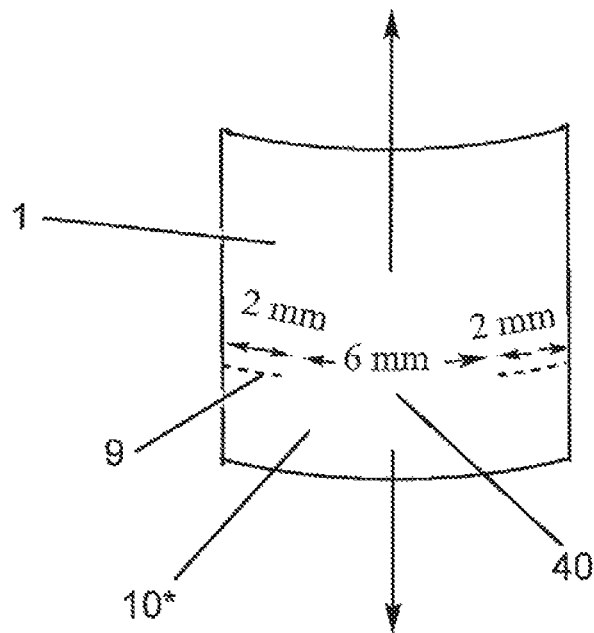
FIGS. 17A and 17B show a perspective view and a front elevation view respectively, of a tether proxy after much of the cap portion and much of the tamper evident band have been removed. To measure tensile deformation of the tether proxy, the remaining section of the cap portion and the remaining section of the tamper evident band are each clamped and then drawn apart in a vertical direction, within a tensile tester, as shown.
Figure 17B:
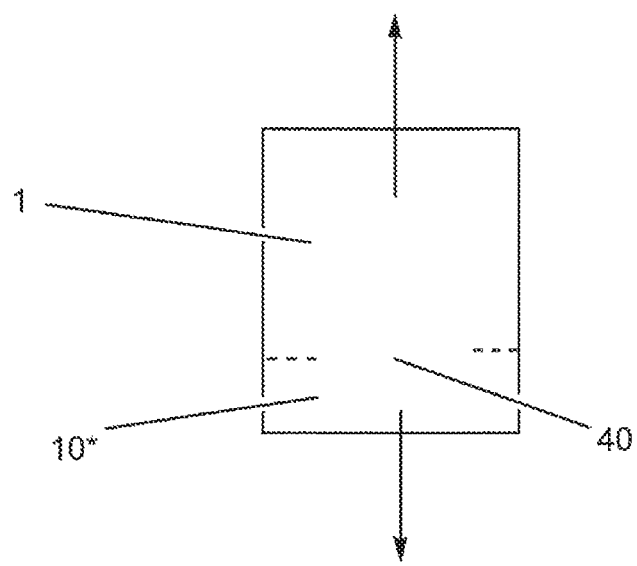

Tensile deformation tests were performed using a tensile machine (an Instron 4204 universal tester, with a 1 KN (225 lbf) capacity load cell) with the crosshead velocity set at 50 mm/min. A closure having a tether proxy section (area 40 in FIGS. 15A and 15B) with a 6 mm arcuate length and a 0.6 mm cross-sectional width connecting a cap portion (1) to a tamper evident band 10* (a proxy for a retaining means portion, 10) and suitable for mating with a PCO 1881 bottle finish was employed. Prior to testing, the tamper evident band (10*) was unfolded and then almost entirely removed, by cutting through the tamper evident band at a distance of approximately 2 mm from each end of the tether proxy section (see FIGS. 16A, 17A and 17B). The remaining portion of the tamper evident band (as shown in FIGS. 16A, 17A and 17B) then, includes the tether proxy section having an arcuate length of 6 mm, and a further 2 mm arcuate length section on either side of the tether proxy section, all of which has a cross sectional width of 0.6 mm. Adding 2 mm to either side of the tether proxy section provides a larger surface area to grip when carrying out the tensile deformation testing. For the tensile deformation test, most of the cap portion (1) was similarly cut away, leaving only a section of the cap portion side wall connected to the what was left of the tamper evident band (see FIGS. 17A and 17B). This "cut away" section of the closure was then mounted in the tensile tester, with the remaining cap portion side wall and the remaining tamper evident band each being secured with 0.5-inch wide steel serrated grips at a 0.25-inch grip separation. During the tensile testing, the remaining section of the cap portion (1) and the remaining section of the tamper evident band (10*) were drawn apart vertically. The tensile strength of the tether proxy (40) is defined as the maximum load (in grams.force, gf) required to separate the remaining cap portion (1) from the remaining tamper evident band section (10*) by breaking the tether proxy (40). The reported tensile strength in Table 7 is the average of at least 5 such tensile deformation tests.

TABLE 7

Average Shear, Tear and Tensile Deformation of a Tether Proxy

|  | Closure Type No. | |
| --- | --- | --- |
|  | 1 | 2 (Comparative) |
| Shear Strength (inches · pounds) | 11.14 | 9.43 |
| Tear Strength (inches · pounds) | 10.58 | 9.18 |
| Tensile Strength (grams · force) | 13910 | 12800 |

A person skilled in the art will recognize from the data provided in Table 7, that a tether proxy made using a polyethylene composition according to the current disclosure (e.g., the polyethylene composition of Example 14) may have a relatively good ability to resist shear and tear deformations, while tensile deformation is not statistically different (beyond a 95% confidence level), relative to a comparative tether proxy made from a unimodal polyethylene copolymer of ethylene and 1-butene (SCLAIR 2712). The data thus provides further evidence that the polyethylene compositions described herein may be useful in the production of bottle closure assemblies, by preventing facile separation of a cap portion from a retaining means portion or from a bottle, and by generally helping to prevent loss or disassociation of a cap portion (a potential plastic waste stream) from a bottle, where the cap portion could otherwise contribute to environmental waste concerns.

The present disclosure has been described with reference to certain details of particular embodiments thereof. It is not intended that such details be regarded as limitations upon the scope of the disclosure except insofar as and to the extent that they are included in the accompanying claims.

We claim:

1. A bottle closure assembly comprising:
  an integrally molded: cap portion, elongated tether portion, and retaining means portion; the cap portion being molded to reversibly engage and cover a bottle opening, the retaining means portion being molded to irreversibly engage a bottle neck or an upper portion of a bottle, and the elongated tether portion being molded to connect at least one point on the cap portion to at least one point on the retaining means portion; wherein the integrally molded: cap portion, elongated tether, portion and retaining means portion are made from a polyethylene composition comprising:
    (1) 10 to 70 wt. % of a first ethylene copolymer having a melt index $I_2$, of less than 1.0 g/10 min; and a density of from 0.920 to 0.960 g/cm$^3$; and
    (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$;
  wherein:
    the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5; and
    the polyethylene composition has a tensile elongation at break of at least 600 percent and a tensile strength at break of at least 20 MPa.

2. A bottle closure assembly comprising:
  an integrally molded: cap portion, elongated tether portion, and retaining collar portion; the cap portion being molded to reversibly engage and cover a bottle opening, the retaining collar portion being molded to irreversibly engage a bottle neck or an upper portion of a bottle, and the elongated tether portion being molded to connect at least one point on the cap portion to at least one point on the retaining collar portion; wherein the integrally molded: cap portion, elongated tether portion, and retaining collar portion are made from a polyethylene composition comprising:
    (1) 10 to 70 wt. % of a first ethylene copolymer having a melt index $I_2$, of less than 1.0 g/10 min; and a density of from 0.920 to 0.960 g/cm$^3$; and
    (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$;
  wherein:
    the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5; and
    the polyethylene composition has a tensile elongation at break of at least 600 percent and a tensile strength at break of at least 20 MPa.

3. A bottle closure assembly comprising:
  a closure portion, an elongated tether portion, and a retaining collar portion,
  the closure portion being molded to reversibly engage and cover a bottle opening, the elongated tether portion comprising a tether strip which is frangibly connected along a portion of its upper edge to a descending annular edge of the closure portion and which is frangibly connected along a portion of its lower edge to an upper annular edge of the retaining collar portion, the tether strip being integrally formed with and connected at one end to at least one point on the closure portion and integrally formed with and connected at another end to at least one point on the retaining collar portion, the frangible sections being breakable when the closure portion is removed from a bottle opening, but where the closure portion remains connected to the retaining collar portion via the tether strip; wherein the cap portion, the elongated tether portion, and the retaining collar portion are integrally molded from a polyethylene composition comprising:
    (1) 10 to 70 wt. % of a first ethylene copolymer having a melt index $I_2$, of less than 1.0 g/10 min; and a density of from 0.920 to 0.960 g/cm$^3$; and
    (2) 90 to 30 wt. % of a second ethylene copolymer or an ethylene homopolymer; the second ethylene copolymer or the ethylene homopolymer having a melt index $I_2$, of at least 20 g/10 min; and a density higher than the density of the first ethylene copolymer, but less than 0.970 g/cm$^3$;
  wherein:
    the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5; and
    the polyethylene composition has a tensile elongation at break of at least 600 percent and a tensile strength at break of at least 20 MPa.

4. The bottle closure assembly of claim 1, wherein the polyethylene composition is bimodal and comprises:
  (1) 10 to 70 wt % of a first ethylene copolymer having a melt index $I_2$, of less than 0.4 g/10 min; a molecular weight distribution, $M_w/M_n$, of less than 3.0; and a density of from 0.920 to 0.955 g/cm$^3$; and
  (2) 90 to 30 wt % of a second ethylene copolymer having a melt index $I_2$, of from 100 to 10,000 g/10 min; a molecular weight distribution, $M_w/M_n$, of less than 3.0; and a density higher than the density of said first ethylene copolymer, but less than 0.967 g/cm$^3$;
wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 0.5; and wherein said polyethylene composition has a molecular weight distribution, $M_w/M_n$, of from 3 to 11; a density of at least 0.949 g/cm$^3$; a melt index $I_2$, of from 0.4 to 5.0 g/10 min; an $M_Z$ of less than 400,000; a stress exponent of less than 1.50; and an ESCR Condition B (10% IGEPAL) of at least 20 hrs.

5. The bottle closure assembly of claim 2, wherein the polyethylene composition is bimodal and comprises:
(1) 10 to 70 wt % of a first ethylene copolymer having a melt index $I_2$, of less than 0.4 g/10 min; a molecular weight distribution, $M_w/M_n$, of less than 3.0; and a density of from 0.920 to 0.955 g/cm$^3$; and
(2) 90 to 30 wt % of a second ethylene copolymer having a melt index $I_2$, of from 100 to 10,000 g/10 min; a molecular weight distribution, $M_w/M_n$, of less than 3.0; and a density higher than the density of said first ethylene copolymer, but less than 0.967 g/cm$^3$;
wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 0.5; and wherein said polyethylene composition has a molecular weight distribution, $M_w/M_n$, of from 3 to 11; a density of at least 0.949 g/cm$^3$; a melt index $I_2$, of from 0.4 to 5.0 g/10 min; an $M_Z$ of less than 400,000; a stress exponent of less than 1.50; and an ESCR Condition B (10% IGEPAL) of at least 20 hrs.

6. The bottle closure assembly of claim 3, wherein the polyethylene composition is bimodal and comprises:
(1) 10 to 70 wt % of a first ethylene copolymer having a melt index $I_2$, of less than 0.4 g/10 min; a molecular weight distribution, $M_w/M_n$, of less than 3.0; and a density of from 0.920 to 0.955 g/cm$^3$; and
(2) 90 to 30 wt % of a second ethylene copolymer having a melt index $I_2$, of from 100 to 10,000 g/10 min; a molecular weight distribution, $M_w/M_n$, of less than 3.0; and a density higher than the density of said first ethylene copolymer, but less than 0.967 g/cm$^3$;
wherein the density of said second ethylene copolymer is less than 0.037 g/cm$^3$ higher than the density of said first ethylene copolymer; the ratio (SCB1/SCB2) of the number of short chain branches per thousand carbon atoms in said first ethylene copolymer (SCB1) to the number of short chain branches per thousand carbon atoms in said second ethylene copolymer (SCB2) is greater than 0.5; and wherein said polyethylene composition has a molecular weight distribution, $M_w/M_n$, of from 3 to 11; a density of at least 0.949 g/cm$^3$; a melt index $I_2$, of from 0.4 to 5.0 g/10 min; an $M_Z$ of less than 400,000; a stress exponent of less than 1.50; and an ESCR Condition B (10% IGEPAL) of at least 20 hrs.

\* \* \* \* \*